(12) United States Patent
Rinko

(10) Patent No.: US 11,402,563 B2
(45) Date of Patent: Aug. 2, 2022

(54) OPTICAL DEVICE

(71) Applicant: NITTO DENKO CORPORATION, Osaka (JP)

(72) Inventor: Kari Rinko, Helsinki (FI)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 16/982,715

(22) PCT Filed: Mar. 22, 2019

(86) PCT No.: PCT/JP2019/012021
§ 371 (c)(1),
(2) Date: Sep. 21, 2020

(87) PCT Pub. No.: WO2019/182098
PCT Pub. Date: Sep. 26, 2019

(65) Prior Publication Data
US 2021/0011211 A1    Jan. 14, 2021

Related U.S. Application Data

(60) Provisional application No. 62/646,461, filed on Mar. 22, 2018.

(51) Int. Cl.
*F21V 8/00* (2006.01)
*G02B 5/02* (2006.01)
(Continued)

(52) U.S. Cl.
CPC ......... *G02B 6/0036* (2013.01); *G02B 5/0247* (2013.01); *G02B 6/0023* (2013.01);
(Continued)

(58) Field of Classification Search
CPC .... G02B 5/0247; G02B 6/002; G02B 6/0023; G02B 6/0031; G02B 6/0036
See application file for complete search history.

(56) References Cited

U.S. PATENT DOCUMENTS 10,120,117 B2 * 11/2018 Fan .................. G02F 1/133615
10,634,841 B2 *  4/2020 Huang ................ G02B 6/0068
(Continued)

FOREIGN PATENT DOCUMENTS

EP        2719943      4/2014
JP     2003-227909 A   8/2003
(Continued)

OTHER PUBLICATIONS

International Search Report issued in International Patent Application No. PCT/JP2019/012021, dated Jun. 11, 2019, along with an English translation thereof.
(Continued)

*Primary Examiner* — Leah Simone Macchiarolo
(74) *Attorney, Agent, or Firm* — Greenblum & Bernstein, P.L.C.

(57) ABSTRACT

With a simple configuration, an optical device which realizes uniform light distribution and adequate display quality is provided. An optical device includes: a light guiding layer; a first optically functional layer provided on at least one of a first principal face and a second principal face of the light guiding layer; and a ray control structure, at an end of the light guiding layer on a light-incident side, being provided on a surface of the first optically functional layer that is on an opposite side to the light guiding layer. The ray control structure reduces light which is incident from an edge of the light guiding layer to the first optically functional layer at an angle smaller than a critical angle.

20 Claims, 49 Drawing Sheets

(51) Int. Cl.
*G02B 6/42* (2006.01)
*G09F 13/18* (2006.01)

(52) U.S. Cl.
CPC ......... *G02B 6/0031* (2013.01); *G02B 6/0043* (2013.01); *G02B 6/0055* (2013.01); *G02B 6/0063* (2013.01); *G02B 6/002* (2013.01); *G02B 6/4243* (2013.01); *G02B 6/4259* (2013.01); *G09F 2013/1804* (2013.01)

(56) References Cited

U.S. PATENT DOCUMENTS

| | | | | |
|---|---|---|---|---|
| 11,029,564 | B1* | 6/2021 | Aas | G02B 6/0025 |
| 2003/0123150 | A1 | 7/2003 | Brickey et al. | |
| 2008/0019150 | A1* | 1/2008 | Park | G02B 6/006 |
| | | | | 362/621 |
| 2008/0129926 | A1* | 6/2008 | Seo | G02B 6/0053 |
| | | | | 349/65 |
| 2008/0284308 | A1 | 11/2008 | Pang | |
| 2010/0048085 | A1* | 2/2010 | Kayanuma | G02B 6/0018 |
| | | | | 445/23 |
| 2013/0250614 | A1 | 9/2013 | Thompson et al. | |
| 2014/0063416 | A1 | 3/2014 | Shimizu | |
| 2014/0104877 | A1 | 4/2014 | An et al. | |
| 2014/0300710 | A1* | 10/2014 | Shinoda | H04N 13/30 |
| | | | | 348/51 |
| 2015/0131317 | A1 | 5/2015 | Yuki et al. | |
| 2016/0109635 | A1* | 4/2016 | Lee | G02B 6/0026 |
| | | | | 349/65 |
| 2017/0329070 | A1 | 11/2017 | Shih et al. | |
| 2017/0363793 | A1 | 12/2017 | Montgomery et al. | |
| 2019/0011627 | A1* | 1/2019 | Chen | G02B 6/0028 |
| 2019/0129083 | A1* | 5/2019 | Jeong | G02B 6/0055 |
| 2021/0149103 | A1* | 5/2021 | Ikeda | A63F 13/25 |

FOREIGN PATENT DOCUMENTS

| | | |
|---|---|---|
| JP | 2006-286489 A | 10/2006 |
| JP | 2011-70865 A | 4/2011 |
| JP | 2011-150861 A | 8/2011 |
| JP | 2012-109104 A | 6/2012 |
| JP | 2015-149119 A | 8/2015 |
| TW | 200515019 | 5/2005 |
| TW | 201232126 | 8/2012 |

OTHER PUBLICATIONS

Written Opinion issued in International Patent Application No. PCT/JP2019/012021, dated Jun. 11, 2019, along with an English translation thereof.
Extended European Search Report issued in EP Application No. 19771579.0, dated Oct. 13, 2021.
Taiwanese Office Action and Search Report issued in Patent Application No. 108110122, dated Apr. 19, 2022.

* cited by examiner

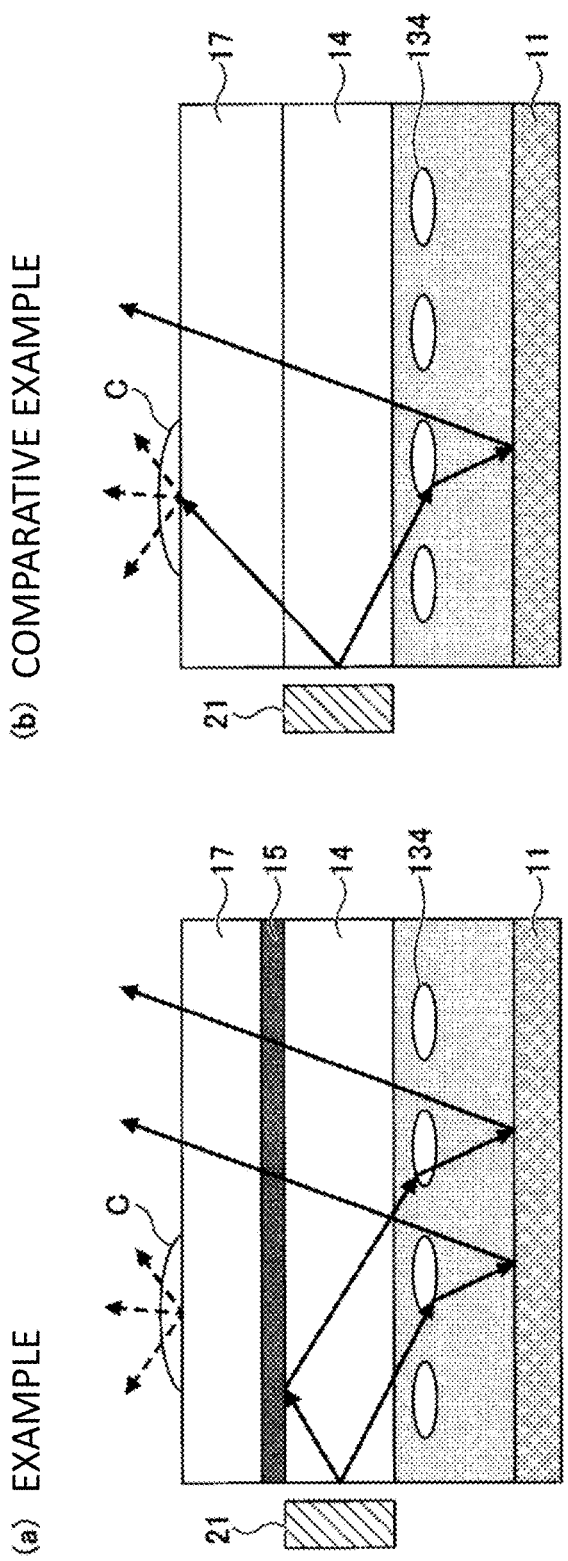

FIG. 8A
(a) INTENSITY DISTRIBUTION WHEN USING HYBRID AIR-CAVITY
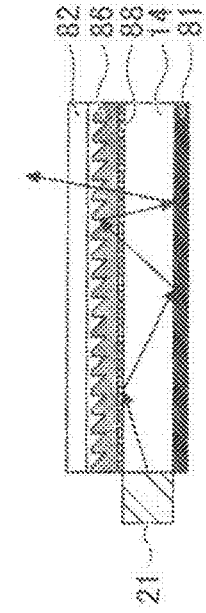
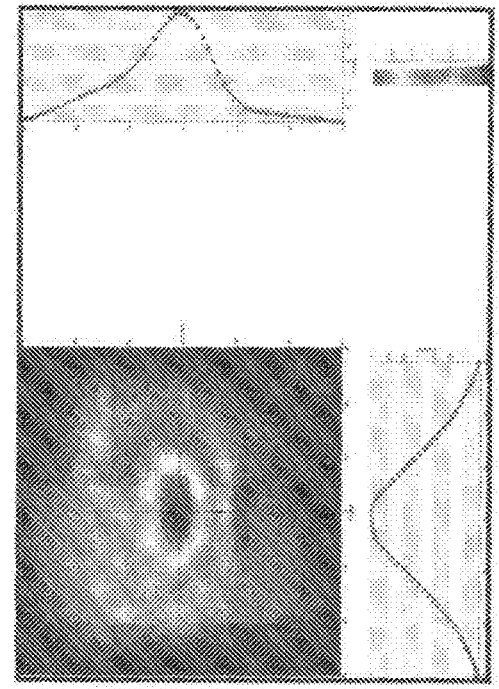
(b) INTENSITY DISTRIBUTION WHEN USING HYBRID PRISM
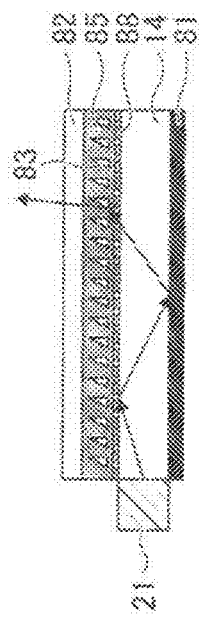
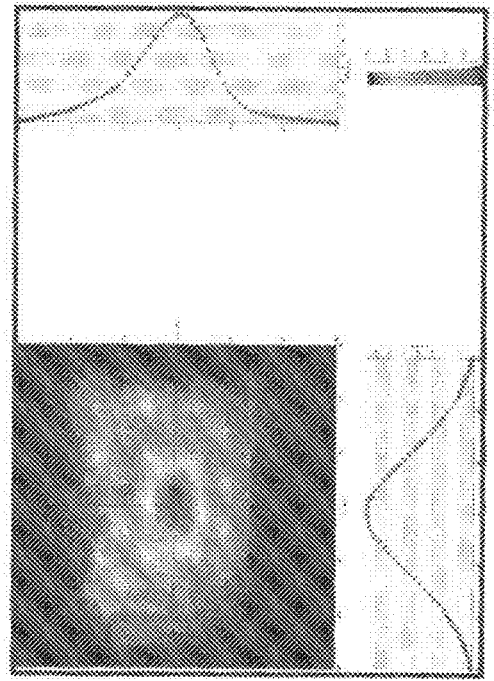

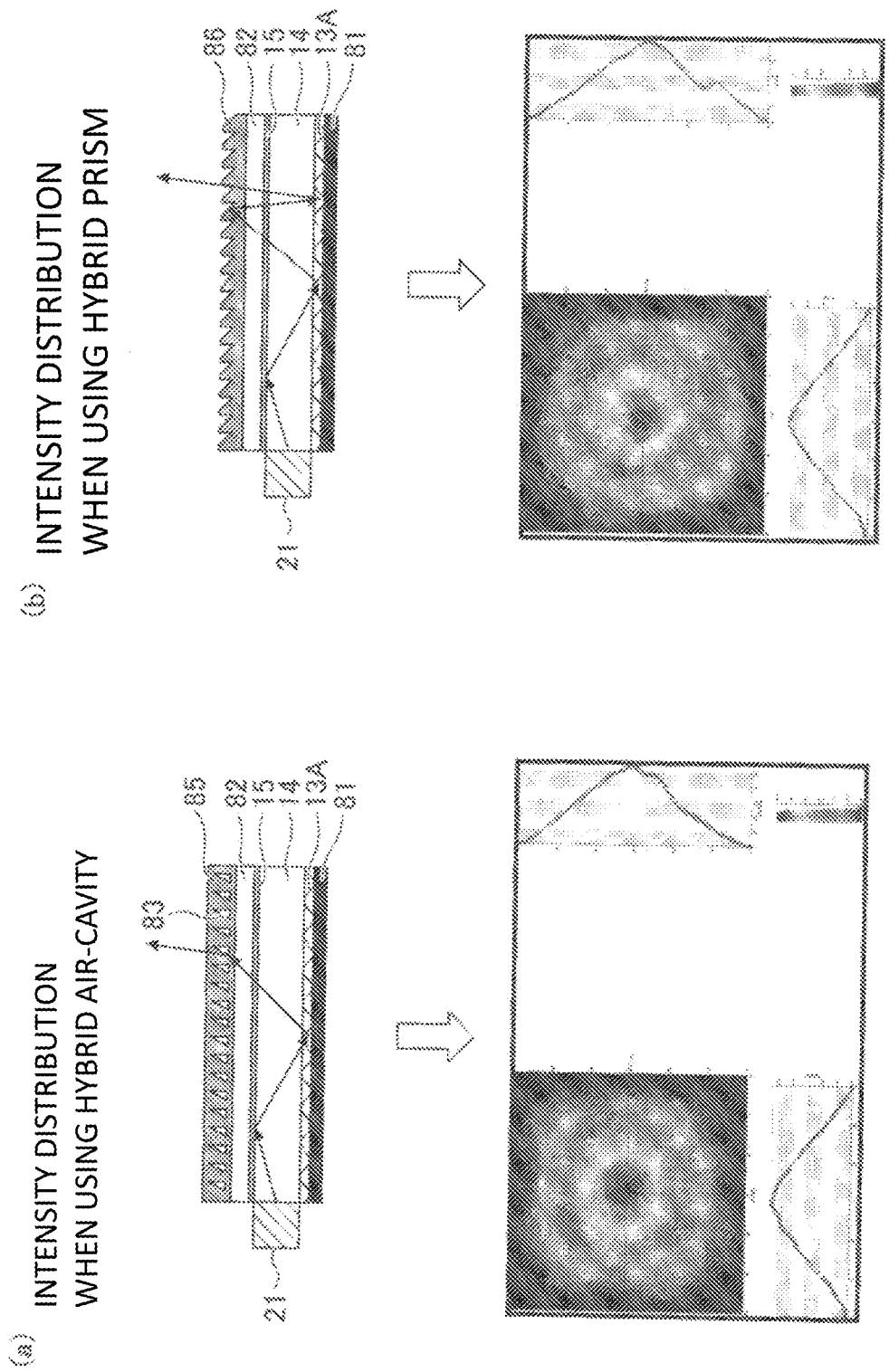

FIG. 12

| | LINEAR PYRAMIDAL PRISM | LINEAR PYRAMIDAL PRISM | LINEAR BLAZED PRISM | LINEAR BLAZED PRISM | OPTIMIZED HYBRID PRISM | WAVED HYBRID PRISM | WAVED HYBRID PRISM |
|---|---|---|---|---|---|---|---|
| PATTERN ANGLE | 50° + 50° | 50° + 50° | 50° + 85° | 50° + 85° | 50° + 85° | 50° + 85° | 50° + 85° |
| RATIO OF ARRANGEMENT: PERIOD/WIDTH | 3 | 2 | 3 | 2 | 1.50 | 3 | 2 |
| FLAT APERTURE DESIGN FILL FACTOR/% | 20.0 | 20.0 | 20.0 | 20.0 | 20.0 | 20.0 | 20.0 |
| PEAK ANGLE OF EXTRACTION/° | 1.5 | 4.5 | 1.5 | 7.5 | -1.5 | 1.5 | 4.5 |
| HEMISPHERICAL EXTRACTION EFFICIENCY/% | 83 | 86 | 88 | 83 | 83 | 81 | 82 |
| MAXIMUM INTENSITY/cd | 99 | 100 | 96 | 99 | 88 | 83 | 86 |
| HORIZONTAL FWHM/° | 39 | 41 | 38 | 45 | 77 | 78 | 75 |
| VERTICAL FWHM/° | 39 | 41 | 38 | 45 | 43 | 40 | 45 |
| AVERAGE SPATIAL LUMINANCE/cd/m² | 15615 | 15621 | 16412 | 14677 | 16739 | 15450 | 15862 |

INFLUENCE OF FINGERPRINT ON LUMINOUS FLUX AT GLASS EDGE

FINGERPRINT SIMULATION AT NINE POINTS

FIG. 17A
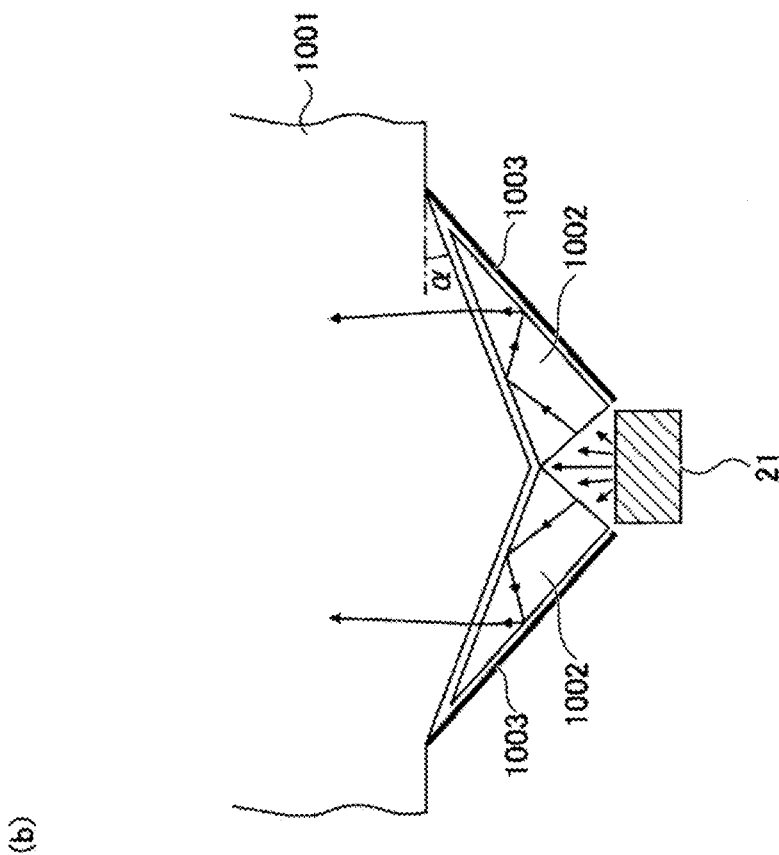
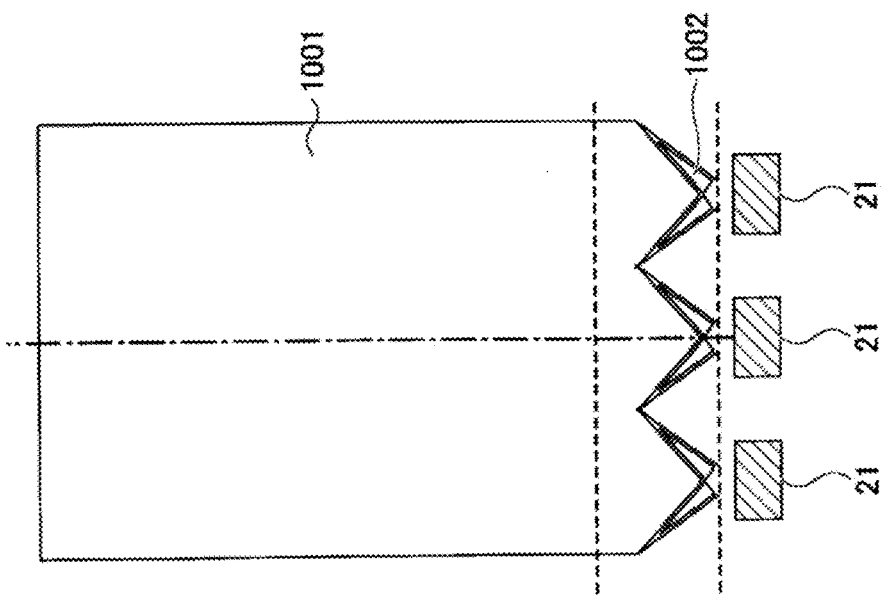

FIG. 17F
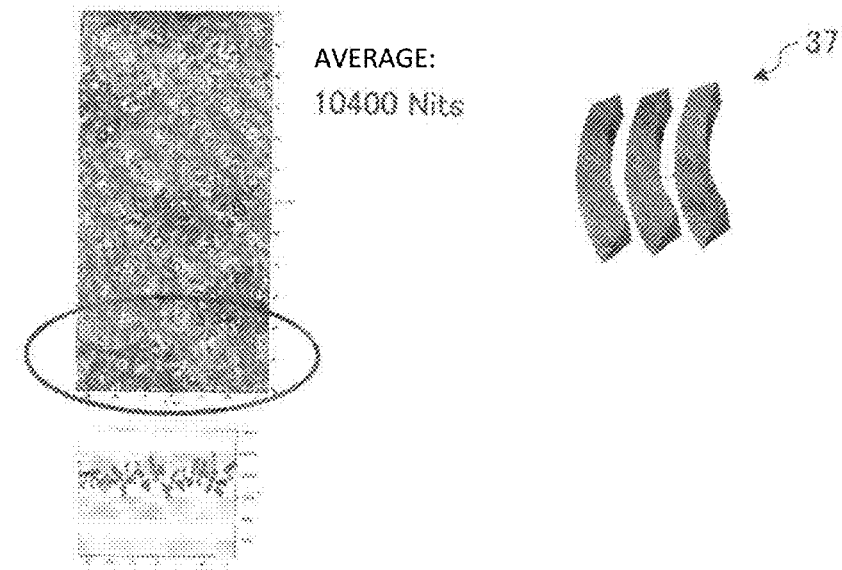
SPATIAL LUMINANCE
AVERAGE: 10400 Nits
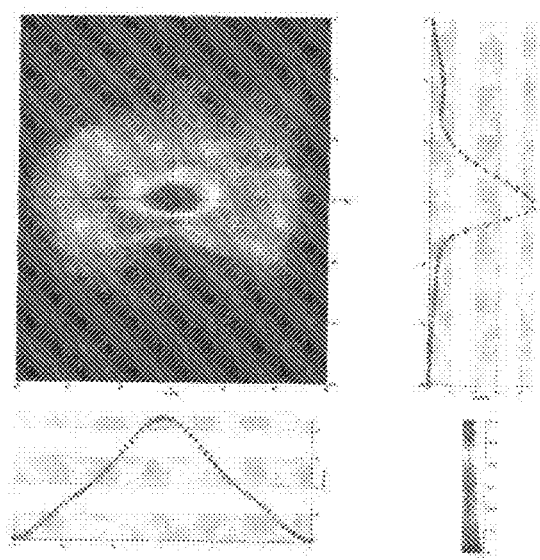
INTENSITY DISTRIBUTION
- FWHM LONGITUDINAL 29°
- FWHM TRANSVERSE 78°
- Peak angle at zero

FIG. 17G

| | CONVENTIONAL MICROLENS BLU WITH XBEF | COMPARATIVE EXAMPLE 1 (AIR CAVITY BLU: LINEAR GRATING) | COMPARATIVE EXAMPLE 2 (AIR CAVITY BLU: CURVED GRATING) | EMBODIMENT (AIR CAVITY BLU WITH INCOUPLING) |
|---|---|---|---|---|
| LUMINANCE | 9500 Nits | 10500 Nits | 10400 Nits | 18400 Nits |
| RELATIVE VALUE | 100% | 110% | 109% | 194% |
| FWHM (X/Y) | 44°/41° | 82°/30° | 78°/29° | 50°/30° |
| END FACE UNIFORMITY | HIGH | LOW | HIGH | HIGH |
| INCOUPLING | NO | NO | NO | YES |

OPTICAL DEVICE

TECHNICAL FIELD

The present invention relates to an optical device, and more particularly to an optical device that includes a lightguide.

BACKGROUND ART

Currently, there are high production costs for the production tools for large-sized lightguides of about 0.5 to 1 m² (square meters) or larger, and their associated light distribution structures. The cost per master fabrication tool item (approximately 1 m² of surface coverage) is beyond acceptable levels. When one takes into account having to form patterns on the entire surface of the lightguide through molding or the like, and mass production thereof, the process is challenging. For this reason, highly efficient and advanced optical solutions that provide higher optical power, lower power consumption, and improved performance have not been realized.

One of the fundamental problems that occur when light is in-coupled to a lightguide is a loss of light when the angle of incidence is smaller than the critical angle of the medium, i.e., at an angle that does not result in total reflection (angle of out-coupling). Light entering the interface between the lightguide and one or more adhesive layers at an angle smaller than the critical angle is not controlled by any optical control structure provided in the lightguide. In this case, 5 to 15% of the light in-coupled to the lightguide passes through the adhesion layer, but such leakage of light is undesirable.

An example application of lightguides is the application to transparent illumination devices. Transparent illumination devices are becoming an important solution in a variety of products, such as general illumination, window/facade illumination, reflection type/transmissive type display illumination, street signboards, and traffic signs. The main challenges in realizing transparent solutions are (1) open structure of the surface relief optical pattern, (2) management of light distribution, (3) stray light control, and (4) high transparency. Among them, (1) open structure exposing the surface optical pattern is not realistic for practical industrial applications because of the risk of soiling, physical defects, etc. Regarding (2), depending on the optical requirements and specifications, the light distribution must be controlled without additional optical sheets, such as brightness-enhanced films, etc. transparent devices, an efficient light extraction configuration is desirable because the insertion of an extra sheet may compromise transparency.

Regarding (3), in surface illumination for use in signboards (signage), displays involved with visual performances, etc., stray light in the direction of the line of sight must be minimized, to avoid a decrease in contrast. However, the optical pattern itself is a source of stray light due to light leakage and Fresnel reflections. Non-laminated devices also produce Fresnel-type stray light on the outer surface.

Regarding (4), optical transparency always depends on the shape and characteristics of the optical pattern and the visibility based on the presence or absence of ambient light. The larger the optical pattern, the easier it is to see; however, even small patterns become visible when the device is illuminated. In particular, when the pattern density is small, a bright spot is formed that produces stray light at the viewing angle.

Some of the above four challenges can be addressed by providing an antireflection (AR) film on the outer surface of the protection cover, but not all of them are solved; thus, this may not be a reliable solution for some applications. Cavity optical elements for transparent illumination have also been proposed, but no consideration has been given to leakage of light (or stray light) control to ensure final quality and performance.

Configurations are known which, with the purpose of suppressing interference fringes, a light absorption layer is provided at an end of a lightguide plate of a backlight that is on an opposite side to the light-incident portion (see, for example, Patent Document 1).

CITATION LIST

Patent Literature

Patent Document 1: Japanese Laid-Open Patent Publication No. 2012-109104

SUMMARY OF INVENTION

Technical Problem

When an optical device having a lightguide is formed from a thin-film stacked body, there is a problem of leakage of light near an end fac, during optically coupling from a light source to the edge of an optical device. In particular, when a layer of a lower refractive index than that of the lightguide is provided on the upper surface or bottom surface of the lightguide, rays which enter the low-refractive index layer at an angle smaller than the critical angle exist near the end face. These rays are not controlled by the configuration for light guiding and light extraction control that is provided in the optical device, but enter the other layers, directly strike the display surface, etc., whereby the light amount is reduced and the light distribution becomes non-uniform. Not only that uniform illumination cannot be obtained, but contrast decreases due to a lack of light amount, whereby visibility, display quality, etc., may be degraded.

The present invention aims to provide an optical device which realizes uniform light distribution and adequate display quality with a simple configuration.

Solution to Problem

In one implementation of the present invention, an optical device includes:
a light guiding layer;
a first optically functional layer provided on at least one of a first principal face and a second principal face of the light guiding layer; and
a ray control structure, at an end of the light guiding layer on a light-incident side, being provided on a surface of the first optically functional layer that is on an opposite side to the light guiding layer, wherein
the ray control structure reduces light which is incident from an edge of the light guiding layer so the first optically functional layer at an angle smaller than a critical angle.

Advantageous Effects of Invention

With the aforementioned configuration and approach, an optical device having uniform light distribution and adequate display quality is realized.

BRIEF DESCRIPTION OF DRAWINGS

FIG. 2D A diagram showing the effect of an optical device according to the first embodiment.

FIG. 8A A diagram showing an example configuration of a lightguide structure using a light distribution filter.

FIG. 8B A diagram snowing an example configuration of a lightguide structure using a light distribution filter.

FIG. 12 A diagram showing simulation results for light distribution filter films.

FIG. 17A A diagram describing problems to be solved by a third embodiment.

FIG. 17F A diagram showing an internal intensity distribution of an optical device according to another comparative example.

FIG. 17G A diagram comparing conventional configurations and optical devices according to comparative examples and the third embodiment with respect to their characteristics.

DESCRIPTION OF EMBODIMENTS

Figure 1A:
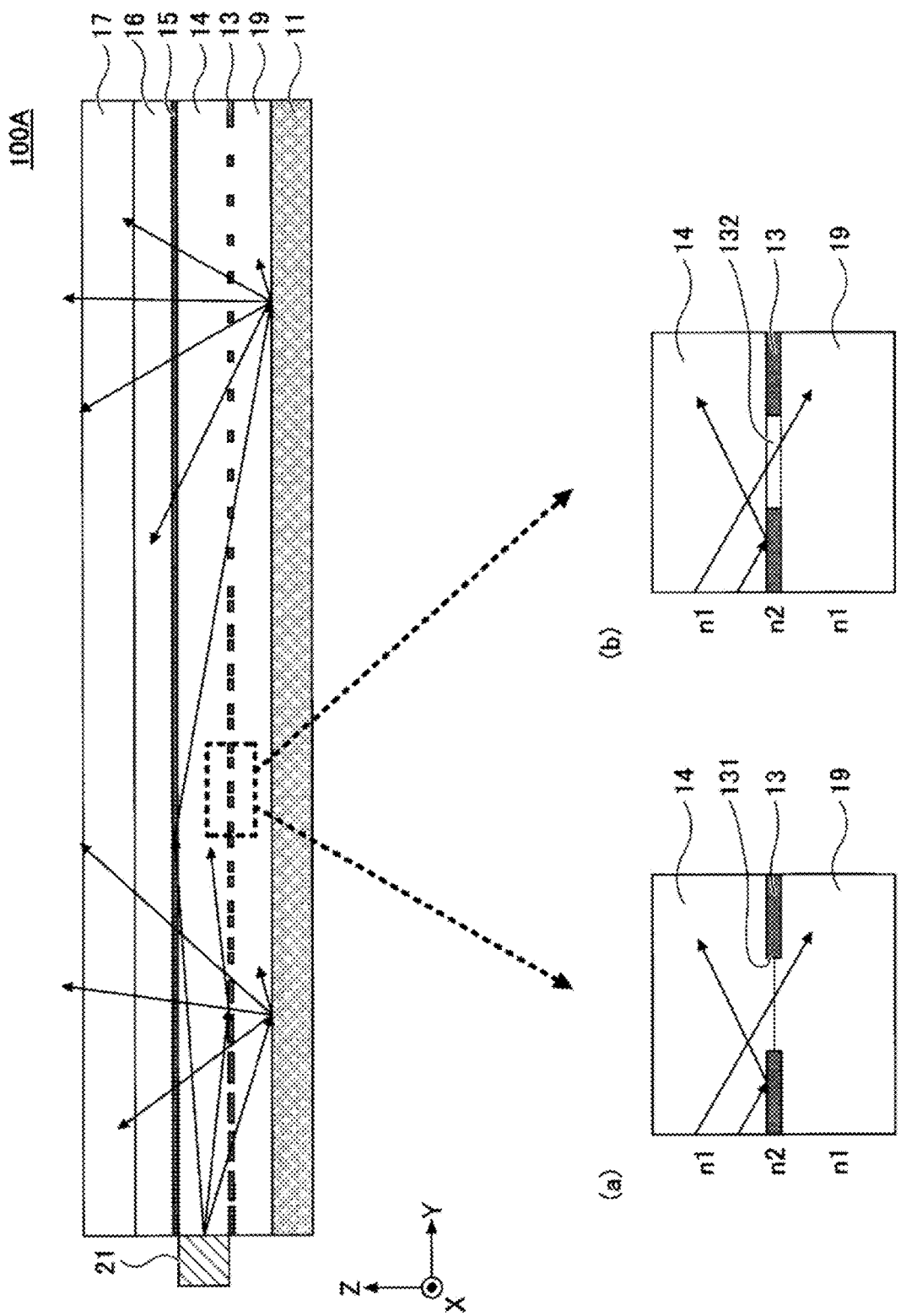
FIG. 1A A diagram illustrating the basic concept of an optical device according to an embodiment.

According to embodiments, an optical device with an enhanced contrast or visibility is provided at a low cost and with a simple configuration. This optical device is applicable to frontlights, backlights, window/facade illumination, signage, signal illumination, solar applications, decorative illumination, light shields, light masks, public/general illumination such as roof lighting, and the like.

In the following description, the term "optical filter" refers to a device or a material used to change the spectral intensity distribution or the state of polarization of electromagnetic radiation that is incident thereupon. The filter may be involved in performing a variety of optical functions, selected from: transmission, reflection, absorption, refraction, interference, diffraction, scattering, and polarization.

The expression "a number of" refers to any positive integer starting from 1, whereas the expression "a plurality of" refers to any positive integer starting from two 2.

The terms "first" and "second" are not intended to denote any order, quantity, or importance, but rather are used to merely distinguish one element from another.

The terms "optical" and "light" are largely utilized as synonyms unless explicitly stated otherwise, and refer to electromagnetic radiation within a certain portion of the electromagnetic spectrum, preferably, but not limited to, visible light.

The term "carrier substrate" or "carrier element" generally refers to a flat, planar member composed of a substrate material generally constituting a layered structure.

In one implementation, an optical device incorporating an optically functional layer(s) is provided. An optically functional layer allows light to permeate over to the end of the light guiding layer, and efficiently extracts light in the direction of the line of sight. In the following description, depending on the situation where it is applied, an optically functional layer may also be referred to as a "light distribution filter (LDF)", an "optical filter layer", "orientation element", or the like. The optical functions of an optically functional layer include at least one of reflection, transmission, polarization, and refraction.

The optically functional layer is used to efficiently in-couple light to the inside of the light guiding layer, and may be realized in various forms, such as a low-refractive index layer, an air cavity, an antireflection film, a microlens, or the like.

The light guiding layer, i.e., a lightguide, is made of an optical polymer, a glass, or the like. The optically functional layer, which is formed on at least one surface or both surfaces of the lightguide, may be a transparent low-refractive index (Ri) filter, a total internal reflection (TIR) filter, or the like. These optical filters may be a) provided directly on a flat surface, b) laminated with an adhesive layer, or c) bonded by chemical surface treatment such as VUV (vacuum UV), atmospheric plasma treatment, or microwave assisted bonding, for example.

The thickness (h) of the optical filter is typically greater than the used wavelength (h>$\lambda$), e.g. 1$\mu$ to 10 $\mu$m. In one example configuration, the optical filter layer is made of a material having a lower refractive index (n2) than the refractive index (n1) of the material composing the light guiding layer. The range of the low-refractive index (n2) value may be appropriately selected according to the application, e.g., not less than 1.05 and not more than 1.45, between 1.14 and 1.41, not more than 1.2, and so on. The optical filter may contain a nano-silica material in a mesoporous film. In that case, in order to maintain the refractive index value of the low Ri cladding, a low-(out) gassing material may be used to cover in between phases, to laminate, or to bond.

The optical filter may be implemented as a total internal reflection (TIR) solution based on available materials, such as $TiO_2$, $BaSO_4$, $SiO_2$, $Al_2O_3$, Al, Ag, dielectrics, high reflection (HR) coating materials, or the like.

An optical device incorporating an optically functional layer(s) (or optical filter(s)) according to an embodiment may be fixedly attached to an optical medium including a poster, a reflection type display, an electronic paper, a window glass, and the like (fixed type), or detachably attached to constitute signage, decorative displays, or the like (non-fixed type).

<Basic Concept>

Figure 1B:
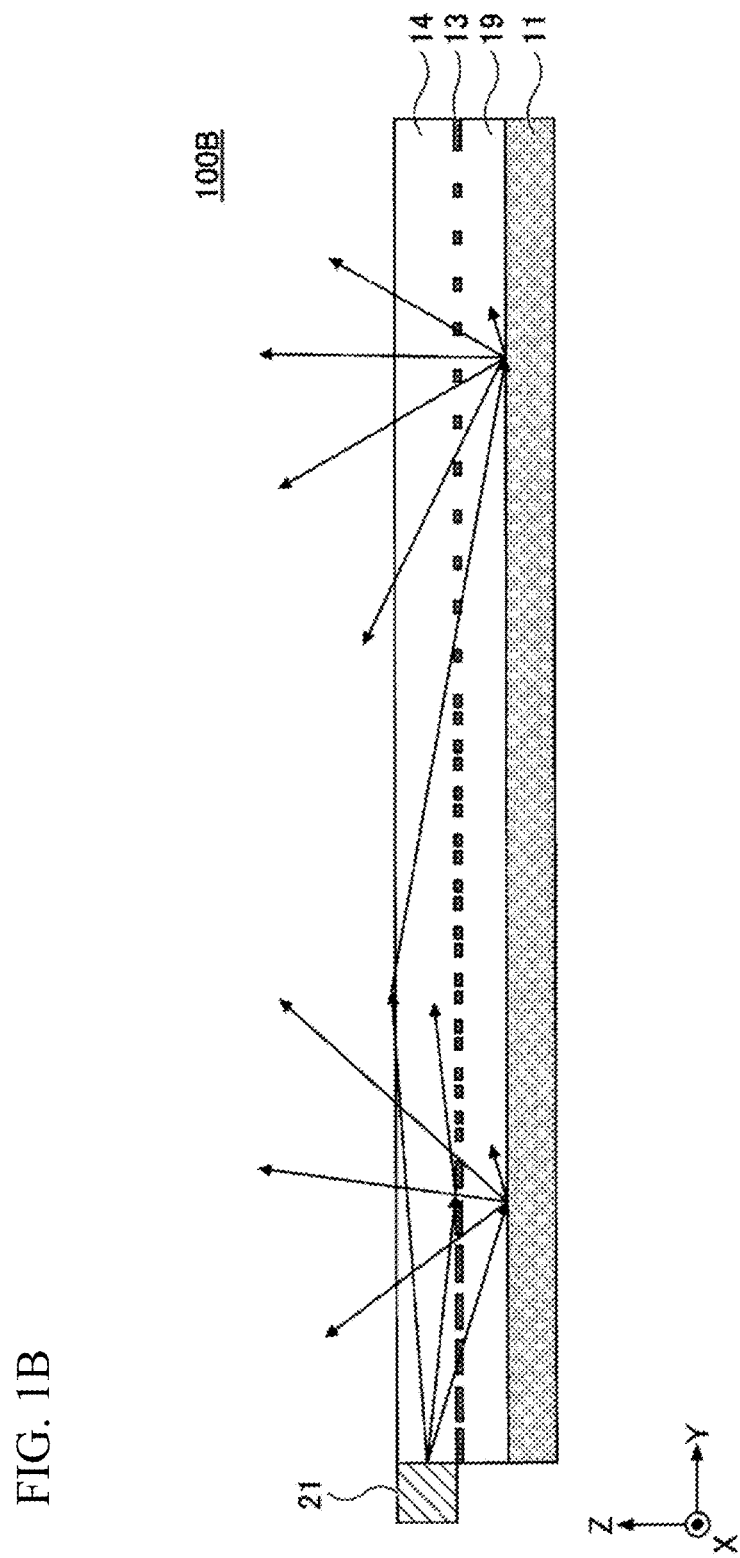
FIG. 1B A diagram illustrating the basic concept of an optical device according to an embodiment.

FIG. 1A and FIG. 1B are schematic cross-sectional views illustrating the basic concept of an optical device according to an embodiment. This basic concept is applicable to all embodiments to be described in detail below. In an optical device 100A in FIG. 1A, an optical medium layer 11, an optical adhesion layer 19, a low-refractive index layer 13 in which optical apertures are made, a lightguide 14, an uninterruptedly-extending low-refractive index layer 15, an optical adhesion layer 16, and a cover 17 are layered in this order. In this example, the low-refractive index layer 13 with apertures and the uninterruptedly-extending low-refractive index layer 15 correspond to optically functional layers.

In this example, the optical medium layer 11 is an image-presenting body, such as a poster, a reflection type display, or an electronic paper, or a transparent window or transparent wall, etc.

The lightguide 14 is a light guiding layer, such that light which is output from a light source 21 (e.g., an LED) that is located on an end face of the optical device 100A propagates through the lightguide 14. In an embodiment, at least one of the optically functional layer 13 and the optically functional layer 15 allows light to be guided to an end face of the optical device 100A on the opposite side to the light source 21. The lightguide 14 is composed of e.g. PMMA or PCR, in which case its refractive index is about 1.49.

The low-refractive index layer 13 with apertures and the uninterruptedly-extending low-refractive index layer 15 may be made of the same material or different materials; however, the refractive index n2 of these layers is smaller than the refractive index n1 of the lightguide 14. The refractive index n2 of the low-refractive index layers 13 and 15 is 1.30 or less, and preferably 1.20 or less.

The refractive indices of the optical adhesion layers 19 and 16 and the cover 17 are desirably approximately equal to, but may be slightly different from, that of the lightguide 14.

In the configuration of FIG. 1A, the viewer observes the optical device 100A from the direction of the cover 17. Therefore, the more light is extracted through the cover 17 toward the viewer, the more preferable it is. The light propagating in the lightguide 14 passes through the apertures 131 or 132 of the low-refractive index layer 13, and is reflected by the optical medium layer 11 and transmitted through the apertures 131 or 132 or the low-refractive index layer 13, so as to be emitted through the cover 17 toward the viewer.

When its angle of incidence on the low-refractive index layer 15 is greater than the critical angle (i.e., when incident at a small angle), the light propagating in the lightguide 14 satisfies the conditions for total reflection, and is reflected toward the optical medium layer 11. Herein, by using the refractive index n1 of the lightguide 14, and the refractive index n2 of the low-refractive index layers 13 and 15, the critical angle θc is expressed as:

$$\theta c = \theta i = \arcsin(n2/n1).$$

θi is the angle of incidence (i.e., the angle from the normal).

The light which is reflected by the optical medium layer 11 is transmitted through the low-refractive index layer 13, the lightguide 14, and the low-refractive index layer 15, and is emitted through the cover 17. The pattern of apertures 131 or 132 in the low-refractive index layer 13 is designed so as to allow the light which has been totally reflected by the low-refractive index layer 15 to be efficiently guided toward the optical medium layer 11, and to allow reflected light from the optical medium layer 11 to be efficiently extracted toward the cover 17.

The apertures 131 are formed by removing portions of the low-refractive index layer 131 through cladding removal, for example. The apertures 132 are formed in a high-density pattern such that the removed portions of the low-refractive index layer 131 are buried with a layer of another optical material, for example. The material to bury the apertures 132 has a refractive index which is equal or similar to the refractive index of the lightguide 14 and the optical adhesion layer 19.

If the low-refractive index layer 15 did not exist on the surface of the lightguide 14 at the light-extracting side (which in this example is the upper surface along the direction of layering), light which is output from the light source 21 and heads directly toward the cover 17 would be transmitted intact through the optical adhesion layer 16 and the cover 17, thus causing a loss of light. Adopting the configuration of FIG. 1A minimizes the loss of light during guiding, thus allowing it to be efficiently guided to the end of the lightguide 14, and also allows the light which is reflected by the optical medium layer 11 to be efficiently emitted through the cover 17. As a result, light of a sufficient amount and intensity is output toward the viewer, whereby contrast and visibility are maintained.

The low-refractive index layer 13 having apertures, and the low-refractive index layer 15 which is a continuous film (i.e., a low-refractive index layer uninterruptedly constituting a uniform surface with a low-refractive index material), function as optical filters to control the traveling path of light which propagates in the lightguide 14. As will be described later, besides refractive indices, antireflection coating structure, optical density, optical constant, etc., may also be adjusted, whereby various functions can be conferred.

The distribution of light to be achieved by the apertures 131 or 132 of the low-refractive index layer 13 may be uniform, non-uniform, or discrete. As a result, a uniform, non-uniform, or discrete image or signal can be formed. The main function of the apertures 131 or 132 is to control the amount of incident light which propagates from the lightguide 14 toward the optical medium layer 11, without out-coupling the light (i.e., by utilizing the conditions for total reflection).

Through adjustments of their dimensions, shape, etc., the apertures 131 and 132 may be produced so as to exhibit other functions, such as scattering, refraction, reflection, or the like. Some of the apertures 131 or 132 may be formed so as to out-couple light, i.e., so as to allow light which has been reflected by the optical medium layer 11 to be transmitted through the cover 17. The apertures 131 or 132 may be formed in shapes such as circles, ellipses, polygons, rectangles, etc., and their size or diameter may be e.g. 1 μm to 100 μm, preferably to be adjusted within the range from 1 μm to 30 μm.

FIG. 1B is a schematic cross-sectional view of an optical device 100B. The fundament al principles of the optical device 100B are the same as in FIG. 1A. In the optical device 100B, an air layer is used as a low-refractive index layer covering the entire surface of the lightguide 14. Air has a smaller refractive index than that n of the lightguide 14, and light which is output from the light source 21 so as to be incident on the interface between the lightguide 14 and the air layer satisfies the conditions for total reflection and thus is reflected into the lightguide 14, and passes through the apertures of the low-refractive index layer 13 to be reflected by the optical medium layer 11. Light carrying information of the optical medium layer 11 is emitted through the surface of the lightguide 14.

With the configuration of FIG. 1B, too, light can be propagated to the end of the lightguide 14 on the opposite side to the light source 21 without waste, and light can be allowed to efficiently proceed to the optical medium layer 11, whereby reflected light can be efficiently extracted.

FIG. 1A presents a frontlight solution in which the lightguide 14 is disposed (e.g., laminated) between layers. FIG. 1B presents d frontlight solution in which the lightguide 14 serves as a top layer. In order to prevent light leakage due to contamination or defects on the cuter surface of the lightguide 14, the outermost surface of the lightguide 14 may be provided with a hard coating having a low refractive index value.

The lightguides 14 of FIG. 1A and FIG. 1B lack any optical patterns such as a light out-coupling pattern. This novel non-patterned lightguide 14 provides illumination on a target such as a display surface, through lamination on the surface/interfaces with the optically functional layers. An interface lamination can direct light onto a target surface such as a display surface, for illumination or light displaying purposes. In order to control passage of light and its direction, both interfaces may be laminated, and refractive index matching may be utilized for the control.

Table 1 shows results of improvement on the light extraction efficiency of the lightguide structure in which the optical apertures 131 or 132 are provided.

TABLE 1

|  | silicone-laminated, patterned PMMA FL | acrylic-laminated, low Ri PMMA FL with apertures | improvement in light extraction efficiency |
|---|---|---|---|
| luminous flux (lumens) | 2.768 | 3.424 | 23.50% |
| illuminance (lux) | 250 | 390 | |

In Table 1, the upper row shows luminous flux (lumen) and the lower low shows illuminance (lux), of extracted light. In a comparison between the low-refractive index and apertured PMMA lightguide which is laminated with acrylic and a surface-patterned PMMA lightguide which is laminated with silicone, the light extraction efficiency is improved by as much as 23.5% in a frontlight solution, because the lightguide 14 is laminated with the low-refractive index layer 13 with apertures.

Light extraction efficiency depends on the refractive index of the lightguide 14 and the refractive indices of the bonded or laminated layer, cladding, coating material, etc. Since the frontlight solution of the embodiment does not have any optical pattern formed on the surface of the lightguide, stray light is minimized and transparency is enhanced, thereby improving the contrast and light extraction efficiency.

First Embodiment

FIG. 2A through FIG. 2F show optical devices according to a first embodiment and example applications thereof. In the first embodiment, while relying on the configuration and performance according to FIG. 1A and FIG. 1B, cavity optical elements may be optionally utilized to improve transparency. In particular, transparency of the lightguide in ON/OFF modes of illumination is improved, and stray light is suppressed so as to allow light to be emitted (or out-coupled) at desired angles. Even if fingerprints, dust, or ocher soil has adhered to the cover surface, at least one of improvement in the transparency of the lightguide and suppression of stray light is realized, whereby sufficient light is extracted toward the viewer for better visibility.

Figure 2A:
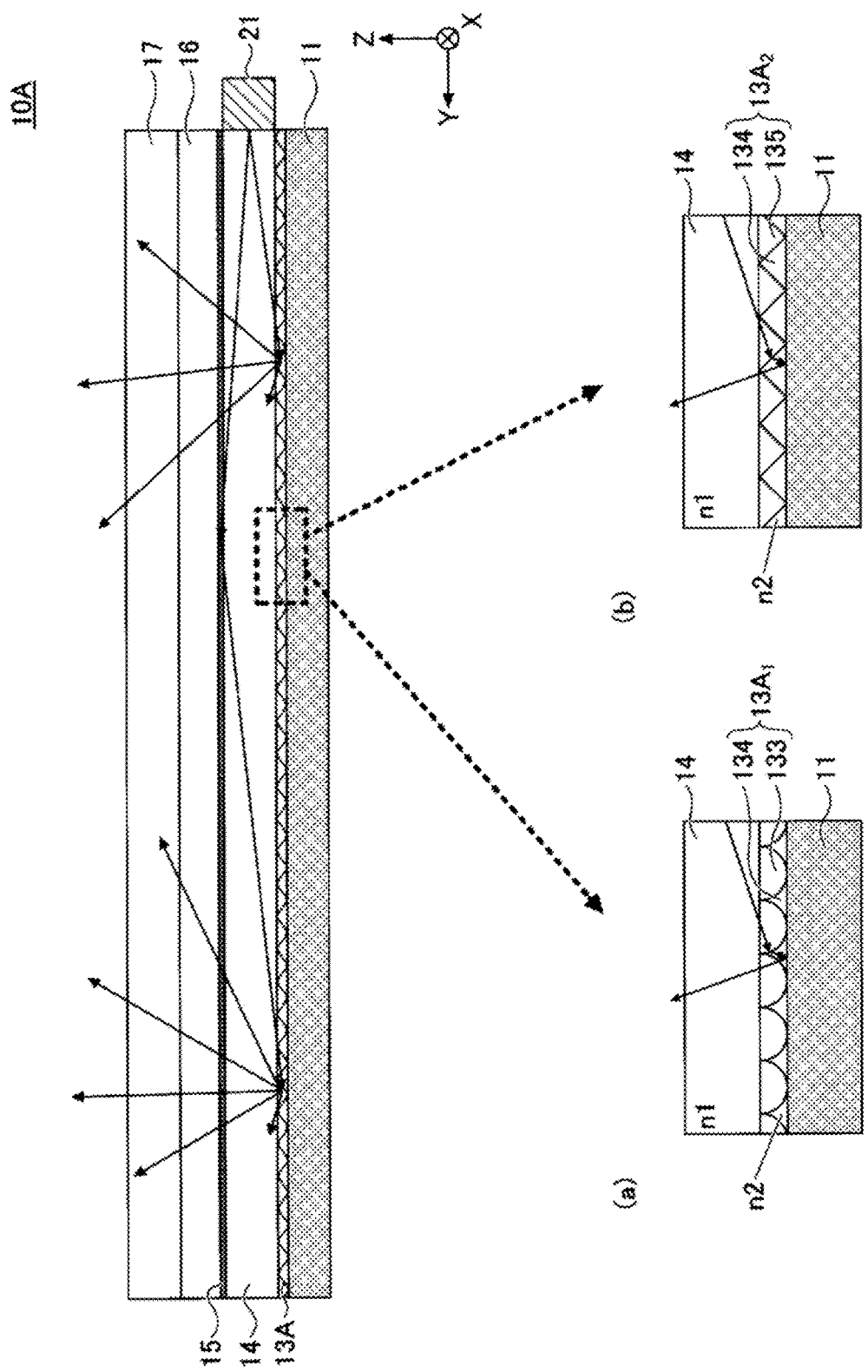
FIG. 2A A diagram showing an example configuration of an optical device according to a first embodiment.

FIG. 2A is a schematic cross-sectional view of an optical device 10A according to the first embodiment. The optical device 10A includes an optical medium layer 11, an optically functional layer 13A having air cavities 134, a lightguide 14, a low-refractive index layer 15 which is uninterruptedly provided, an optical adhesion layer 16, and a cover 17, which are layered in this order.

The cover 17 is intended to protect the optical device 10A; the more transparent it is, the better. It may be made of glass, plastic, etc. and may have a UV-absorbing effect. It is desirably high in strength in terms of a protective layer, but it may also be a thin and flexible layer.

The uninterruptedly-extending low-refractive index layer 15 and the optically functional layer 13A with air cavities 134 are other examples of the optically functional layer 13 which has been described with reference to FIG. 1A and FIG. 1B. The low-refractive index layer 15 allows the light which is emitted from the light source 21 and which enters inside the lightguide 14 from an end face of the lightguide 14 to be sufficiently guided to the end face on the opposite side to the light source 21.

The optically functional layer 13A allows the light which has been totally reflected by the low-refractive index layer 15 or the light which directly enters from the light source 21 to be efficiently guided in the direction of the optical medium layer 11, and out-couples the light which has been reflected by the optical medium layer 11 toward the cover 17.

The optically functional layer 13A includes optical bumps, e.g., microlens-type, lenticular lens-type, and a triangular prism- or ridge-shaped lenses. In pattern (a), as viewed in the direction of layering, an optically functional layer 13A$_1$ is provided on the lower surface of the lightguide 14, and includes optical protrusions 133 of microlens type which are convex toward the optical medium layer 11. Air cavities 134 exist between the optical protrusions 133 and the optical medium layer 11.

In pattern (b), an optically functional layer 13A$_2$ is provided on the lower surface of the lightguide 14 as viewed in the direction of layering, and includes optical protrusions 135 which are triangular prism- or ridge-shaped and which protrude toward the optical medium layer 11. Air cavities 134 exist between the optical protrusions 135 and the optical medium layer 11.

The refractive indices of the optical protrusions 133 and 135 are equal or close to the refractive index n1 of the lightguide 14. The refractive index n2 of the air cavities 134 is the refractive index of air, which is smaller than the refractive index n1 (n2<n1.)

An optical layer having formed thereon a concave pattern of grooves, dots, etc., instead of convex lenses, may be bonded to the bottom surface of the lightguide. In this case, air cavities based on grooves or recesses constitute a low-refractive index pattern, which, as in the case of convex lenses, efficiently refracts incident light in the direction of the optical medium layer 11.

Shapes are transferred via vacuum pressing onto the optically functional layer 13A with air cavities 134 by using a mold, a first portion of whose acrylic plate has desired shapes formed thereon, for example. A solution of a low-refractive index is applied onto a second portion of the plate, which is modified with the transferred pattern, whereby the above is formed.

The optically functional layer 13A may be adhesively bonded to the bottom surface of the lightguide 14 by using an optical adhesive of a refractive index equal or close to that of the lightguide 14.

Similarly to the aforementioned optical device 100A, the low-refractive index layer 15 refracts the light which directly enters from the light source 21 in the direction of the optical layer 13. The light which has been reflected by the low-refractive index layer 15, or the light which directly enters from the light source 21, is refracted at the interface of an optical protrusion 133 or 135 and an air cavity, so as to be guided toward the optical medium layer 11. At the surface of the optical medium layer 11, the light is reflected in the direction of the cover 17. This reflected light does not satisfy the conditions for total reflection at the interface with the low-refractive index layer 15, and thus is emitted intact through the cover 17.

With this configuration, the light which is emitted from the light source 21 sufficiently propagates toward the end face of the lightguide 14 on the opposite side, and the light which has been reflected by the optical medium layer 11 can be sufficiently extracted for output.

In mobile terminals such as smartphones, fingerprints, sweat, or other soil are likely to adhere to the display screen, especially in the outer peripheral region. If the low refractive index layer 15 were not present, the light which has been emitted from the light source 21 in the direction of the cover 17 would be scattered by soil, thus resulting in a large loss of light. By combining the low refractive index layer 15 and the optically functional layer 13A having air cavities 134, loss of light during guiding can be suppressed, and light can re efficiently extracted from the optical device 10A.

Figure 2B:
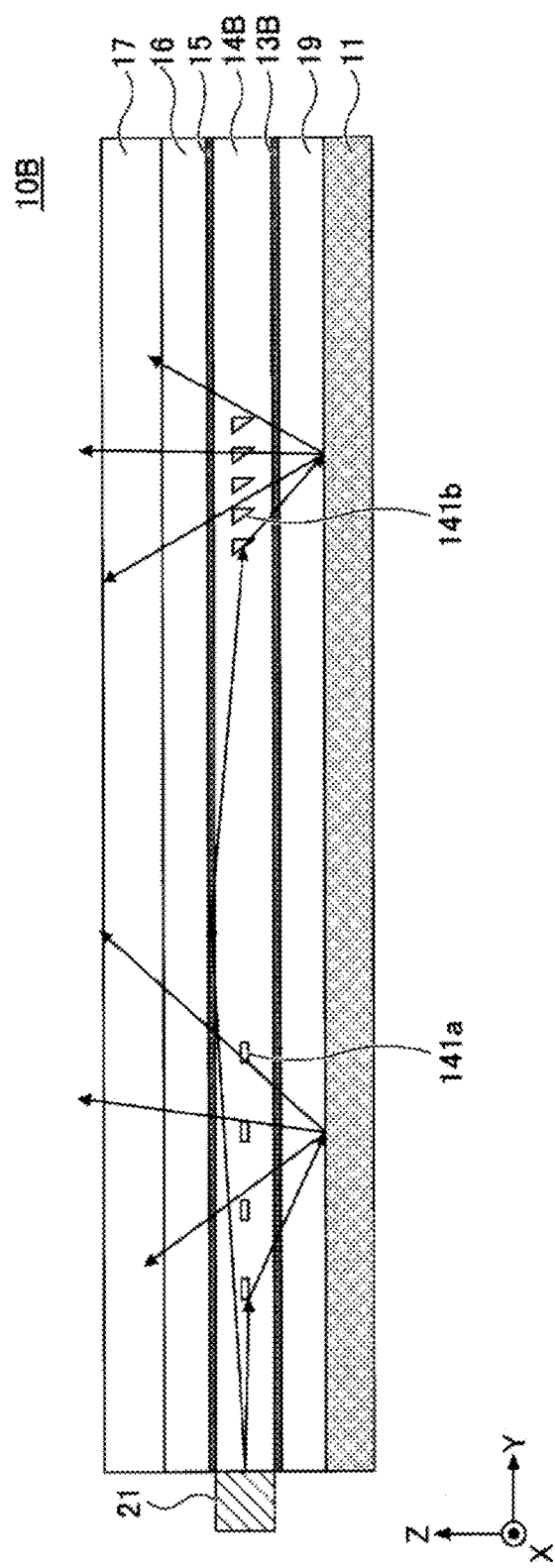
FIG. 2B A diagram showing another example configuration of an optical device according to the first embodiment.

FIG. 2B is a schematic cross-sectional view of another optical device 10B according to the first embodiment. The optical device 10B includes an optical medium layer 11, an optical adhesion layer 19, a low-refractive index layer 13B, a lightguide 14B, a low-refractive index layer 14, an optical adhesion layer 16, and a cover 17, which are layered in this order.

In this example, the low-refractive index layer 13B is a continuous film (i.e., a low-refractive index layer uninterruptedly constituting a uniform surface with a low-refractive index material). The refractive index n2 of the low-refractive index layer 13B and the low-refractive index layer 15n is lower than the refractive index n1 of the lightguide 14. Together with the low-refractive index layer 15, the low-refractive index layer 13B allows the light which is emitted from the light source 21 and which has entered at an end face of the optical device 10B to sufficiently propagate to the end face of the lightguide 14 on the opposite side.

The lightguide 14B includes optical cavities inside. The inside of the optical cavities may be filled with a gas such as air. The optical cavities have shapes which allow the light propagating in the lightguide 14B to be efficiently directed in the direction of the optical medium layer 11. Moreover, they are designed so that stray light or leakage light will rot occur due to refraction at the interfaces of the optical cavities.

So long as stray light or leakage light can be suppressed, the optical cavities may be designed in any appropriate shape, (e.g., optical cavities 141a with a rectangular cross-sectional shape, triangular-shaped optical cavities 141b, etc.). Specific shapes of the optical cavities will be discussed later with reference to FIG. 22A through FIG. 22J.

In the configuration of FIG. 2B, the low-refractive index layer 13B, the lightguide 14B, and the low-refractive index layer 15 serves as optically functional layers, thus creating optical filters. With these optical filters, while sufficiently guiding light toward the end of the lightguide 14B, a necessary amount of light can be guided in the direction of the optical medium layer 11, and reflected light from the optical medium layer 11 can be efficiently extracted to the outside of the cover 17.

Figure 2C:
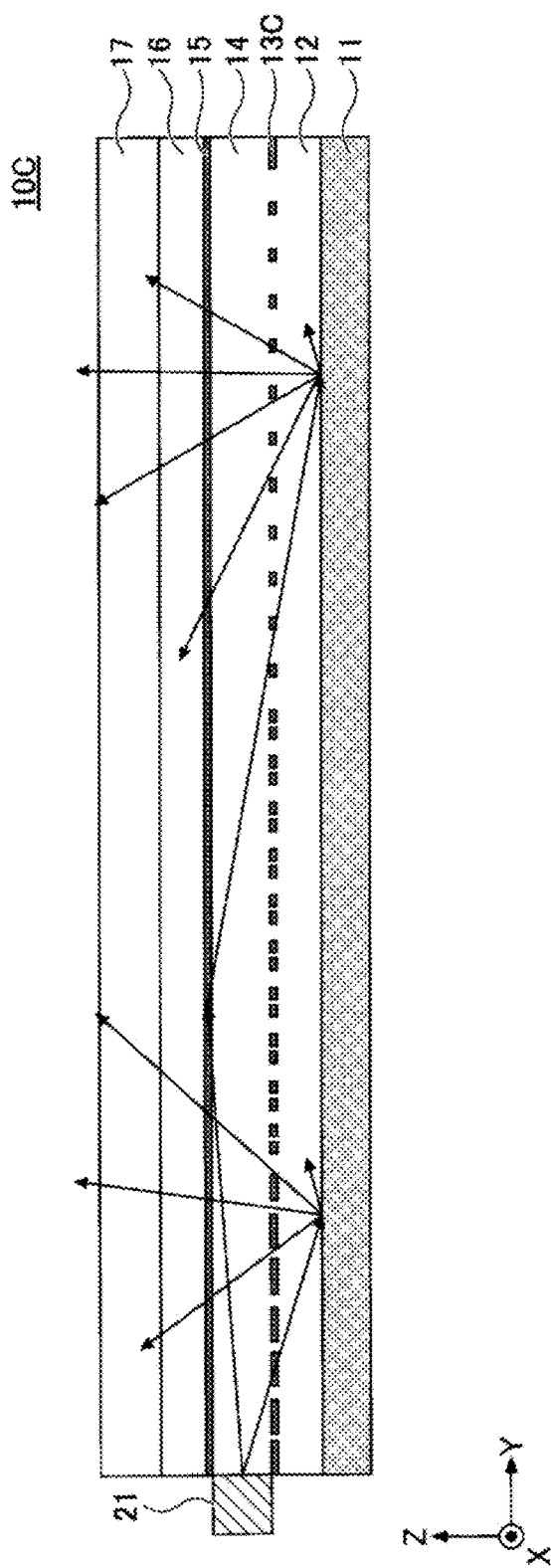
FIG. 2C A diagram showing another example configuration of an optical device according to the first embodiment.

FIG. 2C is a schematic cross-sectional view of another optical device 10C according to the first embodiment. The optical device 10C has a similar configuration to that of FIG. 1A, and includes a low-refractive index layer 15 which is a continuous film (i.e., a low-refractive index layer uninterruptedly constituting a uniform surface with a low-refractive index material) at the surface of the lightguide 14 on the light-extracting side (i.e., the upper surface along the direction of layering), and includes a low-refractive index layer 13C having an optical aperture pattern on the bottom surface of the lightguide 14. The low-refractive index layer 13C and the low-refractive index layer 15 serve as optically functional layers.

The aperture pattern in the low-refractive index layer 13C is formed so that increasingly greater aperture ratios exist farther down the direction of light propagation in the lightguide 14.

In regions of the lightguide 14 near the light source 21, there are large light amounts so that, even if the aperture ratio is small, a sufficient amount of light can still be guided toward the optical medium layer 11. Although the amount of light decreases as it propagates in the lightguide 14, a similar amount of light to that in the neighborhood of the light source 21 is supplied to the optical medium layer 11, thus ensuring that the intensity of reflected light from the optical medium layer 11 is uniform.

As in the case of the optical devices 10A and 10B, the low-refractive index layer 15 allows light to sufficiently permeate over to the end of the lightguide 14, and also the aperture pattern allows light to be efficiently incident on the optical medium layer 11, whereby reflected light is extracted. With the configuration of FIG. 2C, light extraction from the optical device 10C becomes efficient and uniform, whereby visibility further improves.

The configurations of FIG. 2A through FIG. 2C may be mutually combined at least in part. For example, the lightguide 14B of FIG. 2B may be combined with the optical layer 13 with air cavities in FIG. 2A, or the low-refractive index layer 13C with apertures in FIG. 2C.

FIG. 2D is a diagram showing the effect of providing the low-refractive index layer 15 on the surface of the lightguide 14 on the light-extracting side. As Comparative Example, a configuration in which the low-refractive index layer 15 is not provided on the surface of the lightguide 14 on the light-extracting side is shown in (b).

As in (b) of FIG. 2D, when the low-refractive index layer 15 does not exist on the light extracting side of the lightguide 14, when fingerprints, sweat, dust, or other soil nave adhered to the surface of the cover 17, within the light which has entered the lightguide 14 from the light source 21, the light heading directly to the cover 17 will scatter without being guided by the optical medium layer 11, thus resulting in a loss of light.

On the other hand, as in (a) of FIG. 2D, providing the low-refractive index layer 15 on the light-extracting side of the lightguide 14 can prevent light from scattering without entering the optical medium layer 11. Furthermore, by utilizing the total internal reflection in the low-refractive index layer 15, while allowing light to propagate to the end of the lightguide 14, light is allowed to enter the optical medium layer 11 by air cavities 134 or other low-refraction members. By efficiently extracting reflected light from the optical medium layer 11, high contrast and visibility car be realized.

Figure 2E:
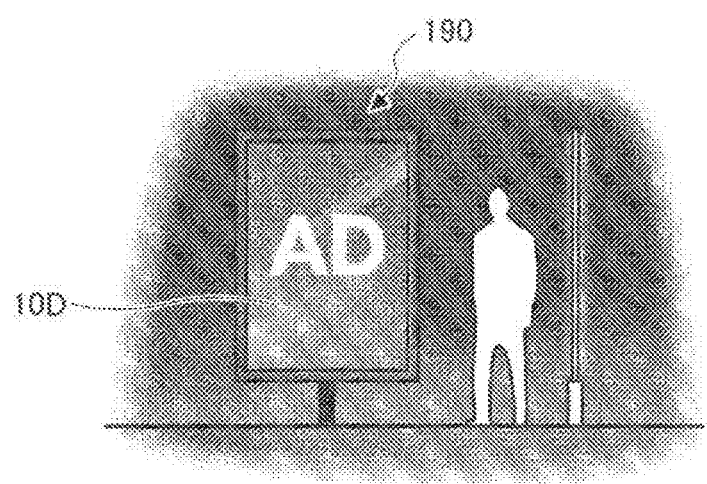
FIG. 2E A diagram showing an example application of an optical device according to the first embodiment.

FIG. 2E shows example applications of the optical devices 10A through 10C to signage 190. In signs, signboards, facade illumination, marketing illumination, indication illumination, and the like, in order to efficiently illuminate a two-dimensional plane, at least one of the aforementioned aperture pattern and air cavities is used to guide light within the lightguide, thus extracting a sufficient amount of light.

Public, signs, displays for marketing, etc., may be a passive type or an active type, depending on the type of display or poster. Although backlight solutions are generally utilized, the trend in recent years has been to use frontlights and to illuminate a reflection type display only when needed.

In the example of FIG. 2E, the above-described optical device 10 may be applied to one surface or both surfaces of the signage 190. In the case where the signage 190 is a both-surface solution, an optical device 10D of both-surface type may be adopted.

Figure 2F:
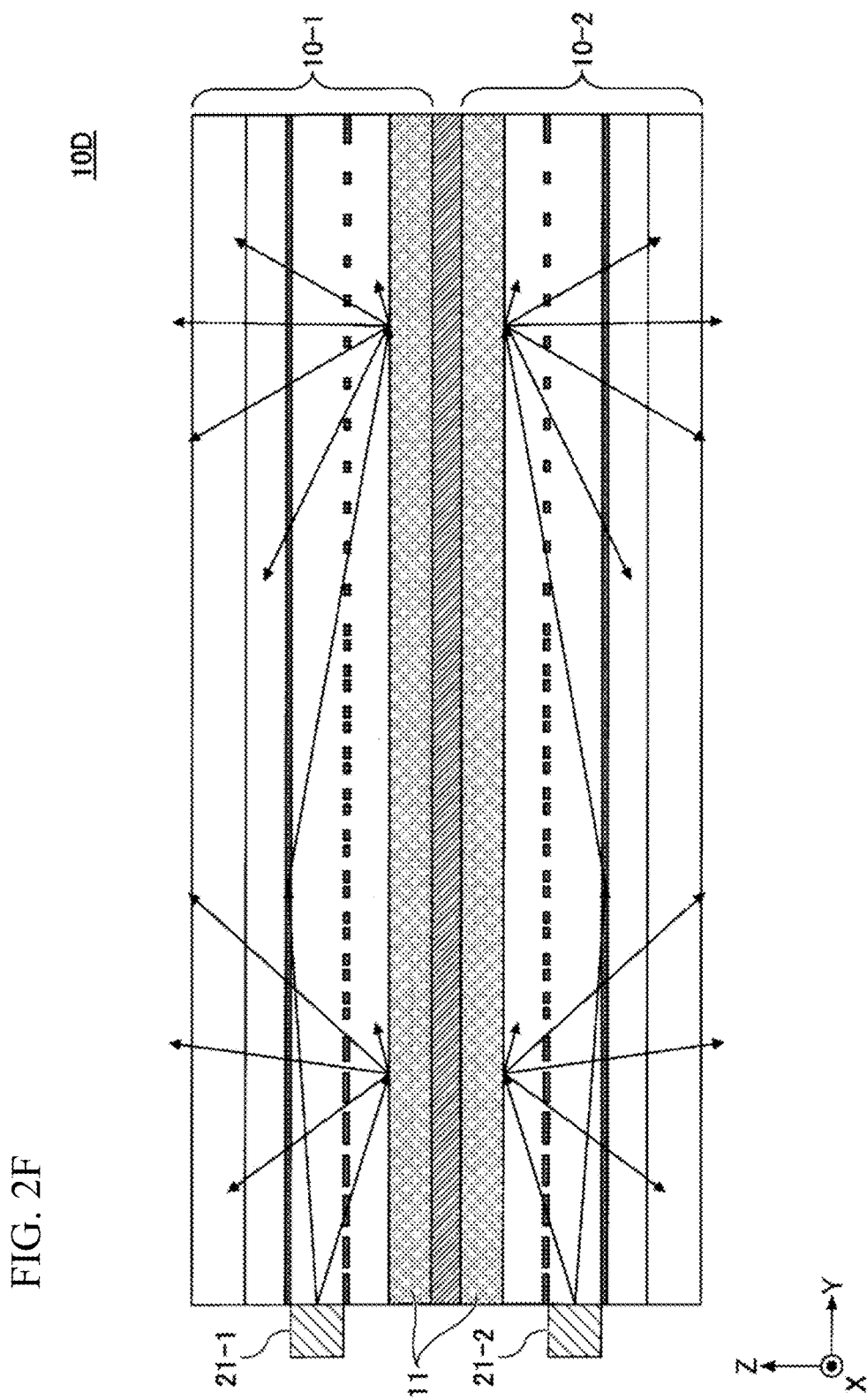
FIG. 2F A diagram showing an example configuration of an optical device for the example application of FIG. 2E.

FIG. 2F is a schematic cross-sectional view of the optical device 10D. The optical device 10D includes a pair of optical devices 10-1 and 10-2 which are attached back to back on the optical medium layer 11 side. Although optical devices 10C of FIG. 2C are attached together in this example, optical devices 10A or optical devices 10B may be attached together. So long as light can be sufficiently guided and light can be sufficiently extracted from the optical medium layer 11, it is not necessary to use optical devices 10 of an identical configuration on both surfaces.

On respective end faces of the optical devices 10-1 and 10-2, a light source 21-1 and a light source 21-2 are disposed, so that light enters the lightguide from the end face, and is guided. With the optical function of the aperture pattern or air cavities, light is guided to the optical medium layer 11 so as to be emitted through both surfaces.

In case an advertisement stand, in particular a roster or the like, is to be replaced, it is preferable that the optical medium layer 11 is detachable from the optical device 10. This will be described later with reference to FIG. 29 and FIG. 30.

In the case of solid-state displays, a permanent lamination is appropriate. Preferably, a rigid or elastic optical material may be used to ensure an optical contact between the lightguide 14 and the optical media layer 11 (display/sign/poster, etc.).

Whether it is a fixed type or a replaceable type, it is important to ensure (optical) contact with the surface being illuminated in order to minimize stray light and maintain a high contrast ratio.

When the lightguide 14 or 14B is used for purposes other than illumination, it is in a passive mode and requires visual transparency throughout the device. Under natural light, such as sunlight, reflective displays do not require illumination, but when the lightguide is in the uppermost layer of the display, as in the frontlight type, sufficient transparency is required to ensure that the visual characteristics of the display are not degraded.

In an active mode, illumination light is emitted through one surface or both surfaces of the transparent lightguide. Depending or the use of the illumination light, appropriate light distribution is made within the range of the viewing angle, especially for illumination for use with displays, thus minimizing stray light.

(A) Criteria in the passive mode (for purposes other than illumination) are: (a) minimization of fogging and suppression of scattering and color shift, (b) minimization of Fresnel reflection, (c) invisibility of the optical pattern/features, and (d) invisibility c changes in pattern density.

(B) Criteria in the active mode are: (a) stray light due to the pattern, (b) Fresnel reflection due to the interface (external reflection), (c) Fresnel reflection due to the pattern itself, and (d) quality of light extraction with suppressed scattering.

The optical device of the embodiment is compatible with either mode, depending on the product and the application. In particular, leakage of light at the surface and stray light due to internal Fresnel reflections can be addressed by at least one of the internal cavities and the antireflection.

FIG. 22A through FIG. 22J show example configurations of the optical pattern. The optical pattern is a pattern that is created, within a medium of the refractive index n1, with a material (n2<n1) of the low-refractive index n2. When the material of the refractive index n2 is air, it is air cavities.

Figure 22A:
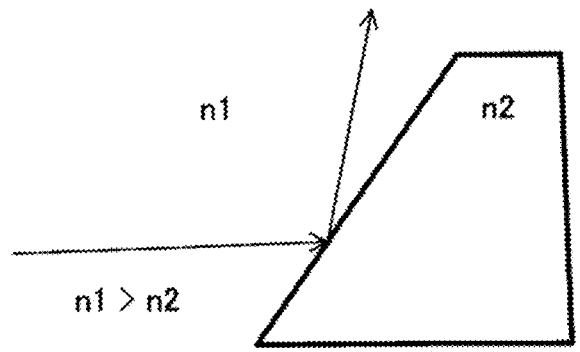
FIG. 22A An example air cavity configuration for stray light suppression.

In FIG. 22A, incident light at the arrow undergoes total reflection (TIA) at the interface of the optical pattern, whereby light is extracted to the outside.

Figure 22B:
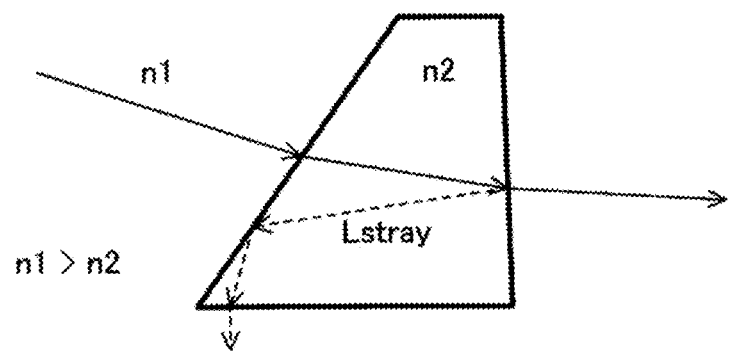
FIG. 22B An example air cavity configuration for stray light suppression.

In FIG. 22B, light is transmitted through the optical pattern, and stray light $L_{stray}$ due to Fresnel reflection is reflected by the second surface on the outgoing side of the optical pattern, again reflected by the first surface on the incident side, so as to be transmitted through the optical pattern.

Figure 22C:
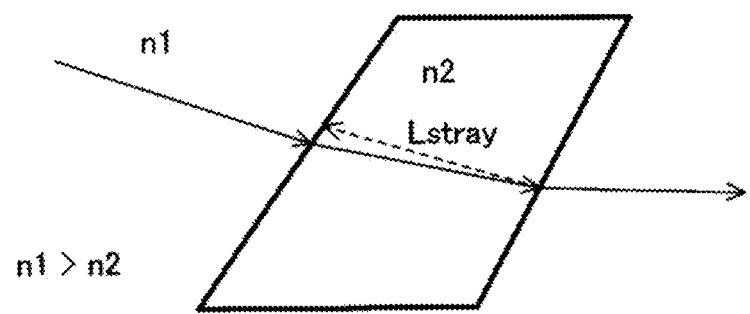
FIG. 22C An example air cavity configuration for stray light suppression.
Figure 22D:
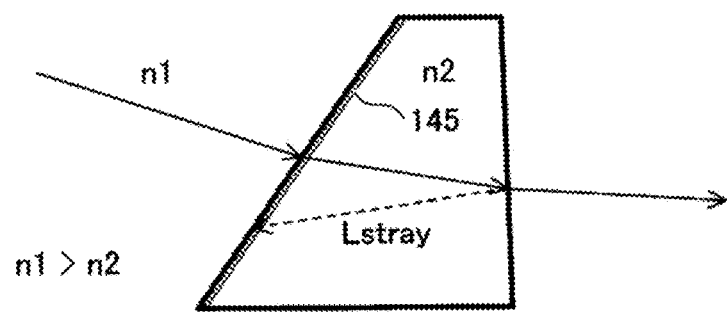
FIG. 22D An example air cavity configuration for stray light suppression.

In FIG. 22C, light is transmitted through the optical pattern, and through direction control of Fresnel reflection at the second surface, stray light $L_{stray}$ is minimized.

In FIG. 22O, an AR film 145 is provided on the first surface of the optical pattern. Light is transmitted through the optical pattern, and the AR film 145 provided on the first surface minimizes stray light $L_{stray}$.

Figure 22E:
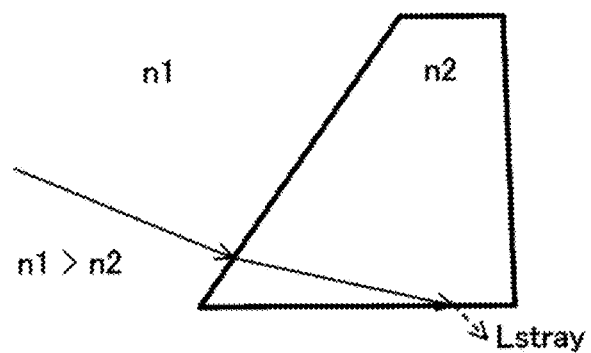
FIG. 22E An example air cavity configuration for stray light suppression.

In FIG. 22E, through refraction at the second surface of the optical pattern, light is transmitted through the optical pattern together with the stray light $L_{stray}$.

Figure 22F:
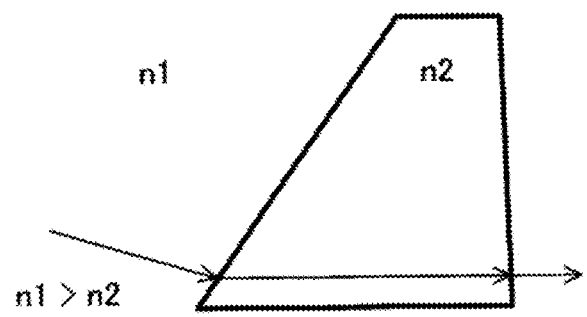
FIG. 22F An example air cavity configuration for stray light suppression.

In FIG. 22F, by restricting the angle of incidence with respect to the first surface of the optical pattern, the stray light $L_{stray}$ is minimized before being transmitted through the optical pattern.

Figure 22G:
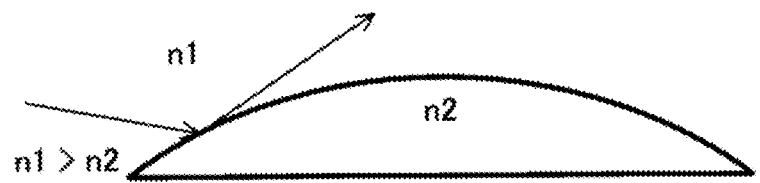
FIG. 22G An example air cavity configuration for stray light suppression.

In FIG. 22G, the optical pattern presents a cross-sectional shape of a convex lens. Light undergoes total reflection (TIR) at the surface of the optical pattern, so as to b extracted to the outside.

Figure 22H:
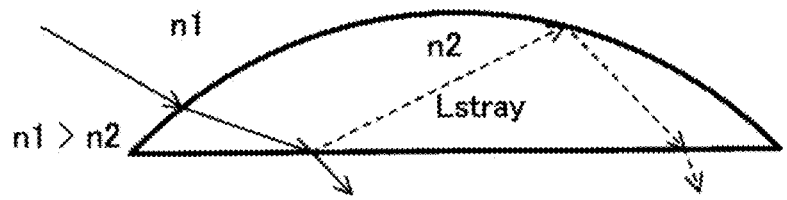
FIG. 22H An example air cavity configuration for stray light suppression.

In FIG. 22H, light enters at the first surface of the optical pattern and is transmitted through the second surface. The stray $L_{stray}$ is reflected by the second surface and the first surface, and thereafter is transmitted through the second surface.

Figure 22I:
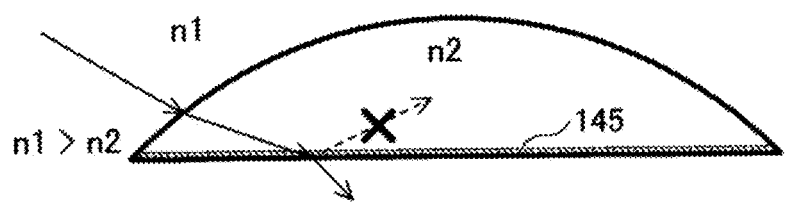
FIG. 22I An example air cavity configuration for stray light suppression.

In FIG. 22I, an AR film 145 is formed on the second surface of the optical pattern. Light enters at the first surface, and is transmitted through the second surface. The stray light, indicated by a dashed arrow, is minimized by the AR film.

Figure 22J:
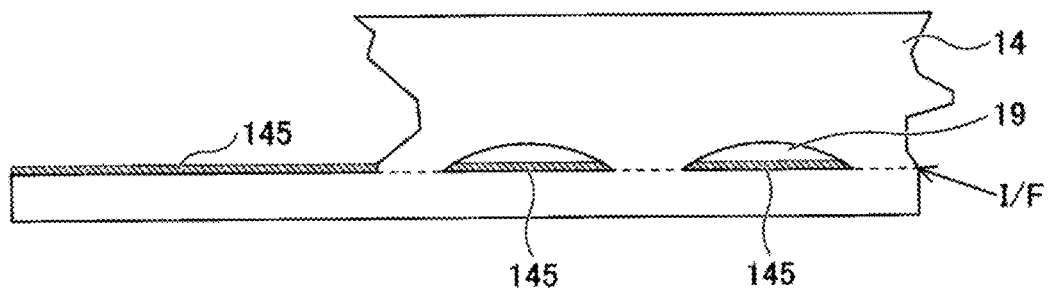
FIG. 22J An example air cavity configuration for stray light suppression.

In FIG. 22J, the optical pattern is provided on the lightguide 14. The optical pattern is formed by attaching an optical material together with a lightguide having the pattern formed thereon (the interface I/F of attaching together is indicated by a dotted line). Providing an AR film at the interface I/F results in the AR film being present at the bottom surface of the optical pattern.

Figure 23:
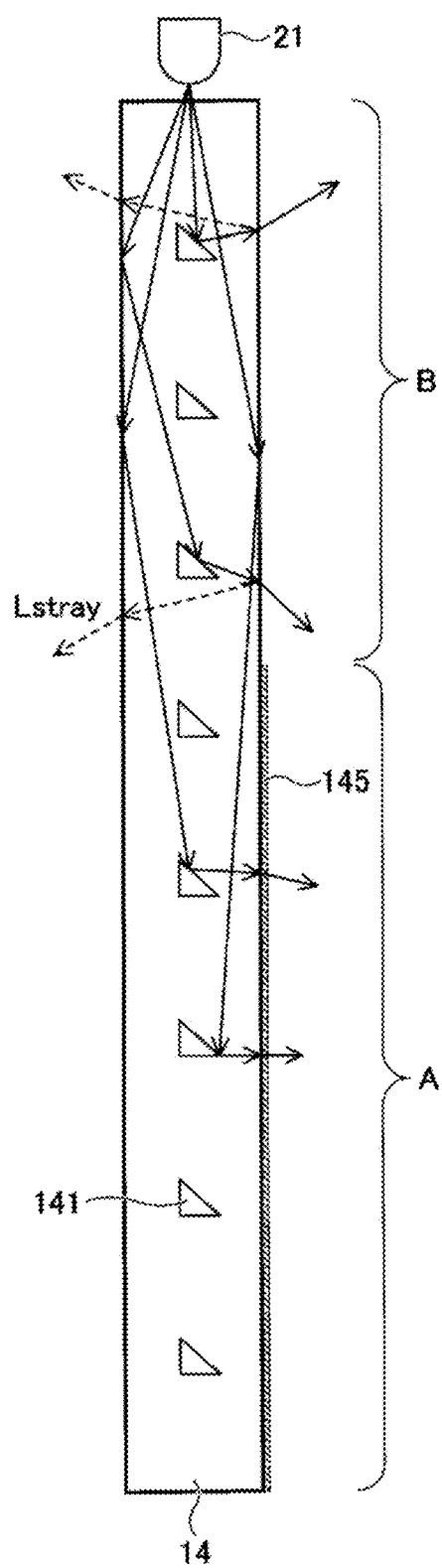
FIG. 23 A diagram describing the effect of stray light suppression based on an antireflection film.

FIG. 23 is a diagram describing the effect of stray light suppression due to an antireflection film. As in region A, where one-surface irradiation occurs, an AR film 145 is provided on the light-extracting surface of the lightguide 14. Light propagating in the lightguide 14 is refracted toward the light-extracting surface by the optical cavities 141 having a lower refractive index than that of the lightguide 14.

In region B, some of the light that has been refracted by the optical cavities 141 is reflected by the light-extracting surface, thus becoming stray light $L_{stray}$ to be emitted through the surface of the lightguide 14 on the opposite side. In the case of both-surface irradiation, stray light $L_{stray}$ may be utilized, without providing the AP film 145.

Figure 24:
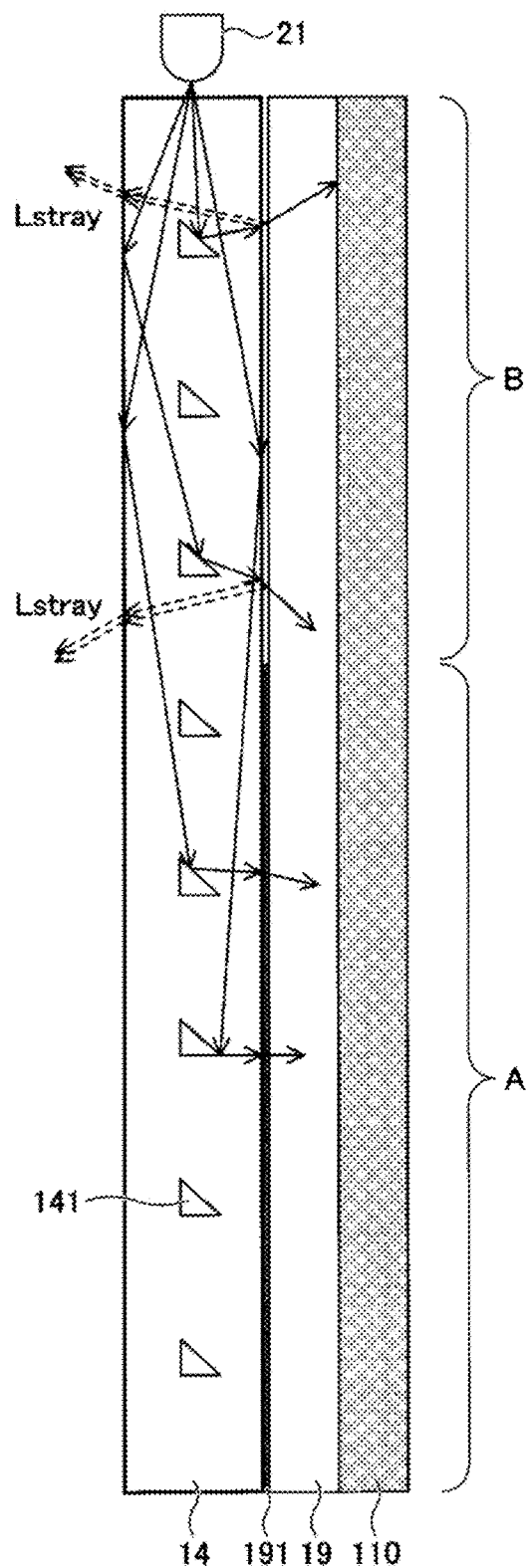
FIG. 24A diagram describing the effect of stray light suppression based on an optical adhesive.

FIG. 24 is a diagram describing the effect of stray light suppression due to an optical adhesive 191. As in a tablet terminal, in the case where the display 110 is lit with a backlight, the space between the lightguide 14 and the display unit (into which the display 110 and the optical adhesion layer 19 are integrated) may be filled with an optical adhesive 191, thereby suppressing stray light $L_{stray}$ (region A). As in region B, where an air layer exists at the interface, some of the light that has been refracted by the optical cavities 141 toward the display 110 is reflected by the air layer, thus becoming stray light $L_{stray}$ to leak outside. By filling the interface with the optical adhesive 191, stray light $L_{stray}$ can be suppressed.

All of the aforementioned optical means (optical patterns such as apertures or air cavities, AR films, optical adhesives, etc.) are designed so as to suppress stray light. In particular, by combining two or more of the features described below, an optimum solution can be obtained.

1) By using an optical cavity pattern, via total internal reflection (TIR) or refraction, essentially all light is extracted through the surface of the optical device (out-coupled), and not allowed to scatter into the cavity (see FIG. 22A and FIG. 22G), thereby minimizing stray light and Fresnel reflection. With a light source, or at least with light in-coupling collimation in the vertical direction, the angle of incidence with respect to the lightguide may be restricted.

2) At the first surface of the optical cavity pattern, most light is out-coupled to the light-extracting surface, while partially transmitted light is redirected into the cavity from the interface of the cavity so as to be guided to the second surface, thus suppressing leakage light or stray light (see FIG. 22E, FIG. 22F). This configuration is a combined solution, where the first surface of the pattern profile is designed with a limited angle of incidence (a critical angle that can avoid leakage light or stray light). The angle of incidence can be restricted by using an optical collimation element (or, when the angle is large, by using a light absorption layer).

3) When an asymmetric optical cavity pattern is used, the first surface serves as a light extraction/out-coupling surface, while the second surface serves as a surface for transmission or redirection, without allowing out-coupling. This prevents unwanted Fresnel reflection from directly out-coupling to the outside from the lightguide. When a periodic pattern is used, the second surface works in cooperation with the next surface in the pattern so as to improve light orientation, light extraction/out-coupling, and other performances.

4) When a symmetric optical cavity pattern is used, the first surface serves as a light extraction/out-coupling surface, while the second surface is dedicated to transmission or redirection without allowing out-coupling, thus minimizing Fresnel reflection in any undesirable direction (see FIG. 22C).

5) When an optical cavity pattern is used, an antireflection coating or an antireflection coating structure may be adopted for the first surface and/or the second surface. In order to minimize Fresnel reflection, an AR pattern or multilayer coating, or a low-refractive index coating may be used to provide wide-range AR (see FIG. 22D, FIG. 22I). An optical cavity pattern and an AR structure/coating may together provide a multi-functional hybrid configuration.

6) When a profile of the optical cavity pattern is created, an AR coating or an AR pattern may be provided on the second surface having a flat surface. Such optical cavities can be formed by attaching together a first film having cavity shapes formed on one surface and a second film having an AR coating formed on one face. The optical cavities do not have any interface of attaching together, and thus an active AR surface is obtained.

7) When an optical cavity pattern is formed on the lightguide through one-surface irradiation, undesirable Fresnel reflection can be minimized by providing an AR layer (an AR coating or an AR pattern) on the light-extracting surface. In the case of both-surface light extraction, the AR layer may be omitted (see FIG. 23).

8) In the case where an optical cavity pattern is to be formed on a lightguide one of whose surfaces serves as a light-extracting surface for the display surface, an optical adhesive is injected at the contact surface with the display unit, thus minimizing undesirable Fresnel reflection (see FIG. 24).

9) in the case where one surface serves as a light filtering surface without forming an optical pattern thereon, light is transmitted through the optical apertures, and desired illumination light is supplied to the display surface through optical bonding. The light filtering surface may be implemented as a low-refractive index cladding having a light-transmitting surface (see FIG. 1A, FIG. 1B, FIG. 2C).

Transparent lightguides and transparent cavity optics have a variety of applications, and the optical pattern itself is designed and optimized accordingly depending on the application, manner of application, and other factors. For example, at least one optical pattern provided on the optically functional layer may be formed as a relief selected from grooves, dents, dots, pixels, etc. The relief may be a pattern having, for example, a local (in the film thickness direction) concave or convex surface and may be selected from binary, blazed, slanted, prismatic, trapezoidal, hemispherical, or other shapes. Alternatively, the relief may be a long shape, e.g., linear, curved, waved, or sinusoidal.

In the case of transparent illumination, it is desirable to use a high performance optical material with low color shift and scattering for the optically functional layer. In particular, it is desirable to use good optical materials in the lightguide, OCA (optically clear adhesive), and low-refractive index layer. Desirably, scattering and stray light are suppressed in the low-refractive index layer with optical apertures. Since physical apertures in the stack laminated along with other refractive index materials can cause light scattering, fogging, and a decrease in the contrast ratio, a low-refractive index layer with optical apertures based on local changes in the refractive index, as shown in FIG. 1A, FIG. 1B, and FIG. 2C, may be one effective configuration. A low-refractive index layer with optical apertures can be formed by inkjet printing, inverted offset printing, laser and electron beam processing.

The configurations of FIG. 1A and FIG. 2A through FIG. 2C are also effective as frontlight solutions. On at least the light-extracting surface of the lightguide, the low-refractive index layer 15 is provided, so as to guide light over to the end on the opposite side to the light source 21. As shown in FIG. 1B, a frontlight solution in which the light-extracting surface of the lightguide 14 is the uppermost layer is also effective, but in order to prevent leakage of light due to soil or defects on the outermost surface, preferably a hard coating of a low refractive index value may be deposited.

In the case where the optically functional layer includes an optical pattern, the optical pattern density may be constant, or the pattern density may have a gradient as shown in FIG. 2C. An optically functional layer including an optical pattern can be designed for applications such as transparent backlights, frontlights, illumination panels, and the like. The light extraction pattern can be designed for a narrow range of light distribution, a wide range of light distribution, elliptical, symmetric, asymmetric, or other light distributions. The light extraction efficiency can be maximized by continuous periodic profiles or local profiles such as pixels. In the case of transparent solutions, the light extraction efficiency can be maximized by minimizing fogginess and stray light. A continuous and efficient 3D optical pattern may be provided. In this case, it can be used for a plurality of applications, reducing master fabrication and product costs and allowing for larger product sizes.

As the basic optical profile to be provided on the optically functional layer, either a surface relief pattern or a cavity optical pattern may be used. In the case of a cavity optical pattern, the optical cavities may be filled with a gas, fluid, or solid material, preferably air, to confer a total internal reflection effect to the optical surface. The optical pattern can be given different profiles, e.g., binary, slanted, blazed, prisms, or microlenses, based on diffraction or refraction optics.

The lightguide is formed by using a coating layer, a film on a substrate material, a light-guiding substance, etc. A light distribution/extraction film with light filtering apertures may be applied to the flat surface of a substrate material that lacks a pattern. Using a functional film allows the lightguide to be designed to be either thin or thick, by using different materials such as PMMA, glass, etc. All optical functions may be integrated on an "all-in-one" film. The main optical functions are: control of uniformity by filter apertures; and out-coupling with a light distribution which is determined by the optical cavity pattern. These two main functions may be realized separately as two different phases. Additional functional layers, such as a diffuser, may also be incorporated.

An optical filter with a low-refractive index layer may be adopted directly to the surface of the substrate material in order to form apertures, and a functional film having an optical pattern for light extraction may be adopted over the optical filter. This configuration ray reduce the number of layering or assembly steps. The layered structure of an optical filter and a functional film may be adopted on one surface or both surfaces of the lightguide.

The distribution and extraction of light is based on a film concept, such as at least one optical pattern layer, surface reliefs, a cavity pattern, etc. A plurality of optical patterns may be adopted to form a single film, into which at least one cavity optical layer may be integrated. By utilizing cavity optical elements such as air cavities, a plurality of layers can be bonded to each other. In the case of rot employing surface reliefs such as a concave-convex pattern, the film can be completely integrated, and the interfaces can be adhesively bonded to each other. The integrated light filter cladding may be gathered within a single film having an optical pattern.

The optical pattern can be formed on the optically functional layer in various forms. For example, it may be air cavity optics embedded within the layer (an optically functional layer having optical cavities within the layer), or it may be formed as an alternating pattern of optical bodies and cavities placed at an interface with a transparent laminate layer, a reflective laminate layer, a colored laminate layer, etc.

A lightguide 14B with an optical pattern (e.g., air cavities) for light refraction/extraction inside may be used as a light filter, as shown in FIG. 2B, without using apertures. A continuous film of uniform low-refractive index material is provided on both surfaces of the lightguide 14B. The optical pattern is integrated inside the lightguide 14B. As the optical pattern, microlenses, a blazed pattern, a slanted pattern, a discrete pattern, a pixel pattern, etc., may be arranged in the form of a periodic or diffraction grating. A lightguide with uniform low-refractive index layers formed on both surfaces may be adhesively bonded to the other layers with an optically clear adhesive (OCA). The OCA has a higher refractive index than that of the low-refractive index layer, preferably having the same refractive index as that of the lightguide.

When the optically functional pattern is formed as cavities embedded in a matrix layer, the matrix and the functional cavities are disposed alternately. In this case, the optical function is set by at least one of the dimensions, shape, period and cross-sectional arrangement of the optically functional cavities. As mentioned above, the cavities may be filled with air or may be filled with other gases, fluids, liquids or solids.

The lightguide of the embodiment may be combined with a commonly-used polarizer, such as a wire grid polarizer. The polarizer can be directly adhesively bonded or layered onto the flat surface of the optically functional layer. When the optical pattern provided on the optically functional layer is configured to functionally cooperate with the wire grid polarizer, luminance can be increased.

The optical device of the embodiment can be applied to signage, signboards, facades, marketing, indicator lights, etc., as described above. In this application, with or without an aperture or cavity pattern, the low-refractive index layer can be used to light the whole area, a discrete regions, any arbitrary two-dimensional shape, etc. As an example, with or without a coupling pattern, the aperture layer can be integrated into a color film or figured film to form a layered film. By cutting the layered film into a desired shape and laminating it on the light-guiding sheet, the configurations of FIG. 2A through FIG. 2C can be obtained. The stacked body including the optically functional layer and the lightguide can be adhesively bonded, in a fixed (permanent) or a detachable manner, to the optical medium layer 11, such as a poster, a display, etc.

When a convex optical pattern is present on the contact surface with the optical medium layer 11, as shown in FIG. 2A, the optical pattern may be formed with an elastic, transparent optical material. In particular, when it is adhesively bonded to the optical medium layer 11 in a detachable manner, it is preferably an elastic pattern. When the optical medium layer 11 is a replaceable poster or the like, the optical pattern is desirably made of an elastic material that is durable and reliable enough to withstand multiple removals and re-bonding.

In the first embodiment, a uniform low-refractive index film 15 without apertures is provided on a surface of the lightguide 14 at the light-extracting side, whereas an optically functional layer 13 having an optical pattern is disposed on the surface of the lightguide 14 on the opposite side to the light-extracting surface. The optical pattern may be designed so as to out-couple incident light from the lightguide 14 at a negative angle, and out-couple reflected light from the optical medium layer 11 at a positive angle. The optical pattern is designed so that light is incident at a smaller angle than the critical angle. As a result, while light which has been totally reflected by the low-refractive index layer 15 is distributed to the end of the lightguide 14, light can be efficiently guided in the direction of the optical medium layer 11 serving as a bottom reflector (i.e., coupled), and light can be efficiently extracted (i.e., out-coupled).

Second Embodiment

Figure 3A:
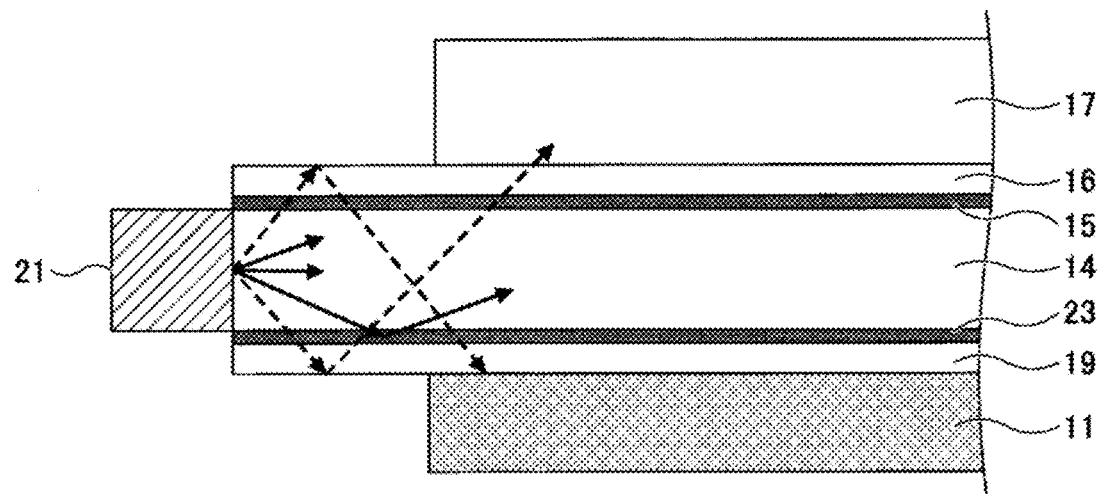
FIG. 3A A diagram describing problems to be solved by a second embodiment.
Figure 3B:
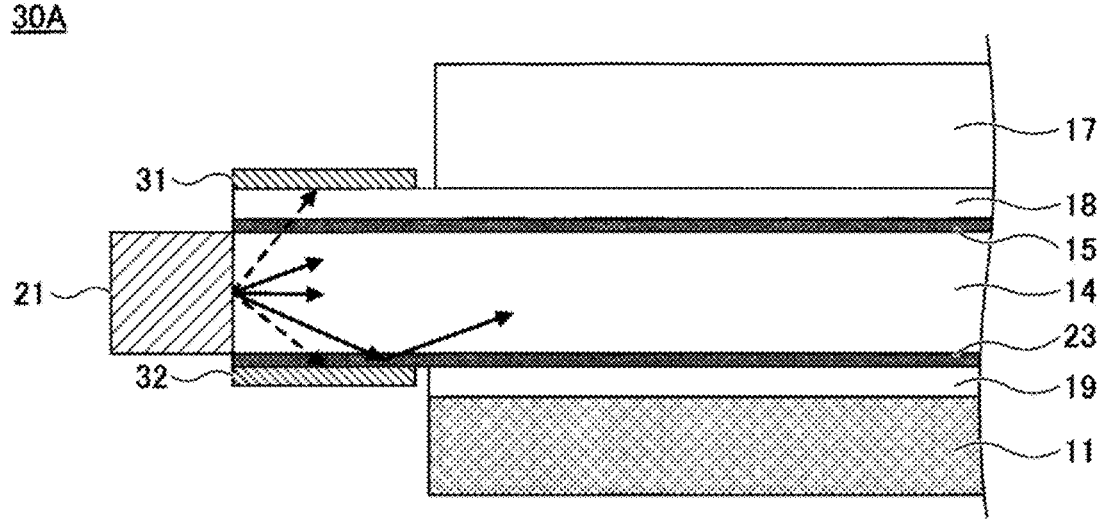
FIG. 3B A diagram showing an example configuration of an optical device according to the second embodiment.
Figure 3C:
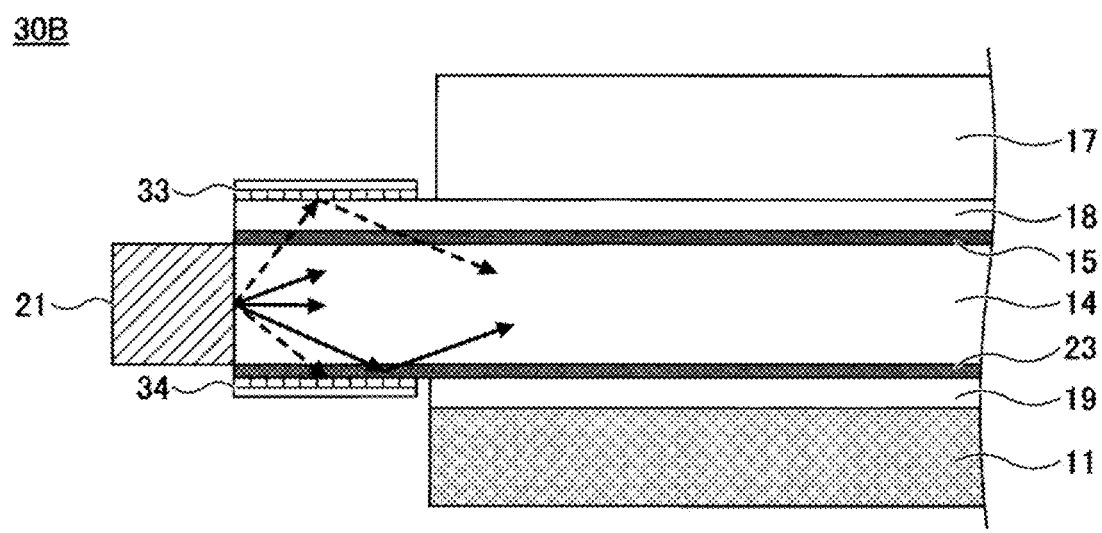
FIG. 3C A diagram showing another example configuration of an optical device according to the second embodiment.

FIG. 3A is a diagram describing problems to be solved by a second embodiment. FIG. 3B and FIG. 3C are schematic cross-sectional views of an optical device according to the second embodiment. These diagrams show example configurations.

When a low-refractive index layer is provided on at least one surface of the lightguide 14, too, there are rays of light (shown by the dashed lines) that enter the low-refractive index layer 23 or 15 at an angle of incidence smaller than the critical angle, as shown by dashed arrows, in the vicinity of the light source 21. Rays that do not reach the critical angle and are not totally reflected are not controlled by the aperture pattern or other optical functions, but are transmitted through the low-refractive index layer 23 or 15 intact, resulting in a loss of light.

Also when a proper alignment with the light source 21 (e.g., an LED) is not mace, it is impossible to couple all of the emitted light to the lightguide 14, and unwanted light is transmitted inside the optical adhesion layer 16 or 19, or other layers. Light entering at an angle smaller than the critical angle with respect to the interface should be avoided.

FIG. 3B shows an example configuration of an optical device 30A that solves the aforementioned leakage of light. The optical device 30A includes a lightguide 14, and on both surfaces of the lightguide 14, low-refractive index layers 15 and 23 are provided as optically functional layers.

The optical device 30 includes a light absorption layer 31 and a light absorption layer 32 in its end region at the light source 21 side. The light absorption layers 31 and 32 may be, for example, thin layers (such as black tape) having a light-absorbing property. The light absorption layers 31 and 32 may be directly adhesively bonded to the surface of the end region at the light source 21 side, or adhesively bonded through chemical surface treatment.

As is exemplified by the light-extracting side of the lightguide 14 in FIG. 3B, when another layer (such as the optical adhesion layer 18) exists at the outermost surface at the end, a light absorption layer 31 may be provided on the surface of that other layer (optical adhesion layer 18) in layer form, e.g., tape. Alternatively, as exemplified by the bottom surface side of the lightguide 14, an optically functional layer such as the low refractive index layer 23 may be integrated, with a light absorption function.

When incident light to the low-refractive index layers 15 and 23 has a smaller angle of incidence than the critical angle of total reflection (as indicated by dashed arrows), light that is not controlled by the low-refractive index layers 15 and 23 is absorbed by the light absorption layers 31 and 32.

FIG. 3C shows another example configuration for loss-of-light prevention. Instead of the light absorption layers 31 and 32, the optical device 30B employs redirecting layers 33 and 34. As the redirecting layers 33 and 34, for example, films or tapes having optical directivity may be used. The redirecting layers 33 and 34 change the angle of incidence of light which is output from the light source 21 so as to exceed the critical angle and satisfy the conditions for total reflection, thus keeping the light inside the lightguide 14.

As is exemplified by the light-extracting side of the lightguide 14 in FIG. 3C, when another layer (such as the optical adhesion layer 18) exists at the outermost surface at the end, a redirecting layer 33 may be provided on the surface of that other layer (optical adhesion layer 18) in layer form, e.g., tape. Alternatively, as exemplified by the bottom surface side of the lightguide 14, an optically functional layer such as the low-refractive index layer 23 may be integrated, with a redirecting function.

The redirecting layers 33 and 34 may be implemented as embedded-type apertures or cavity optical elements, which respectively cooperate with the low-refractive index layers 15 and 23 to confer directivity to light. The redirecting layer having embedded-type apertures or cavity optical elements can be produced by laminating a second film onto a transparent first film having a pattern of apertures or cavities, for example. The second film may be transparent or non-transparent, and may have Lambert reflection, specular reflection, or reflection characteristics between two different colors (e.g., white and black).

Misalignment of the light source 21 along the light-guiding direction is not so problematic in the case where the overlying (i.e., being on the light-extracting side) optical adhesion layer 18 does not provide cover over to the end of the lightguide 14. The optical adhesion layer 18 may be disposed somewhat away from the edge of the lightguide 14, and the redirecting layer 33 supports propagation of light into the lightguide 14. Usually, the low-refractive index layers 15 and 23 are very thin, and essentially all rays are reflected toward the high-refractive index side (i.e., the lightguide side), without creating fogging, color shift, or other problems in the couple and propagation or light in the lightguide 14.

The configuration of the second embodiment suppresses loss of light at the end on the light source 21 side, and while guiding light toward the end of the lightguide on the opposite side, allows a sufficient amount of light to be extracted through the light-extracting surface.

Third Embodiment

Figure 17B:
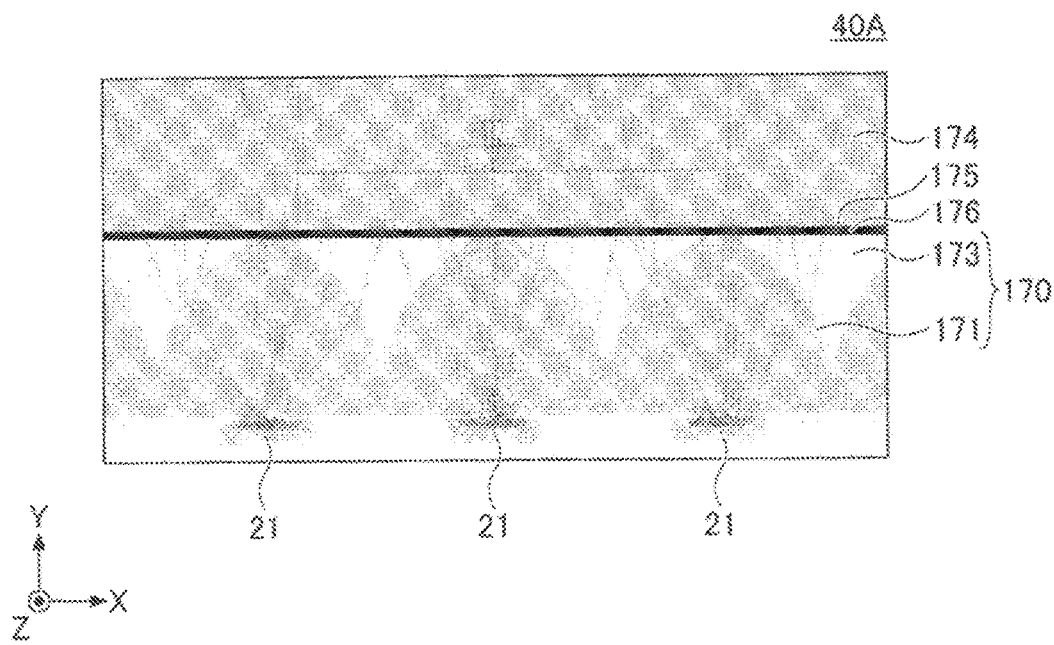
FIG. 17B Shows an example configuration of an optical device including an in-coupling element according to the third embodiment.
Figure 17C:
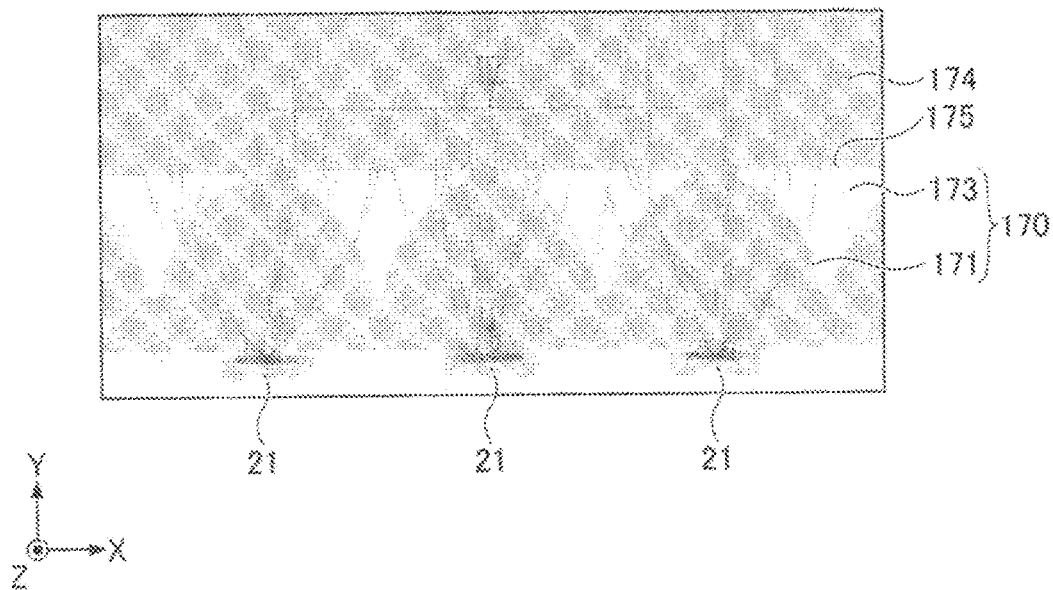
FIG. 17C A diagram showing another example configuration of an optical device including an in-coupling element according to the third embodiment.

FIG. 17A is a diagram describing problems to be solved by a third embodiment. FIG. 17B and FIG. 17C show example configurations for solving the problems.

In FIG. 17A, when light enters from a light source 21 to an end face at the light-incident side of a corresponding lightguide 1001, if the incident end face has not been treated at all, incident light will be visible as lines of light. The incident end face is usually modified by forming ruggedness etc., but this cannot sufficiently control directionality of light, and luminance may be degraded through scattering in unwanted directions, misalignments, or the like. Accordingly, a reflector 1002 having a reflective sheet 1003 may be provided between the light source 21 and the incident end face of the lightguide 1001, thus to collimate light at the end face of the lightguide 1001.

However, this will result in an increased number of parts, and high assembly costs and a long time. A new configuration that is low cost, easy to assemble, and has high in-coupling efficiency to the lightguide is desired.

FIG. 17B shows one solution. An optical device 40A includes in-coupling optics 170 provided at an end face 175 on the incident side of the lightguide 174. FIG. 17B shows the shape within an xy plane, where the light-guiding direction of the lightguide 174 is defined as y, the thickness direction as z, and the width direction as x.

The in-coupling optics 170 include optical elements 171 of hemispherical, prismatic, rod-, or other shapes, and air cavities 173 created between the optical elements 171 and the end face 175 of the lightguide 174. The optical elements 171 efficiently output the light which is emitted from the light source 21 toward the end face 175 of the lightguide 174. The air cavities 173 function as in-coupling elements for efficiently inputting light which has been output from the optical elements 171 to the end face 175 of the lightguide 174. With the optical elements 171 and the air cavities 173, light from the light source 21 can be collimated, and efficiently coupled to the end face 175 of the lightguide 174.

In the example of FIG. 17B, the in-coupling optics 170, in which as many optical elements 171 as there are light source 21 are arranged along the transverse direction (x direction), are adhesively bonded, via an optical adhesion layer 176, to the end face 175 of the lightguide 174 (the incident edge face 175 of the light guiding layer 174 that defines a uniform plane). Apices of the plurality of convex optical elements 171 are disposed in contact with the edge or the end face 175 of the lightguide 174 defining a uniform plane. The convex optical elements 171 are aligned with the end face 175 so that their apices are in contact with the end face 175 of the lightguide 174 defining a uniform plane, thereby creating a pattern of air cavities 173 (optical cavity pattern). Each optical element 171 and each air cavity 173 allow light which is output from the light source 21 to be coupled to the corresponding lightguide region.

As a preferable example configuration, although not shown, an optical sheet with a plurality of optical elements 171 arranged in a row may be used. The shape of each optical element 171 is not limited to a hemispherical shape, and may be lenticular, rod-like, etc., so long as the air cavities 173 can be formed. In the optical sheet, a light source 21 such as an LED or the like ray be fixed in advance to the bottom surface of each optical element 171. The optical sheet can be easily made at a low cost by extrusion, punching, molding inserts, or the like. According to this configuration, by simply attaching the optical sheet to the flat end face 175 of the lightguide 174, the light source 21 and the end face 175 of the corresponding lightguide region are self-aligned.

After the optical sheet is attached, light is refracted at the interfaces between the optical elements 171 and the air cavities 173, so as to be optically coupled the end face 175 of the lightguide 174 efficiently. Essentially all of the emitted light from the light sources 21 is utilized.

FIG. 17C shows an optical device 40B according to another example configuration. In the optical device 40B, instead of using an optical adhesion layer 176, the in-coupling optics 170 and the lightguide 174 are formed integrally. The integrated optical device 40B can be easily produced by molding, die-cutting, or other methods.

In FIG. 17B and FIG. 17C, each optical element 171 may be molded as a flat ball lens which collimates light at an angle within ±10° of the transverse direction (the x axis direction), for example. This configuration is suitable to the case where a plurality of light sources 21 are used, as in an LED strip. The design of the optics, including the optical elements 171, is optimized to achieve a uniformity of 70% or more along the x direction (transverse direction) light distribution inside the lightguide 174, thereby normalizing the effect of "point light sources".

In FIG. 17B and FIG. 17C, the plurality of light sources 21 are disposed on a continuous plane at the non-bumpy side (i.e., the opposite side to the bumps of the optical elements) of the optical elements 171. Disposing the light sources 21 on the plane, which is at the opposite side to the bumps of the optical elements 171, facilitates alignment of the plurality of light sources correspondingly to the plurality of bumps.

Figure 17D:
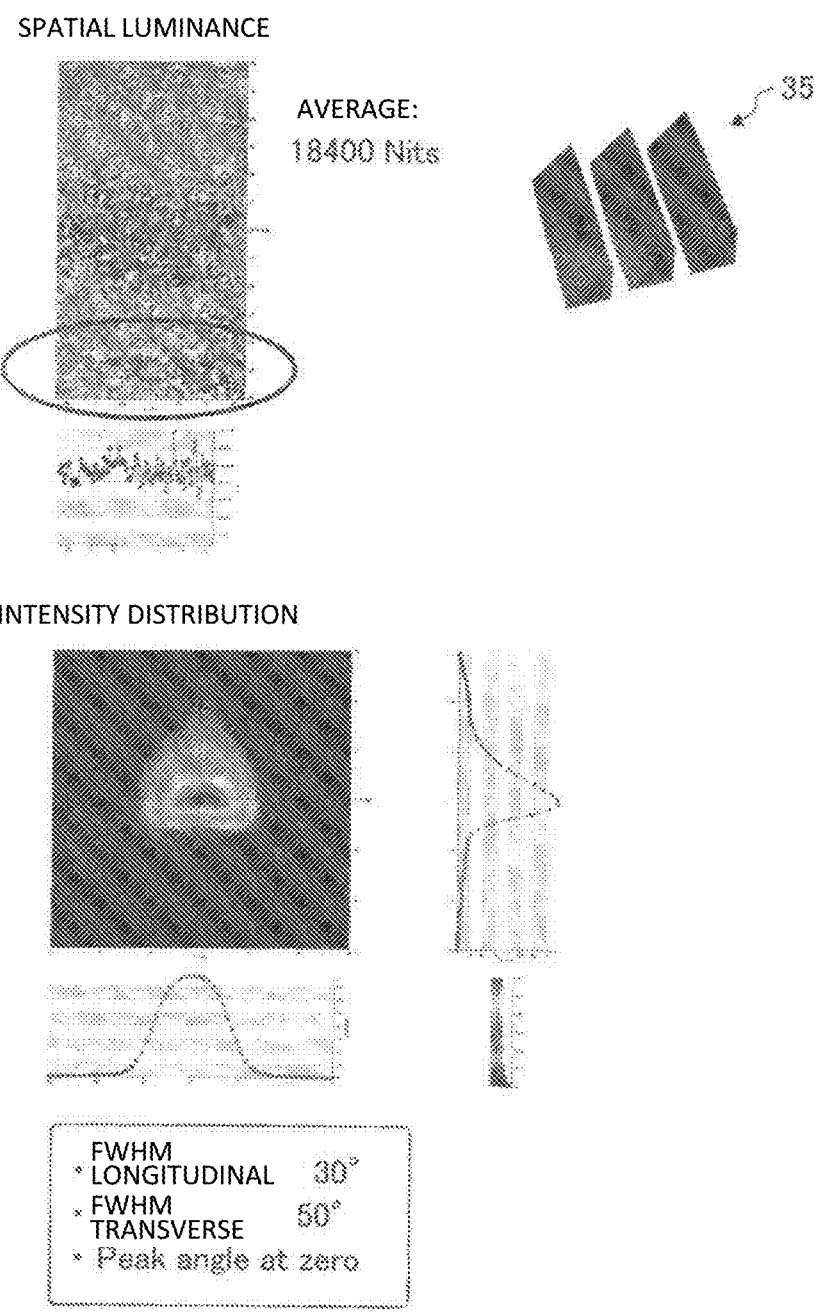
FIG. 17D A diagram showing an internal intensity distribution of a lightguide integrated with an in-coupling element according to the third embodiment.

FIG. 17D shows an optical intensity distribution inside a lightguide 174 according to a third embodiment, in which collimation is achieved along the transverse direction. In the model of FIG. 17D, through a combination of in-coupling optics 170 having a collimating function and a linear blazed-type grating 35, a uniform light distribution is obtained on the incident end face (i.e., the bottom surface in the figure). The grating 35 is disposed so that its protrusions face the lightguide. The luminous flux along the transverse direction is normalized by the in-coupling optics 170, which facilitates optimization of the fill factor of the grating 35 at the lightguide. The FWHM of the longitudinal luminance distribution in this mode is 30° and the FWHM of the transverse luminance distribution is 50°, indicative of good collimation.

Figure 17E:
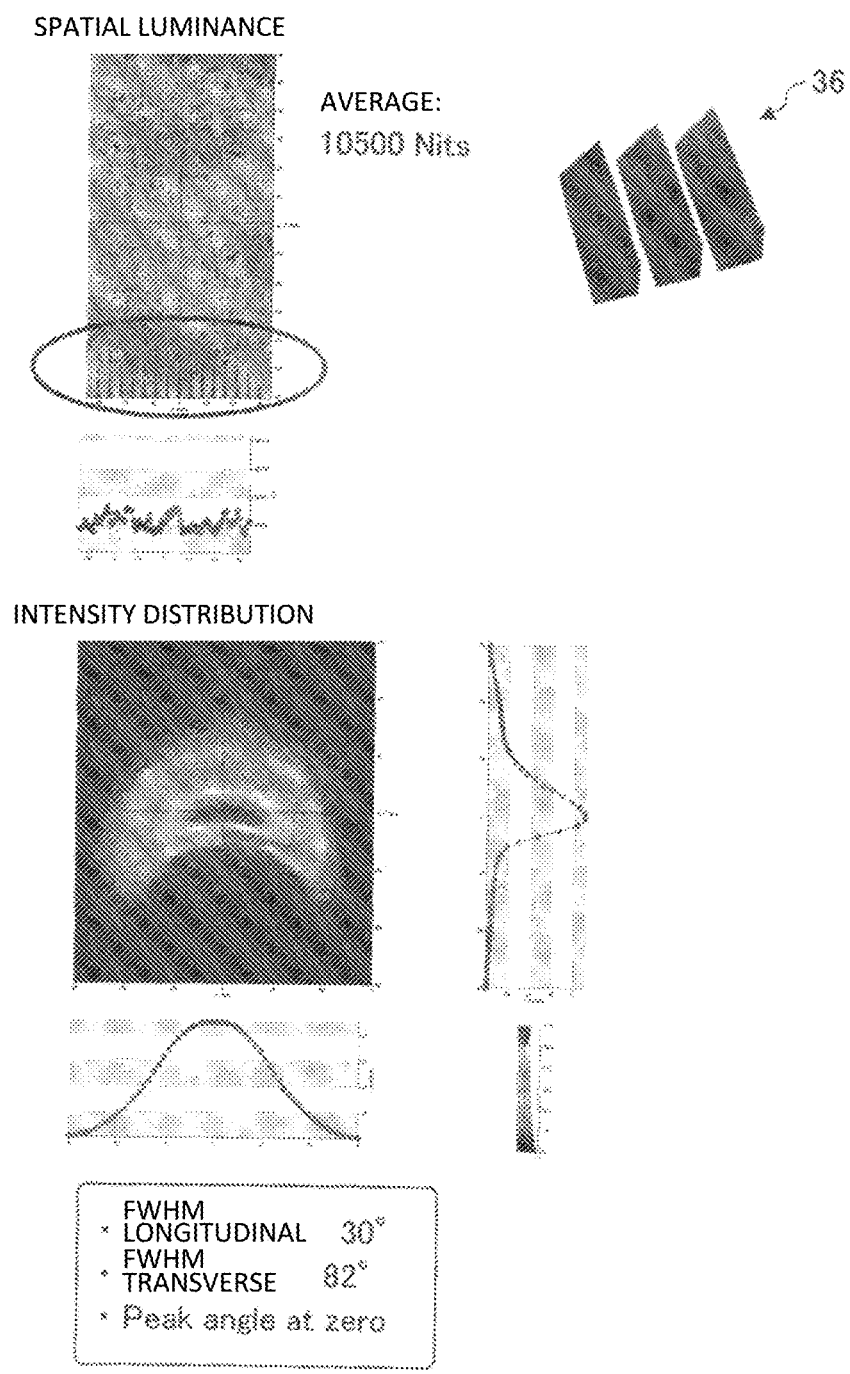
FIG. 17E A diagram showing an internal intensity distribution of an optical device according to a comparative example.

FIG. 17E snows an intensity distribution according to Comparative Example 1. The configuration of Comparative Example 1 uses the same light source 21 and the same size lightguide 174 as in FIG. 17D, but without the in-coupling optics 170. For out-coupling, a linear blazed grating 36 is used, as in FIG. 17D, but the protrusions are disposed toward the light source 21. A large number of light fringes from the light source are observed at the incident end of the lightguide, and uniformity of the light distribution at the bottom of the lightguide is not good. The FWHM of the luminance distribution along the longitudinal direction is 30°, but the collimation along the transverse direction is inadequate, and the FWHM of the luminance distribution along the transverse direction is as wide as 82°.

FIG. 17F shows an intensity distribution according to Comparative Example 2. Comparative Example 2 uses the same light source 21 and the same-sized lightguide 174 as in FIG. 17D, with a curve-shaped grating 37. No in-coupling optics 170 are provided. The light distribution at the bottom surface of the lightguide is essentially uniform. The FWHM of the longitudinal luminance distribution is 29°, but collimation along the transverse direction is insufficient, and the FWHM of the transverse luminance distribution is as wide as 78°.

FIG. 17G is a table comparing the models of FIG. 17D through FIG. 17F with the conventional model. The conventional model is a microlens-type backlight unit (BLU) with a brightness enhancement film. Comparative Example 1 is an air-cavity type BLU of the linear grating configuration shown in FIG. 17E. Comparative Example 2 is an air-cavity type BLU of the curved grating configuration of FIG. 17F. In Comparative Example 1 and Comparative Example 2, the in-coupling optics 170 are not used. The configuration of the embodiment is based on the model of FIG. 17D, and uses the in-coupling optics 170 and the linear grating configuration, such that the protrusions of the grating face the lightguide.

The parameters for comparison are: luminance (luminance), relative values against the luminance of the conventional configuration defined as 100%; FWHM; uniformity of the intensity distribution at the incident end face (bottom surface); and the presence/absence of in-coupling.

The model of the embodiment, which uses in-coupling optics and a linear grating, achieves an efficiency improvement of over 90% as compared to the conventional lightguide configuration. All other performances, such as uniformity of the intensity distribution at the bottom surface and the luminance distribution, are also improved. All of the above performance parameters can be adjusted to optimize the final target value. For example, by optimizing the in-coupling optics with the out-coupling optics, the light distribution angle can be narrowed or widened.

In the case of light collimated in the transverse direction by the in-coupling optics 170, a linear-structured grating 35 can be used as an out-coupling pattern. The master and manufacturing tools for the linear grating 35 can be produced by drum cutting or other direct tool methods, which makes the fabrication of the entire structure and the master cheaper and easier.

In the case of a thin film, the air cavities 173 or optical elements 171 of the in-coupling optics 170 can be produced by die cutting, especially a heated blade method. The shape of the in-coupling optics 170 can be formed by the same process as cutting the lightguide out of a large-sized base film, thus making the process cheaper and easier. The optical elements 171 or air cavities 173 of the in-coupling optics 170 can be covered with a reflector film, e.g., diffuse reflection or specular reflection, or a redirection film, thereby realizing a configuration which utilizes all of the light. A reflector film may be provided on both surfaces of the cavities of the in-coupling optics 170. In this case, the reflector film may be directly adhesively bonded to the surface of the lightguide with a transparent low-refractive index adhesive. If the surface of the lightguide has a transparent coating with a low refractive index value, the reflector may be adhesively bonded to such a surface layer.

In the case of a thick sheet, flat ball lens type cavities can be formed by laser cutting. Alternatively, an optical sheet 178 or strip with optical elements 171 having contact points at the edge of the lightguide, as shown in (b) of FIG. 17B, may be used. The optical sheet 178 and a transparent optical adhesive can be laminated onto the edge of a relatively thick (e.g., 1 to 5 mm) lightguide. This is a simple method, and alignment is easy because of the large thickness of the lightguide. Again, the air cavities 173 or the optical cavities may be covered on one surface or both surfaces with a reflector(s), a diffuser(s), a redirection film(s), etc., to maximize efficiency.

In the case of collimation in the vertical direction, round edges or ball lenses may be used for integration with the lightguide. The in-coupling optics 170 may be integrated as shown in FIG. 17C. The shape of the air cavities 173 or optical elements 171 in the in-coupling optics 170 is not limited to the above example, but can be designed in any shape that allows light from the light source 21 to be efficiently coupled to the edge on the incident side of the lightguide 174.

This configuration can increase the efficiency of light incidence to the lightguide and the luminance, and make the intensity distribution uniform.

Figure 17H:
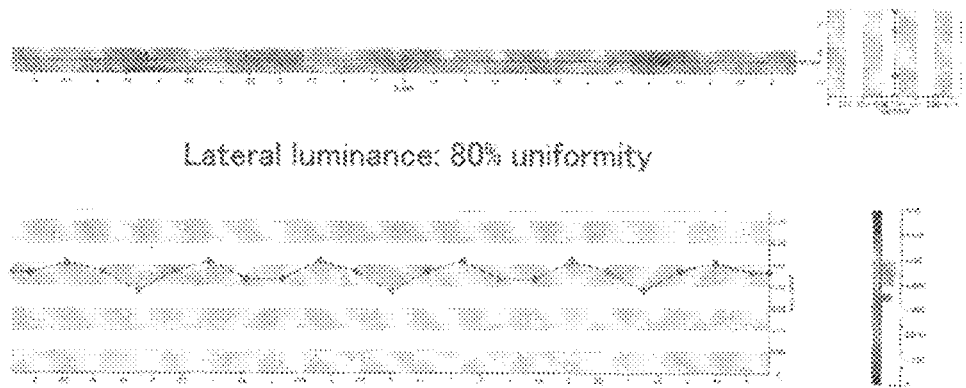
FIG. 17H A diagram showing uniformity of transverse luminance when the in-coupling optics according to the third embodiment are used.

FIG. 17H illustrates the uniformity of transverse luminance when using the third embodiment of the in-coupling optics 170. The simulation is based on a model using the in-coupling optics 170 and three LEDs. As mentioned above, the in-coupling optics 170 have a collimating function in the transverse direction, and the uniformity of the transverse luminance distribution in the lightguide reaches 80%. In order to achieve the final desired illumination performance, especially uniform illumination near the edge on the light source side, the transverse luminance or luminous flux is an important factor in considering the out-coupling design of the lightguide. The configuration of the third embodiment achieves a uniform luminance distribution along the transverse direction.

Figure 17I:
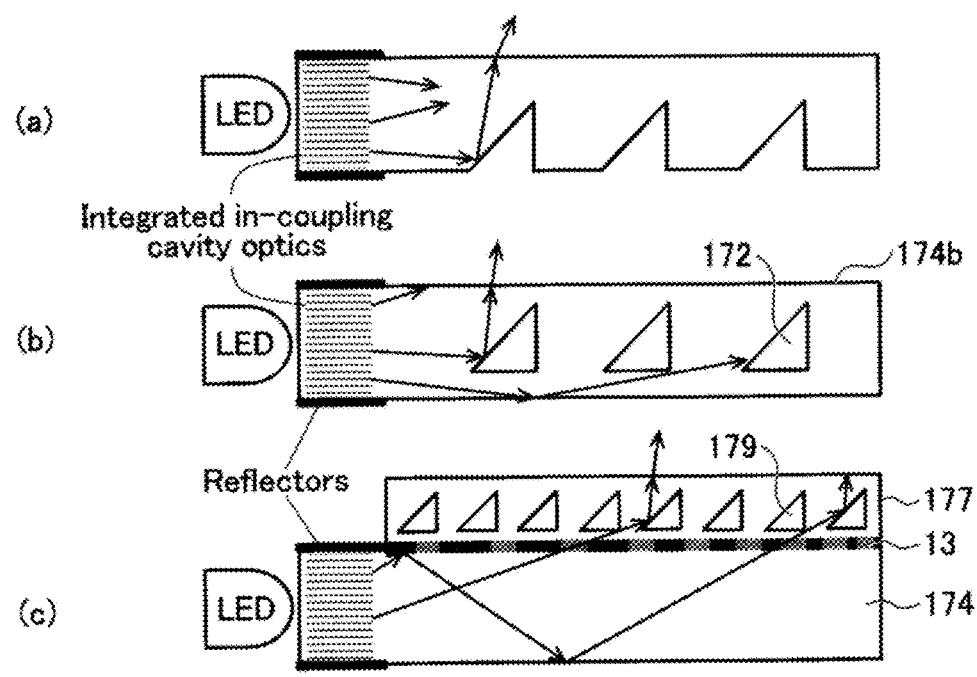
FIG. 17I A diagram showing an example configuration incorporating in-coupling cavities.
Figure 18A:
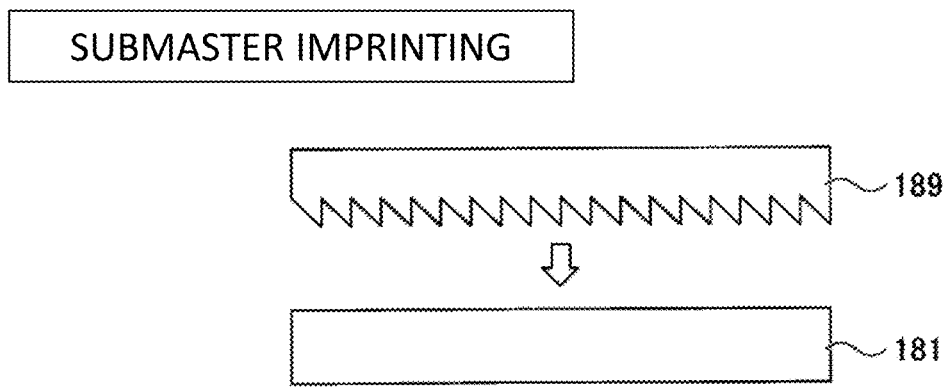
FIG. 18A A diagram showing an example of a master fabrication process.
Figure 18B:
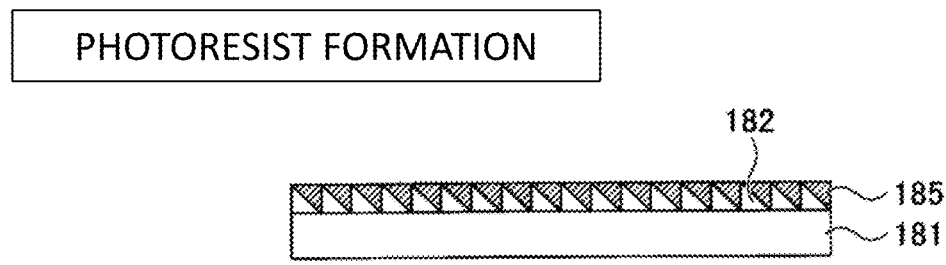
FIG. 18B A diagram showing an example of a master fabrication process.
Figure 18C:
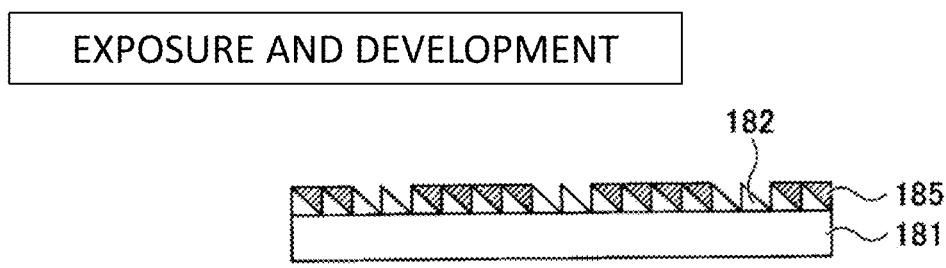
FIG. 18C A diagram showing an example of a master fabrication process.
Figure 18D:
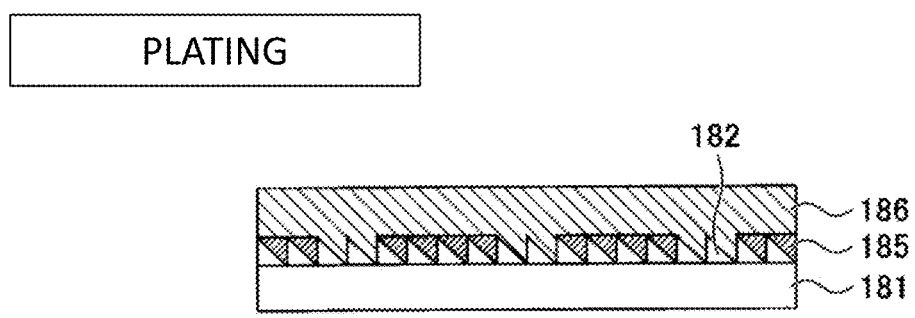
FIG. 18D A diagram showing an example of a master fabrication process.
Figure 18E:
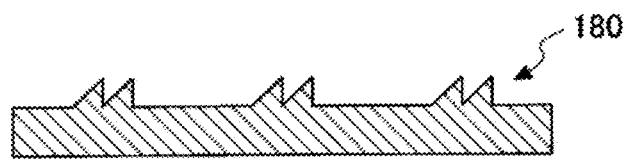
FIG. 18E A diagram showing an example of a master fabrication process.

FIG. 17I shows art example configuration incorporating in-coupling cavities at the incident end of a lightguide. Configuration (a) is an example of incorporating integrated in-coupling cavities, as the in-coupling optics 170, into a commonly-used lightguide configuration with a surface relief pattern. In this case, even if light from the LED is efficiently coupled to the lightguide by the in-coupling cavities, the light is refracted because of the light entering the slope of the relief pattern at an angle smaller than the critical angle, and the light cannot be sufficiently guided to the end face of the lightguide on the opposite side.

Configuration (b) is an example configuration in which in-coupling cavities are incorporated into a lightguide 174b having embedded-type cavities 172 as shown in FIG. 2B. In this configuration, the light heading toward the bottom surface of the lightguide 174b satisfies the conditions for total reflection and propagates sufficiently to the opposite side of the lightguide 174b, and is reflected by the cavities 172 to the light-extracting side.

In configuration (c), a low-refractive index layer 13 having apertures is provided on the light-extracting side of a non-patterned lightguide 174, and a pattern layer 177 having embedded cavities 179 is disposed on the low-refractive index layer 13. In this configuration, the light efficiently coupled to the lightguide 174 by the in-coupling optics 170 propagates between the bottom surface of the lightguide 174 and the low-refractive index layer 13 while undergoing total reflection, and the light transmitted through the apertures is refracted toward the light-extracting side by the embedded cavities 179. This allows for a uniform luminance distribution and improved light extraction efficiency.

Other Embodiments

The embodiments described below are applicable to any one of the basic concept (FIG. 1A and FIG. 1B), the first embodiment, the second embodiment, and the third embodiment. Moreover, the basic concept, the first embodiment, the second embodiment, and the third embodiment can be combined with one another.

The optical pattern, of embodiments (including optical apertures, air cavities, etc.) are produced by a variety of methods. For example, laser patterning, direct laser imaging, laser drilling, and laser or electron beam irradiation with or without a mask are used. The optical material and refractive index values may be modified by printing, inkjet printing, screen printing, or other methods to impart individual characteristics. They can also be produced by micro/nanodispensinq, dosing, direct "writing", discrete laser sintering, micro electrical discharge machining (micro EDM), micro-machining, micro forming, imprinting, embossing, and the like. The formation of the optical apertures may be completed by direct contact methods, where a low-refractive index layer or a total internal reflection (TIR) layer is directly attached together.

Formation of the apertures may be completed through indirect contact, for example, by being processed through a medium such as a carrier substrate or lightguide, via laser ablation. As the cladding is removed by ablation, apertures of the desired size and shape are formed in the same manner as by direct contact. Preferably, the laser beam spot profile is shaped like a flat silk hat. This spot profile does not generate excessive heat and does not damage the carrier substrate or the lightguides. The laser wavelength is selected accordingly based on the cladding absorption curve, hole edge quality, beam shaping optics thickness/height, processing cost, or like standpoints.

Figure 4:
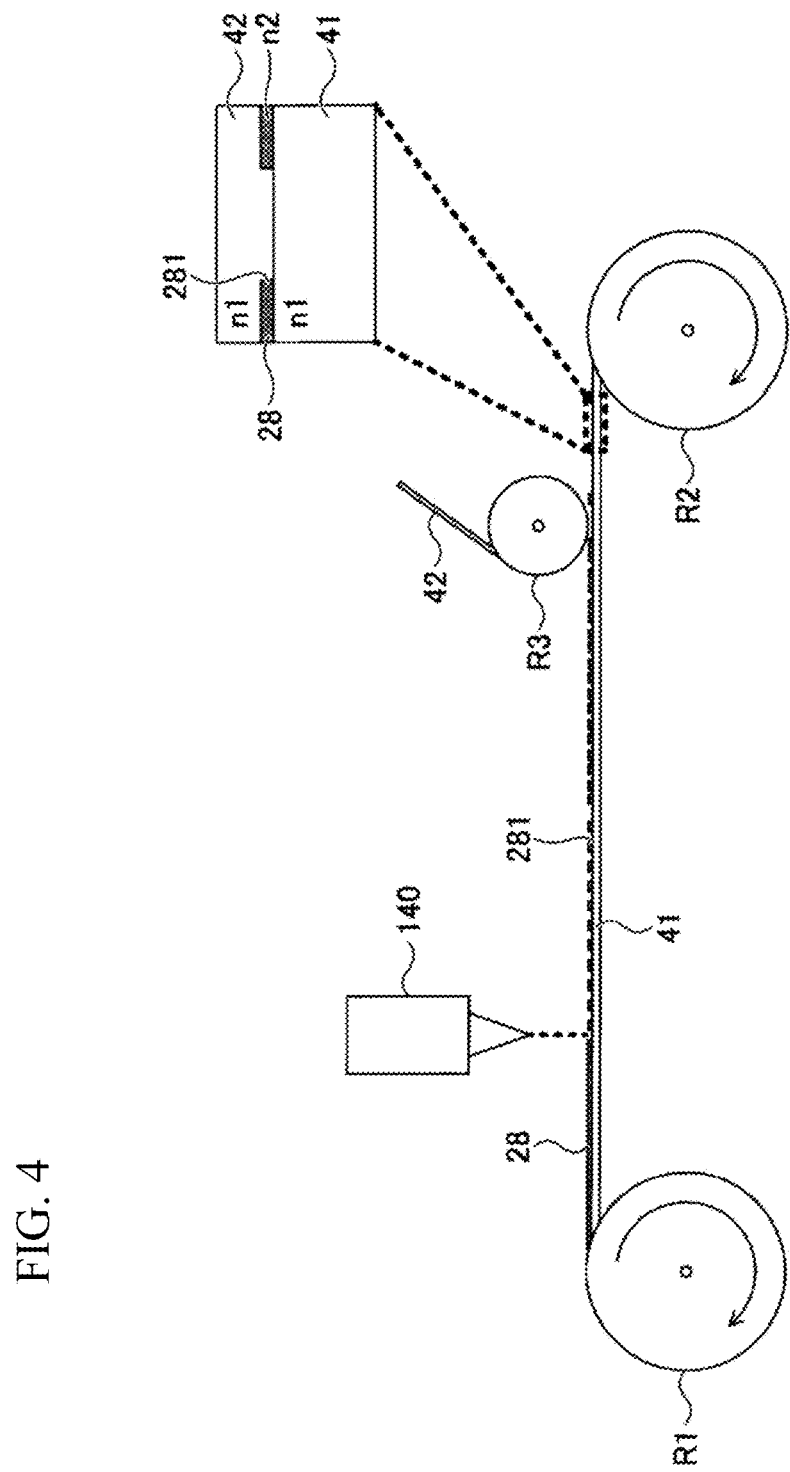
FIG. 4 A diagram showing a method of forming a low-refractive index pattern on the lightguide surface.
Figure 5:
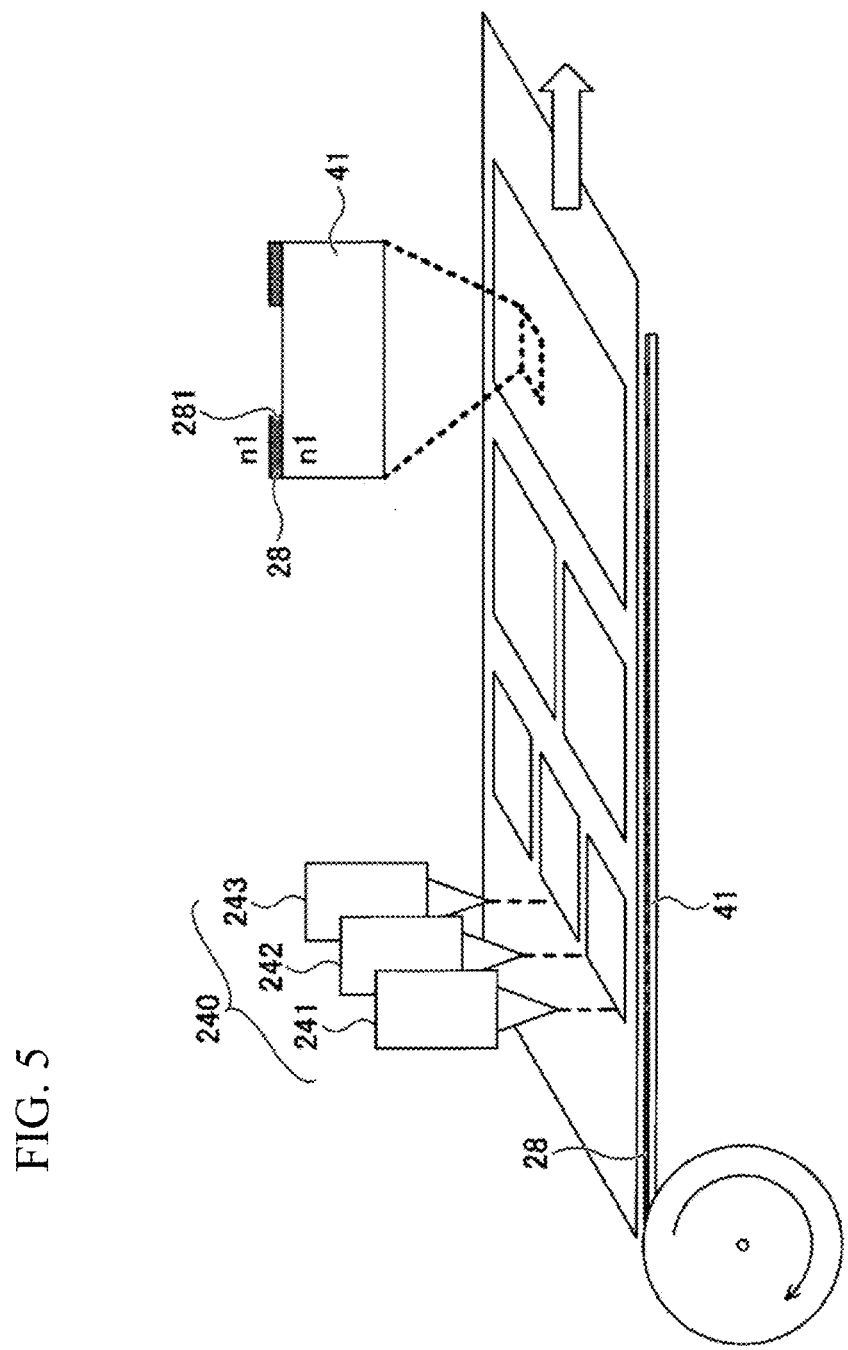
FIG. 5 A diagram showing a method of forming a low-refractive index pattern on the lightguide surface.

FIG. 4 and FIG. 5 illustrate an example of using a laser 140 to create apertures 281. In FIG. 4, by using a roll-to-roll method, a substrate material 41 on which a low-refractive index coating 28 is formed is rolled up from a roll R1 to a roll R2. The low-refractive index coating 28 is ablated/removed by the laser 140 at a rate of 1 m to 20 m/minute to consecutively form apertures 281 which are sized about to 20 μm. The substrate material 41 is a film of optical plastic or optical glass, which is also applicable to a sheet method. After the apertures 281 are formed, OCA 42 is fed by a roll R3 to form a stack of the substrate material 41, the low-refractive index coating 28 with the apertures 281, and OCA 42. This approach can be performed as a roll-to-roll or roll-to-sheet method of a continual or stop-and-repeat type. Discontinuous films can also be produced using the film-by-sheet or sheet-by-sheet method. As shown in FIG. 5, multiple scanning heads can be used to produce wide webs up to 1.5 m in width.

FIG. 5 shows aperture formation using a multi-head 240 that includes a plurality of scanners/lasers 241 to 243. In this example, a line width of 1.0 m to 1.5 m can be achieved. For uniform light distribution in the lightguide, apertures 281 are formed in the low refractive index coating 28 on the substrate material 41. The formation of gradually changing or constant apertures allows for uniform lightguide design for all kinds of sizes. This eliminates the need for a customized 3D production process or each product. After the completion of the formation of the apertures 281, the stacked film can be cut into sheets of a specific size.

Figure 6A:
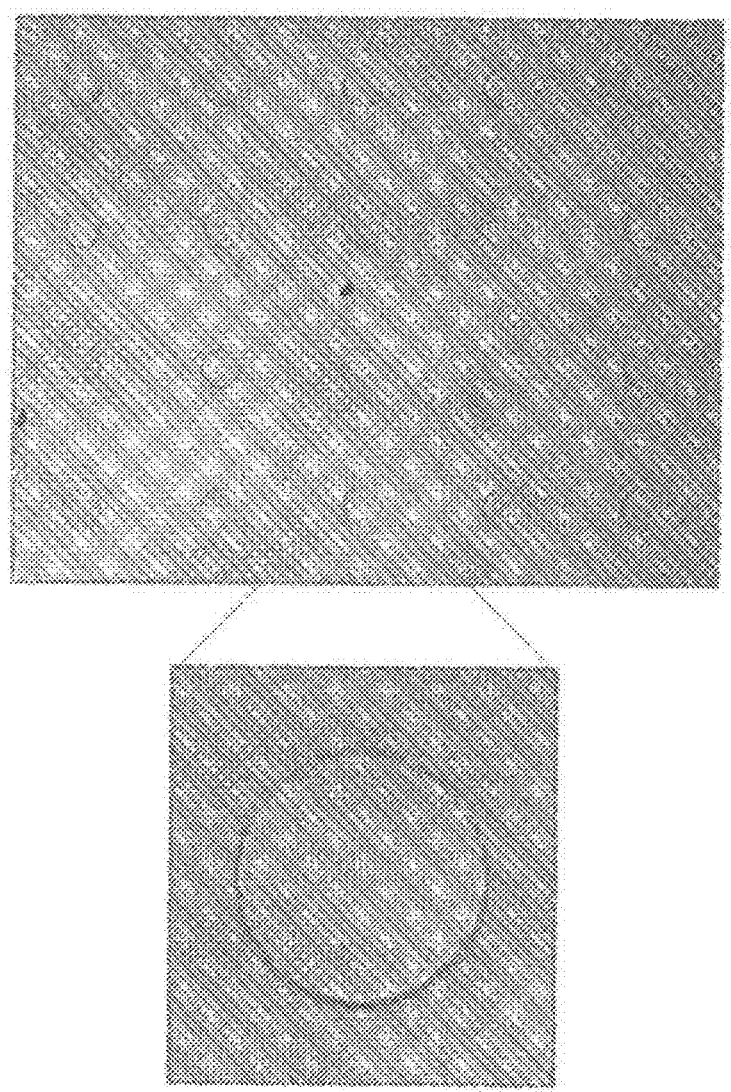
FIG. 6A An image of an optical device from which a low-refractive index cladding is removed by laser ablation.
Figure 6B:
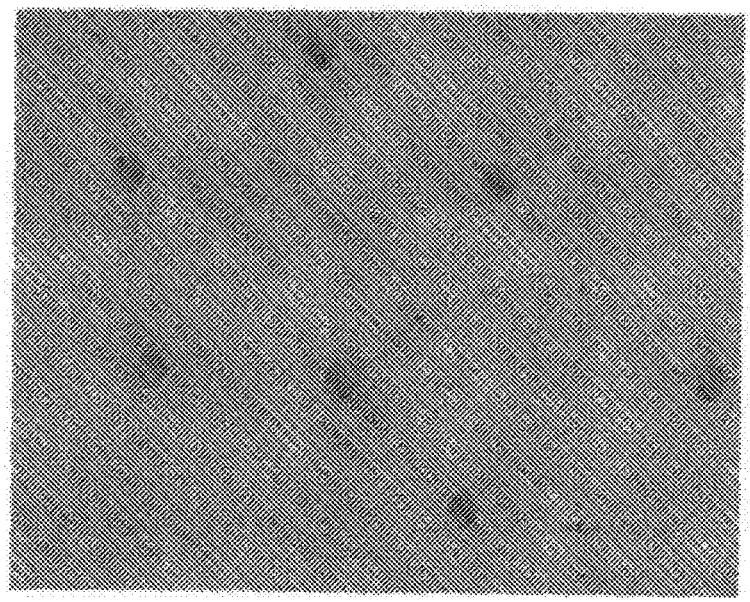
FIG. 6B An image of an optical device from which a low-refractive index cladding is removed by laser ablation.

FIG. 6A and FIG. 6B show images of apertures which are created by laser ablation. In FIG. 6A, a laser beam with a silk hat-type profile is used, and in FIG. 6B, a laser beam with a Gaussian type profile is used.

Large-sized lightguides are very expensive and difficult to be patterned across the entire surface by molding, thus making mass production difficult. The optical device of each embodiment described above are based on film lamination, which is a flexible and cost-effective configuration for producing lightguides in various sizes and, in particular, for producing large-sized lightguides. The configuration and concept of the embodiment allows for application to mass production by roll-to-roll, roll-to-sheet or sheet-to-sheet methods. The final production speed can be appropriately set between 0.5 m to 30 m/minute, although depending on the selected production method. Also, it is applicable to either a continual or a stop-and-repeat approach. The production of the optical device is based on a thin film process. Apertures are formed in the film that is formed thin to become the lightguide. Alternatively, an apertured optical pattern film may be directly laminated or bonded onto the lightguide so that the thin film forms a solid lightguide without any optical pattern. The latter type makes production flexible and cost-effective. The underlying cladding film or coating film can be produced in large quantities and stored in rolls. Subsequently, the apertures may be produced by an iterative and consecutive method and finally, they may be stored again in rolls, or cut into sheets.

Preferably, the light source for the aforementioned optical device may be implemented as: one or more LEDs (light emitting diodes); one or more laser diodes; one or more LED bars; one or more organic LED strips; one or more microchip LED strips; one or more cold cathode tubes; or the like. In the case of transparent lightguide solutions, control of the light distribution by the light source is important. Typically, LED light has a Gaussian distribution. In the case of a low-refractive index cladding, the critical angle at which total reflection occurs in the lightguide is defined by Snell's law. When the angle of incidence to the interface is greater than the critical angle, the direction of refraction of the light is controlled by the dimensions and shapes of the apertures formed in the low-refractive index cladding. For light with an angle of incidence smaller than the critical angle of incidence, measures need to be taken to prevent its transmission through the low-refractive index cladding, as has been described in the second embodiment. As explained with reference to FIG. 3B and FIG. 3C, a thin absorber, e.g., a tape (in particular, a black tape), which absorbs light in undesirable incidence ranges, is desirably disposed near the edge on the LED side and above the cladding of the lightguide. Instead of an absorber, a light refraction layer having an aperture pattern, e.g., an optical pattern tape, may be used such that light in undesirable incidence ranges is redirected into a direction where an angle greater than the critical angle is obtained, and also that the redirected light is placed back in the useful light incidence range.

If low-refractive index films are provided on both surfaces of the lightguide, as illustrated in FIG. 3B and FIG. 3C, light incidence below the critical angle must be addressed by absorbers or by redirection on both surfaces.

Further, as in the third embodiment described above, in-coupling optics may be used to restrict the light incidence to between a high critical angle and a low critical angle, as in the third embodiment described above. This allows all light radiated from the light source to be efficiently used. The in-coupling optics may be formed integrally with the lightguide (FIG. 17C), or may be formed as a s separate element from the lightguide and then adhesively bonded to the lightguide (FIG. 17B). In the latter configuration, optical rods having a diameter equal to the diameter of the radiation aperture of the light source can be used. Plastic or glass rods can provide optical collimation in two dimensions. Similar light control can be achieved by edge profiles with ball lenses, barrel lenses, hemispherical or prismatic lenses, etc.

A lightguide with integrated apertures can be used as a separate element. Alternatively, it may be laminated onto the substrate on one surface or both surfaces. In the case of frontlight elements, they are generally laminated on both sides. In the backlight concept, two or more laminated lightguides are used. In both the backlight type and the frontlight type, multiple layers with apertures control the light in each layer or each medium.

In the case of optically transparent claddings, coatings, or films, the lightguide configuration according to the embodiment is used for frontlights, backlights, window or facade illumination, signage and signal lighting, solar applications, decorative illumination, light shields, masking, roof lighting, or other public or general illumination.

In other embodiments, the light distribution element/lightguide element includes at least one optically functional layer with an optically functional pattern that at least has a light out-coupling function. The lightguide is implemented with optical filter apertures and with a optical pattern such as an out-coupling pattern. Such a lightguide may include a base medium for propagating the in-coupled light, an optical filter solution which is apertures with controlled uniformity, and an optical pattern layer for light out-coupling and distribution control thereof. The optical pattern layer is a thin medium having an optical profile, whose functionality is based on an angle of incidence that is equal to or greater than the critical angle ($\geq \theta c$) within the medium. The optical pattern, which is preferably uniform, may be formed with a constant density, and formed across the whole area or in discrete manners. For the desired purpose of illumination or signal displaying, the optical pattern may be designed to vary in density of placement. Depending on the optical filter and apertures, the optical pattern layer may be adopted on one surface or both surfaces of the out-coupling surface of the lightguide. The optical pattern layer is typically provided on a flat surface in a whole or partial surface area. The optical pattern layer may include a plurality of layers, each layer creating a different optical function, such as diffusion, light coupling, polarization (wire grid), signal displaying, etc.

The optical functional layer(s) with an optical pattern may be designed to be application-specific, for example: opaque backlights, illumination and indicator panels with a high fill factor (generally a constant fill factor) and maximum coupling efficiency; transparent backlights, frontlights, and illumination panels with lower fill factor and optimized efficiency; and so on. The light distribution can be designed various ways, e.g., narrow distribution, wide distribution, elliptical, symmetric, asymmetric, etc. Maximum efficiency can be achieved by a continuous periodic profile. In a transparent solution, the maximum fill factor can be optimized with respect to transparency, fogging, and stray light. It is of great benefit to include a continuous and efficient three-dimensional optical pattern that can be used for multiple applications. Such a three-dimensional optical pattern reduces master fabrication costs and product costs and allows for the production of large-size elements.

For light control in two directions, a hybrid pattern may be used. In this case, an optically functional pattern configured as a hybrid pattern with a plurality of discrete or continuous profiles is provided in the light distribution/lightguide element.

The hybrid pattern a three-dimensional optical shape for two-directional light distribution control and are applicable to various illumination purposes. The hybrid pattern is based on discrete pixels, profiles, continuous or partially continuous profiles. The pattern profile is formed by at least partially linear, curved or sinusoidal arrangements, zigzag arrangements, random or quasi-random arrangements, etc. Combinations of different profiles, including variations in height, may be used. The angular profile of the pattern wall is formed with a constant angle throughout the region or at a symmetric or asymmetric angle with angular changes. A hybrid pattern with a sinusoidal orientation affects the light distribution along the x-y axes, with the optimized angle and period, amplitude and frequency of the pattern wall.

Pattern profiles can be designed in various ways and can have a variety of shapes and profiles, such as different blazed profile angles for longitudinal light distribution control, for example. The pattern profile can be optimized for different purposes and aims, and thus composite patterns can be based on many different pattern variations.

Hybrid solutions, realized as films, improve uniformity performance by avoiding the light streaks that linear patterns usually produce. It is also possible to avoid moiré effects with a non-linear pattern solution. In addition, the high fill factor allows to cover optical defects on the lightguides.

A hybrid pattern with a single film can replace two conventional brightness enhancement prism films and even two laminated prism sheets. The hybrid film provided herein may have an air cavity pattern while having flat surfaces on the top and bottom surfaces for lamination.

The function of the hybrid pattern film is typically based on total reflection at an incident light angle greater than the critical angle of the medium. This differs from conventional prism sheets based on light out-coupled at an incident light angle smaller than the critical angle of the medium.

Hybrid patterns are produced by various methods including lithography, micromachining, or a combination thereof. The master tool is typically a drum tool used in roll-to-roll production for mass production purposes.

The at least one optical pattern on the optically functional layer may be formed by concave and convex parts selected from grooves, recesses, dots, pixels, and the like. These concave and convex parts have a cross-sectional concave-convex profile selected from rectangular waves, a blazed diffraction grating, slanted, prismatic, trapezoidal, hemispherical, and the like. The longitudinal shape is selected from linear, curved, waved, sinusoidal, and the like.

Figure 7:
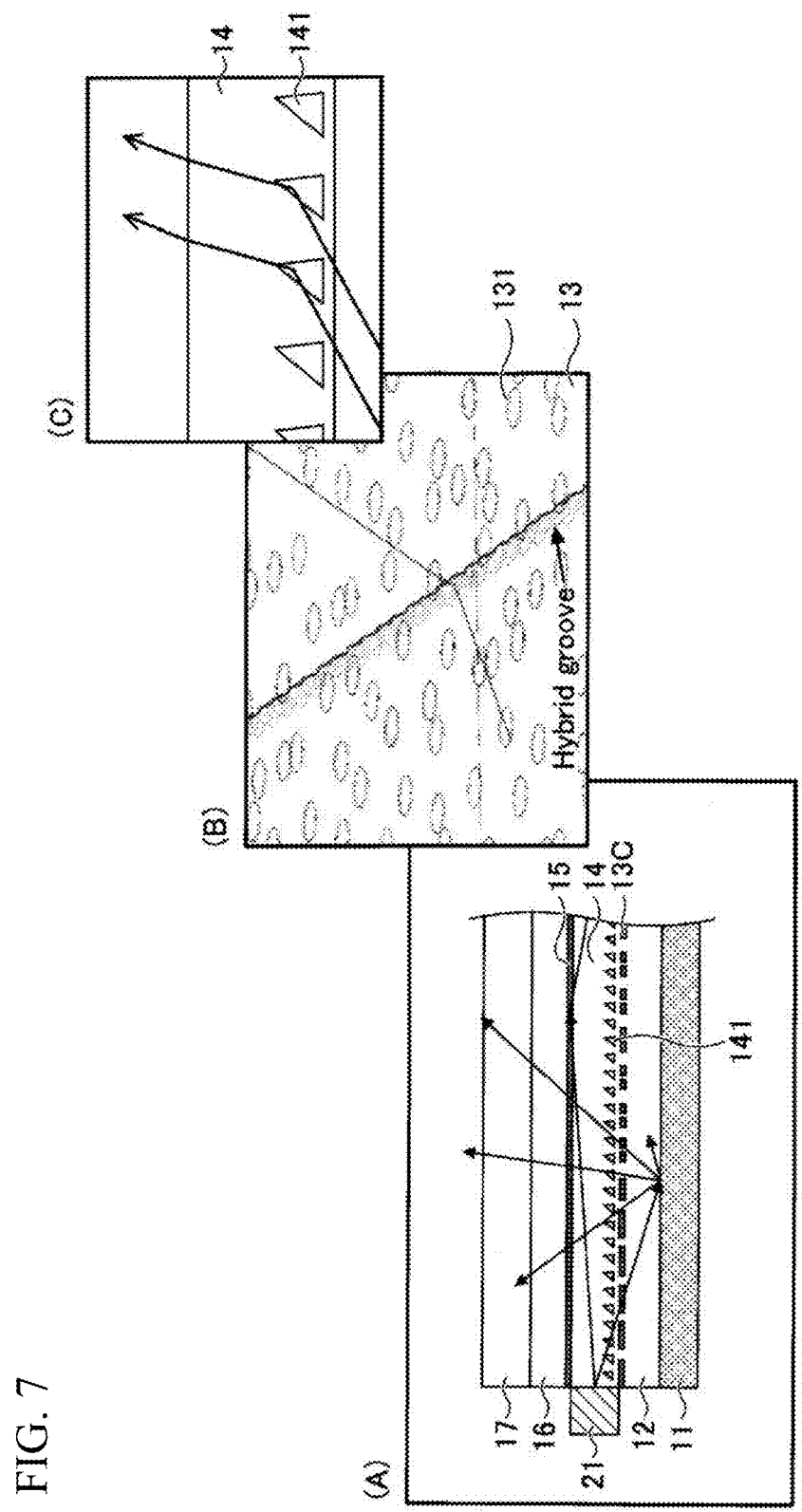
FIG. 7 A diagram showing the concept of a lightguide structure in which a light distribution filter (Light Directing (Distributing) Filter; LDF) is used, and main functions of light control by the light distribution filter.

FIG. 7 shows: (A) a lightguide stack with a light distributing (directing) Filter (LDF); (B) a low-refractive index layer with apertures 131, and (C) a pattern of optical cavities 141. In the lightguide 14 stack (A), optical cavities 141 are formed in the lightguide 14. A low-refractive index layer 15 is provided on the light-extracting surface of the lightguide 14, and a low-refractive index layer 13C with an aperture pattern is provided on the surface at the opposite side. This is an example of a hybrid configuration.

FIG. 8A shows an example configuration of a lightguide structure using a light distribution filter. In FIG. 8A, (a) shows an intensity distribution when using a hybrid prism with internal air cavities 83, and (b) shows an intensity distribution when using a hybrid prism with a surface pattern.

In configuration (a), a reflector 81 is provided on the rear surface of the lightguide 14, where no pattern is formed. On the light-extracting side of the lightguide 14, a low-refractive index 88 having a gradient in its distribution density, a hybrid prism film 85 having a uniform air cavity pattern, and a diffuser 82 are layered in this order. The light distribution in the X-Y plane is controlled by the air cavities 83 formed inside the hybrid prism film 85.

In configuration (b), a reflector 81 is provided on the rear surface of a non-patterned lightguide 14. On the light-extracting side of the lightguide 14, a low-refractive index 88 having a gradient in its distribution density, a hybrid prism film 86 with a uniform pattern, and a diffuser 82 are layered in this order. The pattern of the hybrid prism film 86 controls the light distribution in the X-Y plane.

FIG. 8B shows an example configuration of a lightguide structure using a light distribution filter. In FIG. 8B, (a) shows an intensity distribution when using a hybrid prism with internal air cavities as the uppermost layer, and (b) in FIG. 8A shows an intensity distribution when using a hybrid prism with a surface pattern as the uppermost layer.

In configuration (a), an optically functional layer 13A and a reflector 81 are provided on the bottom surface side of the lightguide; and on the upper surface, an optically functional layer 15, a diffuser 82, and a hybrid prism film 85 with cavities are provided in this order. As has been described in the first embodiment, the optically functional layer 13A includes air cavities that are created by optical elements which are convex downwards in the figure. By air cavities 83 created inside the hybrid prism film 85, the light distribution in the X-Y plane is controlled.

In configuration (b), an optically functional layer 13A and a reflector 81 are provided on the bottom surface side of the lightguide; and on the upper surface, an optically functional layer 15, a diffuser 82, and a hybrid prism film 86 with a surface pattern are provided in this order. As has been described in the first embodiment, the optically functional layer 13A includes air cavities that are created by optical elements which are convex downwards in the figure. By the optical pattern formed on the surface of the hybrid prism film 86, the light distribution in the X-Y plane is controlled.

Figure 9A:
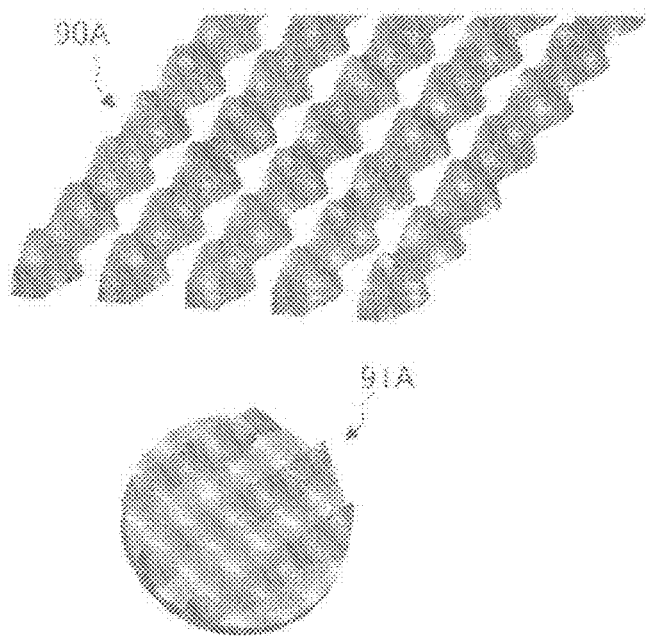
FIG. 9A A diagram showing a hybrid pattern for light control in two directions.

FIG. 9A shows a hybrid pattern 90A for light control in two directions. The hybrid pattern 90A has a hybrid pattern profile in which individual hybrid pattern pixels 91A are linked continuously.

Figure 9B:
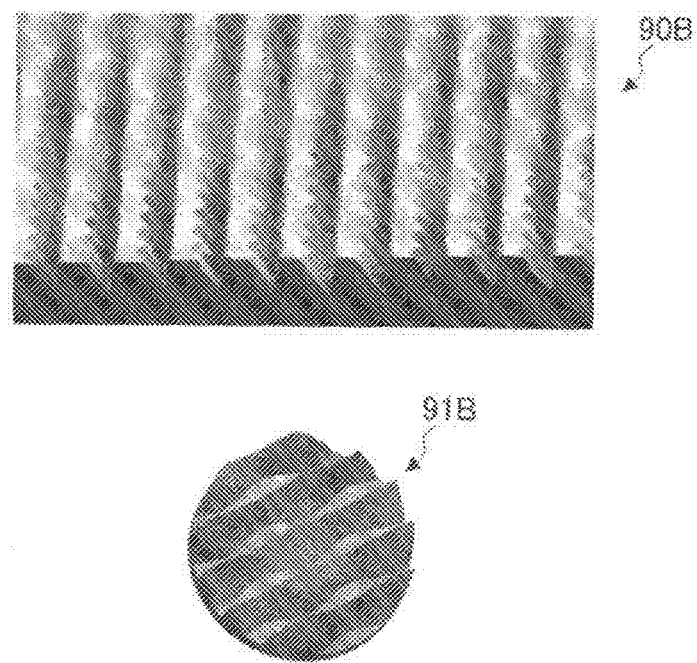
FIG. 9B A diagram showing a hybrid pattern for light control in two directions.

FIG. 9B shows a hybrid pattern 90B for light control in two directions. The hybrid pattern 90B is composed of a continuous hybrid pattern film, where the individual grating in the hybrid pattern 918 is denser than in FIG. 9A.

Figure 10:
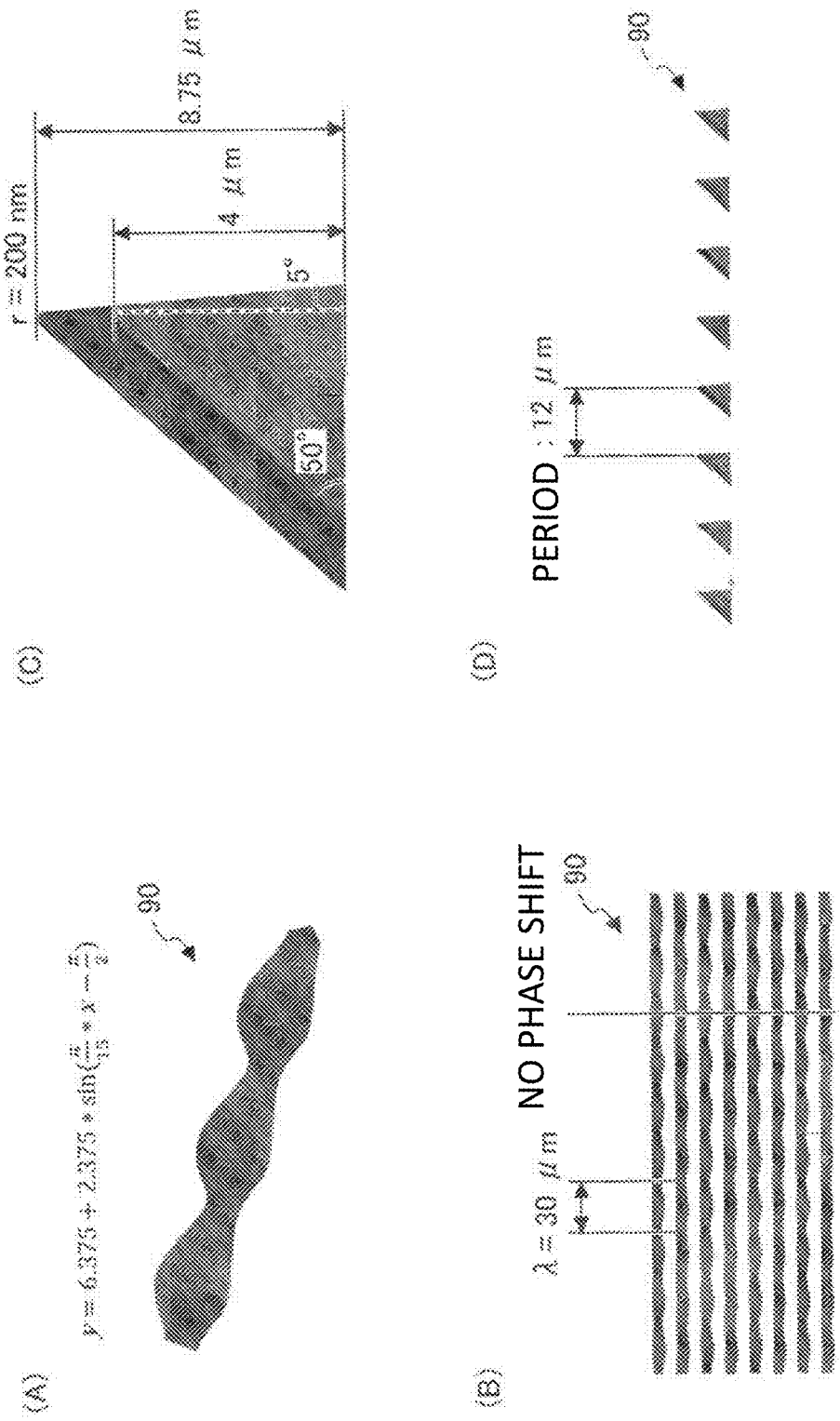
FIG. 10 A diagram showing an optical pattern for two-directional light control.

FIG. 10 shows another example optical pattern for two-directional light control. In FIG. 10, (A) shows a general formula for the 3D shape of the hybrid pattern 90. In FIG. 10, (B) shows a cross-sectional profile of the hybrid pattern 90. In FIG. 10, (C) shows a cross-sectional shape and dimensions of the hybrid pattern 90. In FIG. 10, (D) is a side view showing the period of the hybrid pattern 90.

Figure 11:
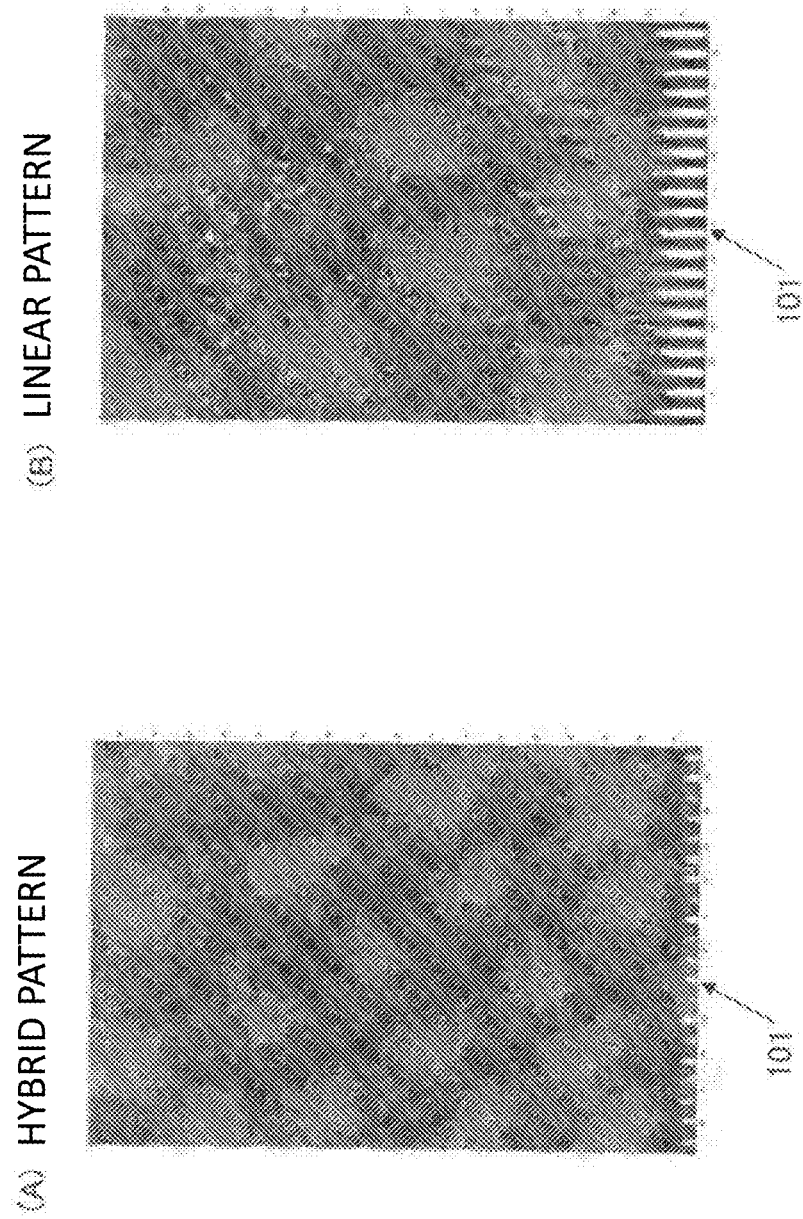
FIG. 11 A diagram showing a hybrid pattern and a linear pattern, as examples of the pattern on the lightguide.

FIG. 11 shows a hybrid pattern and a linear pattern, as examples of the pattern on the lightguide. In the linear pattern (B), streaks of light are observed; in hybrid pattern (A), however, no streaks of light are observed.

FIG. 12 shows simulation results for light distribution filter films. All of them are within the concept of a hybrid pattern for light control in two directions, using a small PMMA lightguide with 20 LEDs and a diffuser, and using a low-refractive index and apertured backlight model. However, different prisms are used so as to result in different air cavity pattern profiles.

Figure 13:
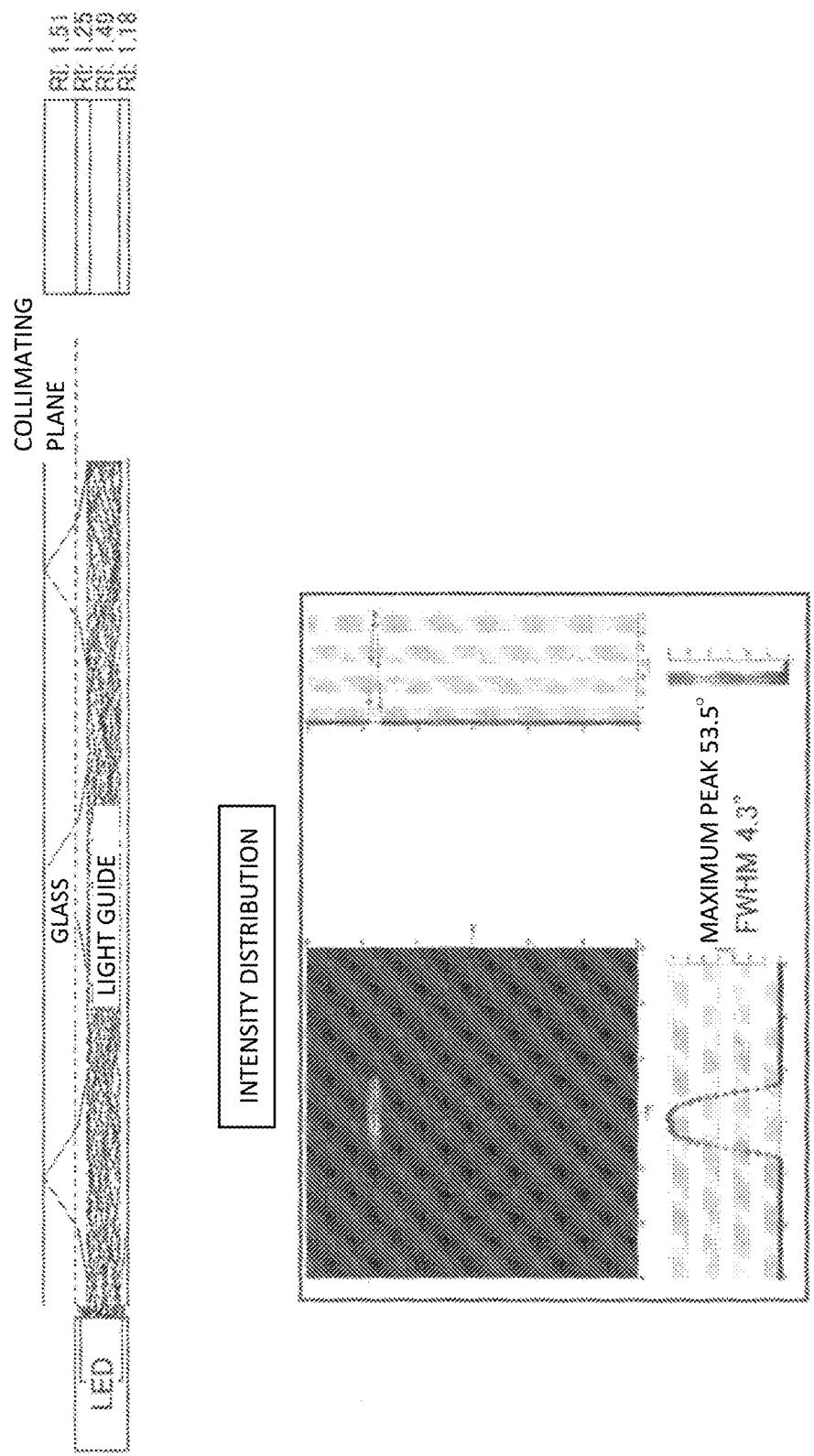
FIG. 13 A diagram showing the concept of a signal lightguide for a sensor such as a finger sensor or a fingerprint sensor.

FIG. 13 illustrates the concept of a signal lightguide for a finger sensor or a fingerprint sensor. The LDF configuration without the optical pattern described above can be used as a single lightguide for a sensor. A narrow signal distribution angle can be achieved when processing a sensor signal from a finger, a fingerprint, etc. The signal distribution angle can be tuned on the top glass by combining low-refractive index layers with different refractive index values. For example, by varying the refractive index of the upper cladding (Ri: 1.18) and the refractive index of the lower cladding (Ri: 1.25) of the lightguide, it is ensured that patterns such as interference fringes are not visible or observed on the lightguide. Light scattering is suppressed and contrast is maintained at a high level.

Figure 14:
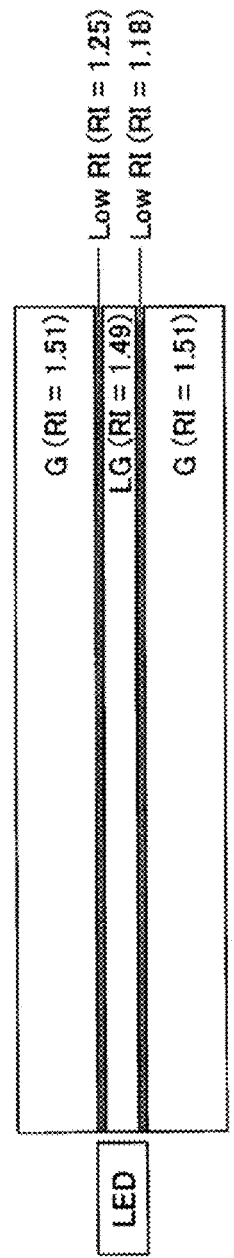
FIG. 14 A diagram showing the concept of a signal lightguide for a sensor such as a finger sensor or a fingerprint sensor.

FIG. 14 shows an example configuration of a signal lightguide. It is combined with a refractive index (Ri) in the range of 1.18 to 1.25, but is not limited to this example; other combinations are also possible. This configuration can be applied to both single LED configurations and multi-LED configurations. The multidirectional crosstalk is low even when thick glass plates (G) are used. Given that glass has a refractive index of 1.51, only 2.7% of all LED light enters the top glass.

Figure 15A:
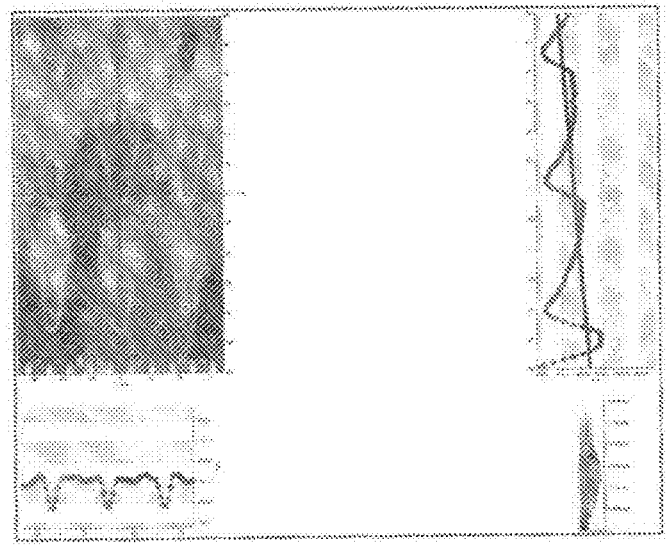
FIG. 15A A diagram showing a result of a fingerprint simulation at nine points.
Figure 15B:
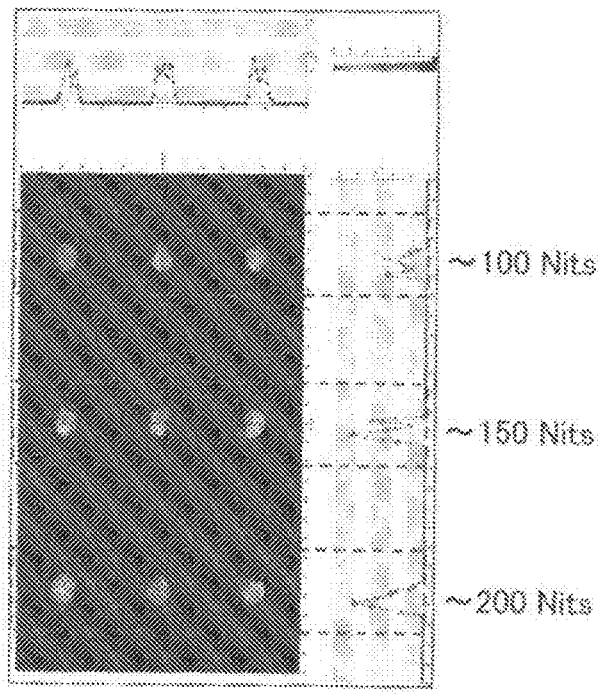
FIG. 15B A diagram showing a result of a fingerprint simulation at nine points.

FIG. 15A and FIG. 15B show results of fingerprint simulations at nine points. In FIG. 15A, in general, the optical power gradually decreases along the lightguide path due to light extraction from the lightguide. In the absence of multidirectional crosstalk, as shown in FIG. 15B, no ghost image is formed and a clear and spatially accurate signal can be obtained, as shown in FIG. 15B.

Figure 16:
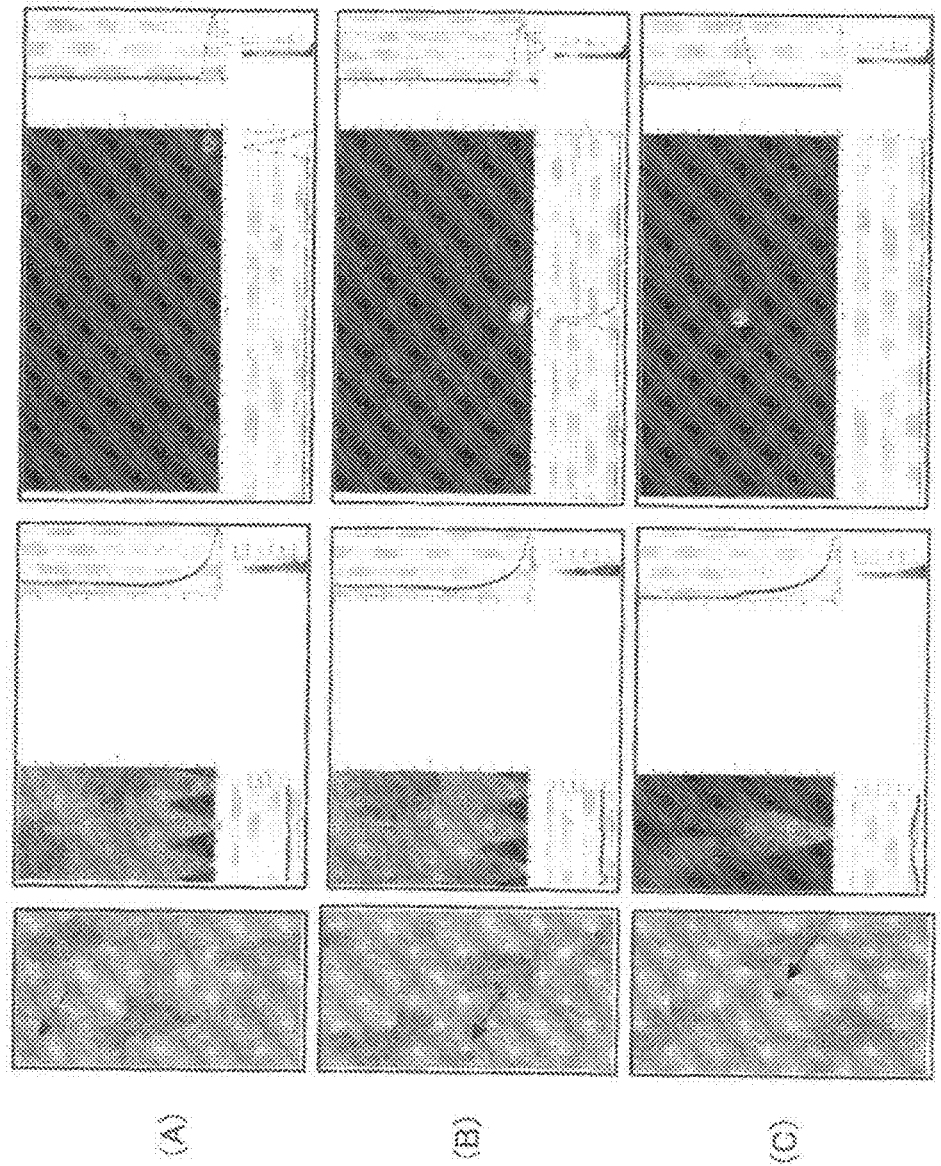
FIG. 16 A diagram showing simulation results for different setups.

FIG. 16 shows simulation results for different setups with different fingerprints and LEDs. In FIG. 16, (A) is calculated for a model with three LEDs and a fingerprint on a corner away from the center. The signal intensity 20 Nits or less. The beam is slightly skewed.

In FIG. 16, (B) as calculated on a model with three LEDs and fingerprints at a side edge. The signal intensity is 40 Nits or less. Ghosting is observed, although very slight. This could be an effect of ray tracing.

In FIG. 16, (C) is calculated on a model with a single LED and a fingerprint in the center. The intensity of the signal is 30 Nits or less. A clear signal is observed.

In FIG. 16, there is no multidirectional crosstalk and no substantial ghost image is formed, as in the case of FIG. 15.

The directivity of the signal is precisely controlled so that there is essentially zero (0)% of light that is incident on the sensor or display without being reflected by a finger or other item. By narrowing the signal distribution, multidirectional crosstalk is small, even on a thick glass plate. In addition, ghosting is minimum. The signal source may be a single LED, multiple LEDs, or a laser component.

In the case of optical patterns, the signal can be collimated in two directions (X-Y) if necessary. Uniformity over 90% can be achieved if necessary.

The aforementioned signal lightguides can be designed in sizes from 500 mm to 1000 m, and its size is generally adjusted on a roll-to-roll production line. In this case, a uniform and continuous structural piece can be cut into size as respectively required.

<Master Fabrication>

The fabrication of an optical master is costly and difficult, especially in large sizes. The fabrication of masters and rules for advanced lightguide optics, regardless of their size, is extremely difficult and incurs a high cost.

Therefore, the present invention proposes to produce large-sized master rolls by diamond cutting or lithography techniques and to mass produce a basic pattern film by the roll-to-roll method. The basic pattern film can be produced by applying a resist on the pattern and mask lithography exposure and development. The mask pattern is replicated by forming a metal film by electroplating in the apertures formed. For example, nickel shims can be used as a tool to produce optical films and sheets.

FIG. 18A to FIG. 18E illustrate an example of a master fabrication process. In FIG. 8A, a submaster 189, whose surface pattern is shaped by cutting with a diamond shaper, is used to transfer the pattern to a base plastic substrate 181 by using the imprinting technique. The width of the submaster 189 can be enlarged to a size of 1 m or more.

In FIG. 8B, photoresist 185 is applied to the base plastic substrate 181 with a transfer pattern 182. In FIG. 8C, exposure through a mask or direct exposure is performed, followed by a development, whereby desired portions of the photoresist. 185 are removed so as to partially expose the transfer pattern 182.

In FIG. 8D, for example, by performing nickel plating and detaching the base plastic substrate 181, a nickel stamper 180 for lightguide replication is obtained, as shown in FIG. 8E. This nickel stamper 180 has, as an example, a random dot pattern for a periodic blazed profile.

Figure 19:
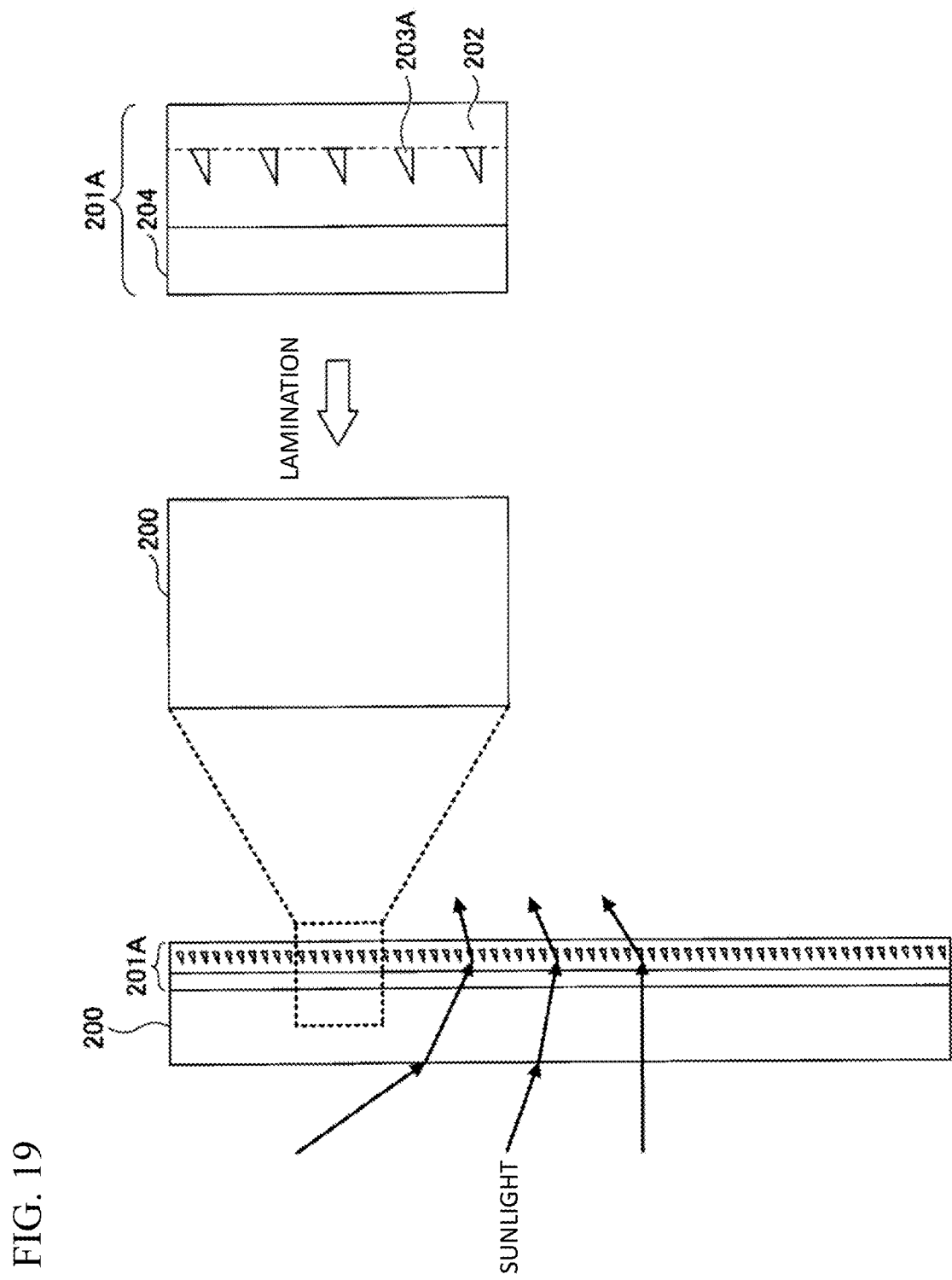
FIG. 19 A diagram showing an example solution for improving transparency of cavity optics.

FIG. 19 shows an example application of the structural piece of the embodiment to window illumination. By attaching (laminating) a stacked body 201A including an optically functional layer 202 to a window 200, sunlight and illumination light can be effectively captured on the opposite side (e.g., indoors) to the incident side. The stacked body 201A includes the optically functional layer 202 having air cavities 203A and a transparent optical adhesion layer 204. The optically functional layer 202 can be formed of a polymer, a glass film, or the like. With the optical adhesion layer 204, the optically functional layer 202 can be affixed to either surface of the window 200, to increase the amount of light intake.

Figure 20:
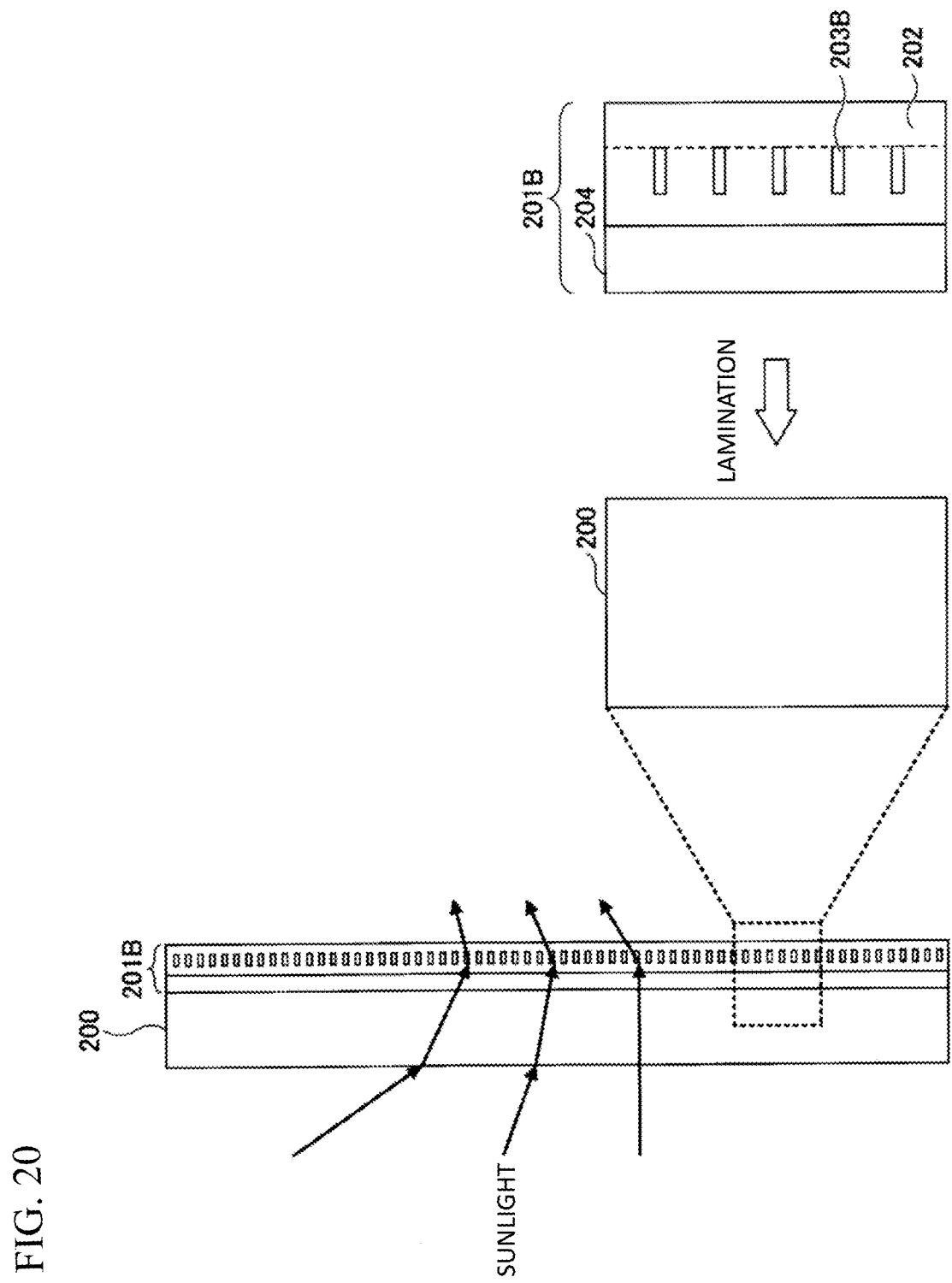
FIG. 20 A diagram showing an example solution for improving transparency of cavity optics.

FIG. 20 shows a stacked body 201B that includes an optically functional layer 202 having a different pattern of air cavities 203B. Such a cavity pattern can also be user effectively.

Figure 21A:
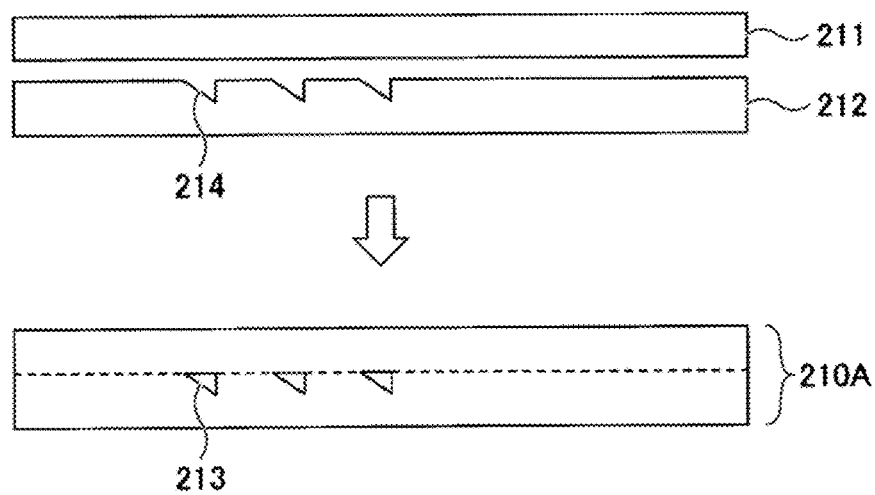
FIG. 21A A diagram showing an example of cavity lamination.

FIG. 21A illustrates a method of producing the optically functional layer 202 of FIG. 19. FIG. 21 is an adhesive-free lamination method. A non-patterned first film 211 and a second film 212 with a desired pattern 214 on the surface are attached together adhesive-free (e.g., by microwave surface treatment). The first film 211 and the second film are formed of polymethyl methacrylate (PMMA), polycarbonate (PC), etc. Through the attaching-together, cavities 213 are formed.

Figure 21B:
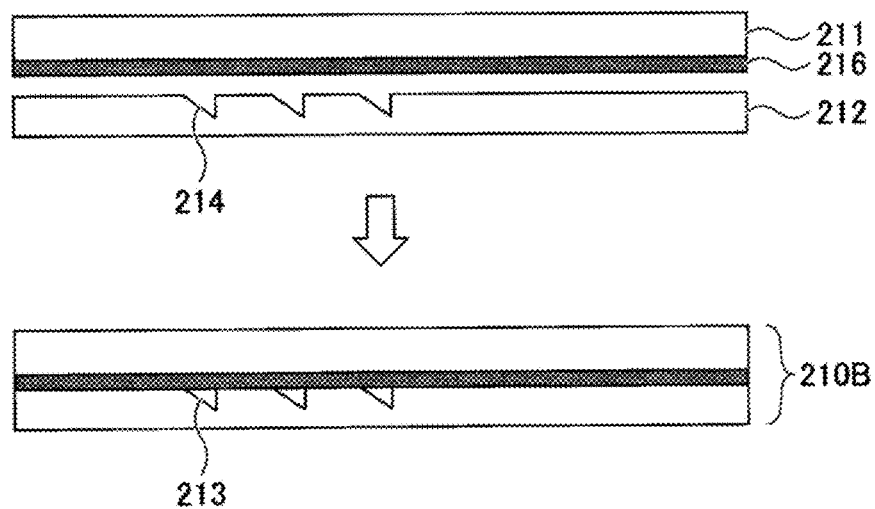
FIG. 21B A diagram showing an example of cavity lamination.

FIG. 21B shows another method of making the optically functional layer 201A of FIG. 19. In FIG. 22, the two films are adhesively bonded with an adhesion layer 216. The thickness of the adhesion layer is about 1 to 3 μm. Air cavities 213 are created by the second film 212 and the adhesion layer 216. It is ensured that the pre-cured adhesive will not enter the cavity pattern during the attaching-together.

The method of attaching-together may be any method that does not affect the shape of the air cavities. For example, a chemical bond can be obtained by pretreating the laminate surface by using a VUV light (vacuum ultraviolet) source or APP (atmospheric plasma) and then laminating it under constant pressure. This method can achieve good mechanical strength.

Figure 25:
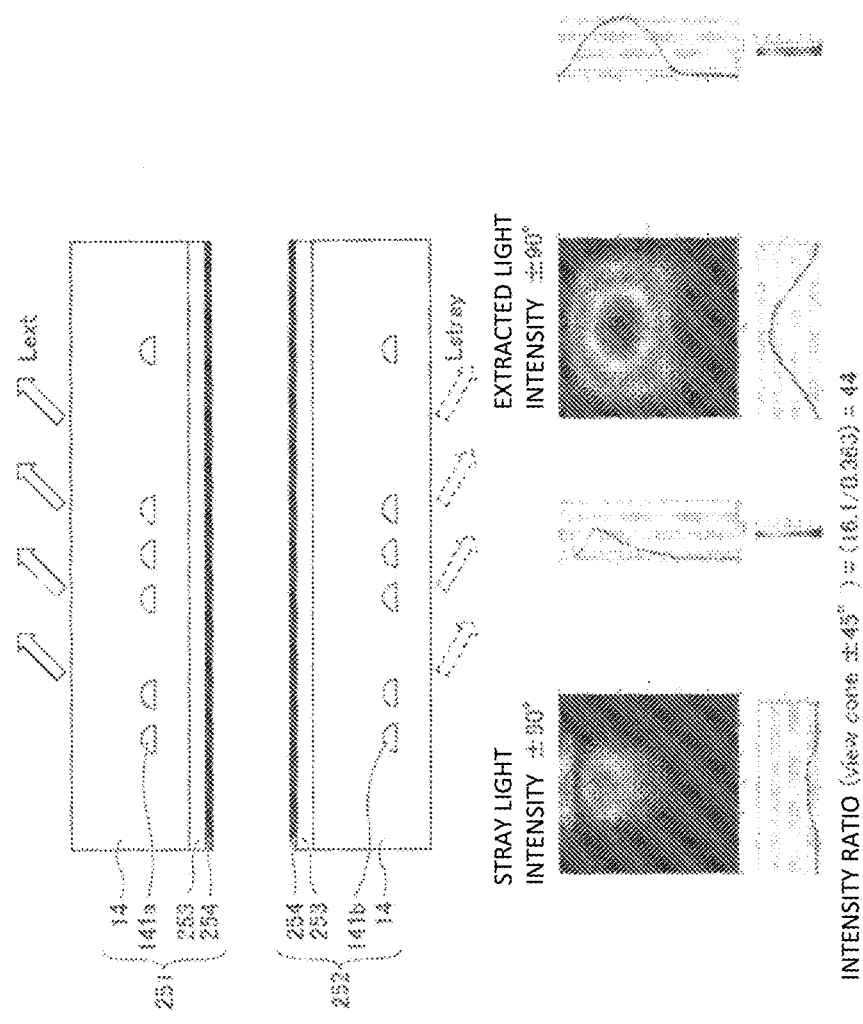
FIG. 25 A diagram showing the effect of stray light reduction based on air cavities.

FIG. 25 illustrates the effect of stray light suppression by using the lightguide 14 in an embodiment with optical cavities 141a being formed. As a model, a first portion 251 including a lightguide 14 with microlens-type optical cavities 141a inside and a second portion 252 including a lightguide 14 with microlens-type optical cavities 141b inside are used. The bumps of the optical cavities 141a and the optical cavities 141b are oriented in the same direction of light extraction (i.e., upwards in the plane of the figure). The bottom side of the optical cavities 141a and the bottom side of the optical cavities 141b are the sides that allow stray light to escape.

A low-refractive index light absorption layer 254 is adhesively bonded to the bottom surface of the first portion 251 with an optical adhesive 253, and a low-refractive index light absorption layer 254 is adhesively bonded to the upper surface of the second portion 252 with the optical adhesive 253. By placing the light absorption layers 254 so as to face each other, the intensity of light extraction from the upper surface of the first portion 251 and the intensity of stray light from the bottom surface of the second portion 252 are calculated.

The contrast ratio is as high as 44, where contrast is defined as the ratio of the intensity of the extracted light to the intensity of stray light intensity ($I_{ext}/I_{stray}$).

Figure 26:
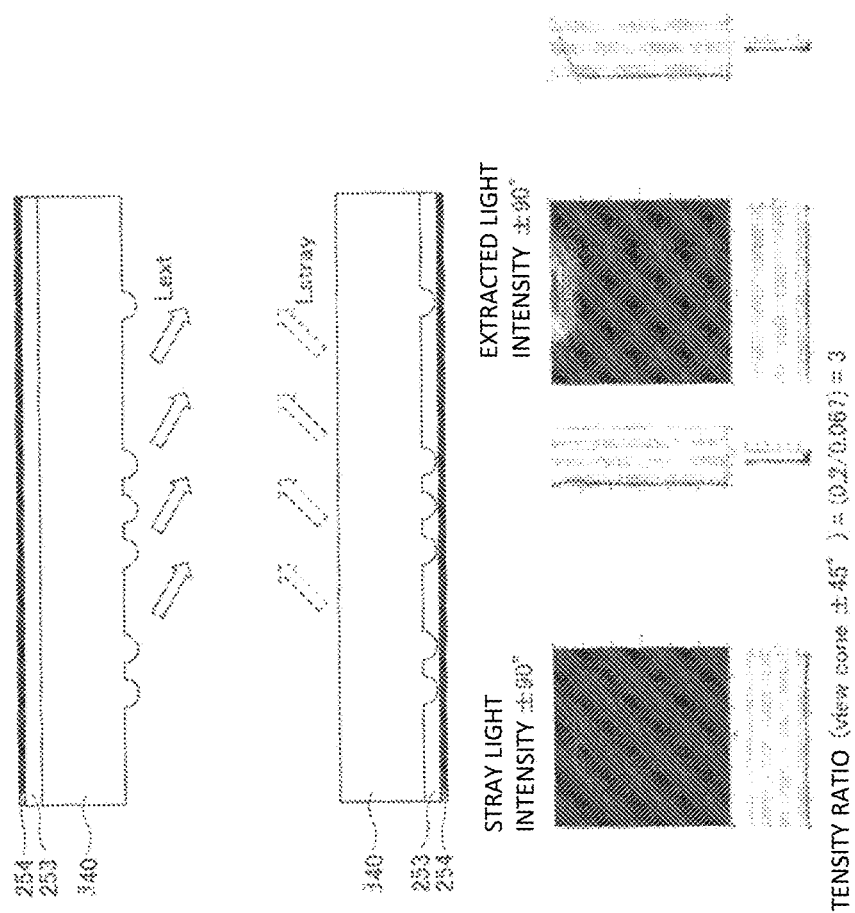
FIG. 26 A diagram showing influences of stray light in a conventional configuration.

FIG. 26 shows, as Comparative Example, a simulation result on the contrast ratio of a conventional lightguide 340 with a pattern formed on its surface. As in FIG. 25, a low-refractive index light absorption layer 254 is adhesively bonded with an optical adhesive 253 to each part, but with the light absorption layers 254 serving as the outermost layers, the light of interest and the stray light are emitted between the two light absorption layers 254.

This configuration has a contrast ratio of 3, and visibility is very poor compared to the configuration of FIG. 25. It can be seen that by using a lightguide with internal air cavities in the embodiment, the contrast or visibility can be greatly improved.

Figure 27:
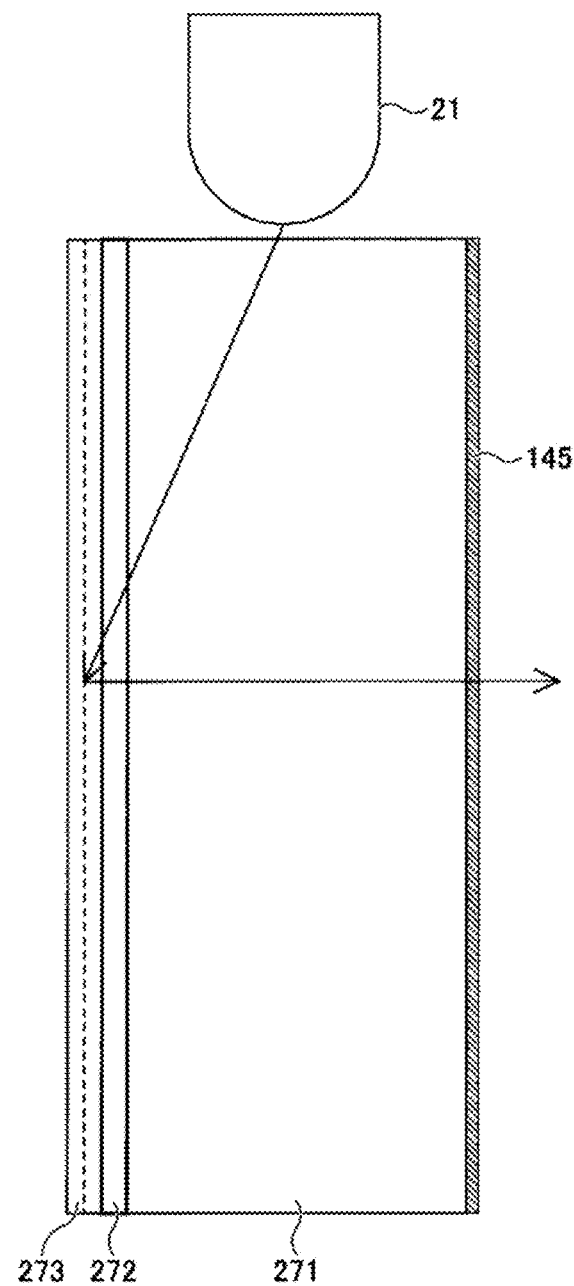
FIG. 27 A diagram showing the concept of window illumination with an antireflection film.
Figure 28:
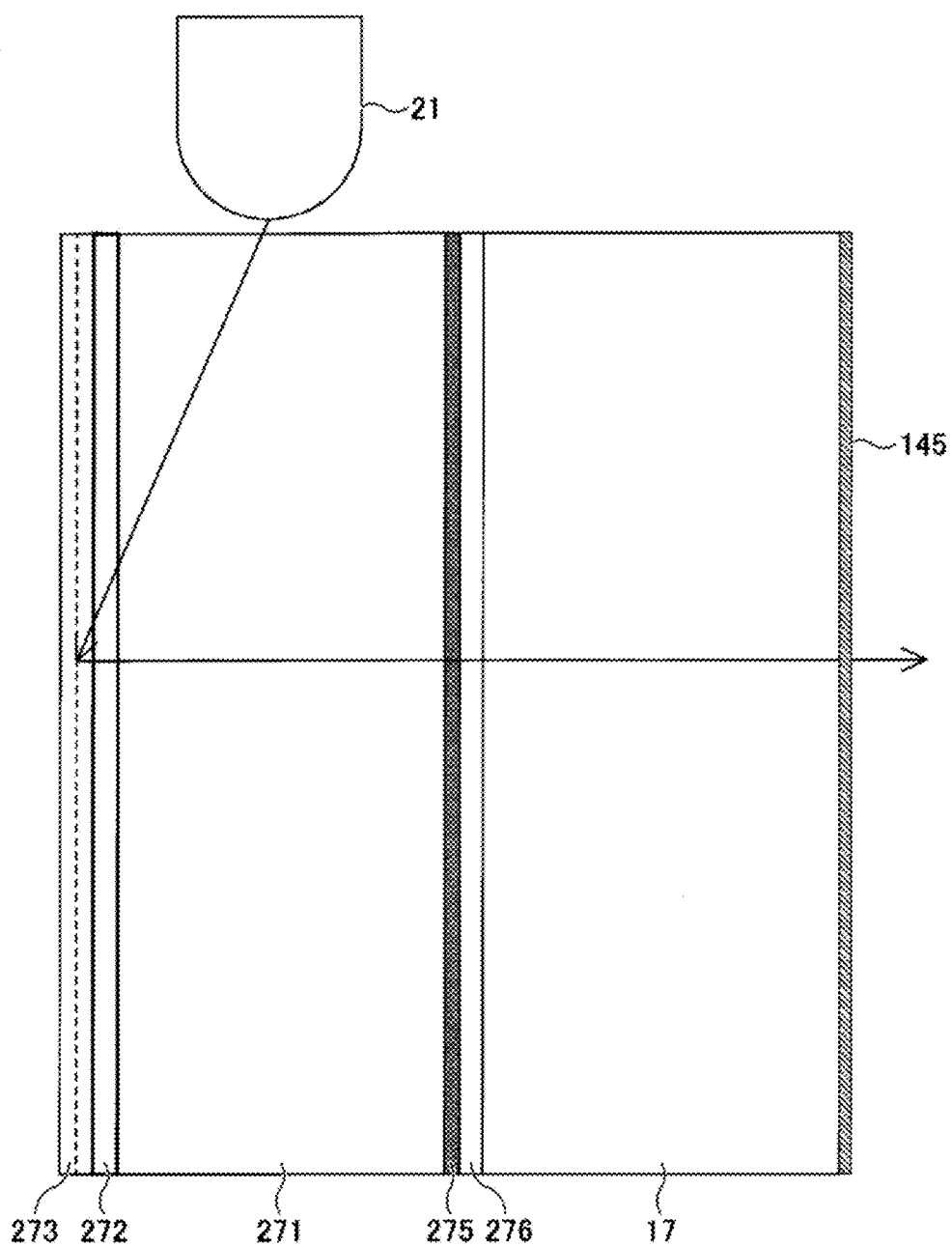
FIG. 28 A diagram showing the concept of window illumination with an antireflection film.

FIG. 27 and FIG. 28 illustrate the concept of window illumination with an antireflection film. In both figures, an AR film 145 is provided on the light-extracting surface. In FIG. 27, the AR film 145 is provided on the light-extracting surface of a lightguide 271 made of a polymer, and an optically functional layer 273 is provided on the surface at the opposite side, with an optical adhesion layer 272. The optically functional layer 273 allows the light which is output from the light source 21 and incident from the edge of the lightguide 271 to be efficiently redirected in the direction of the AR film 145. Stray light is suppressed by the AR film, while light of interest is sufficiently extracted in the direction of the arrow. The optical pattern that the optically functional layer 273 has may be a constant pattern or a pattern with a gradient in density or occupancy.

In FIG. 28, a glass cover 17 is layered on the light-extracting surface of the lightguide 271 of FIG. 27, and an AR film 145 is provided on the surface of the cover 17. In this configuration, too, the optically functional layer 273 efficiently redirects the incident light to the lightguide 271, in the direction of the AR film 145. Both of the configurations of FIG. 27 and FIG. 28 can be extended to both-surface illumination.

Figure 29:
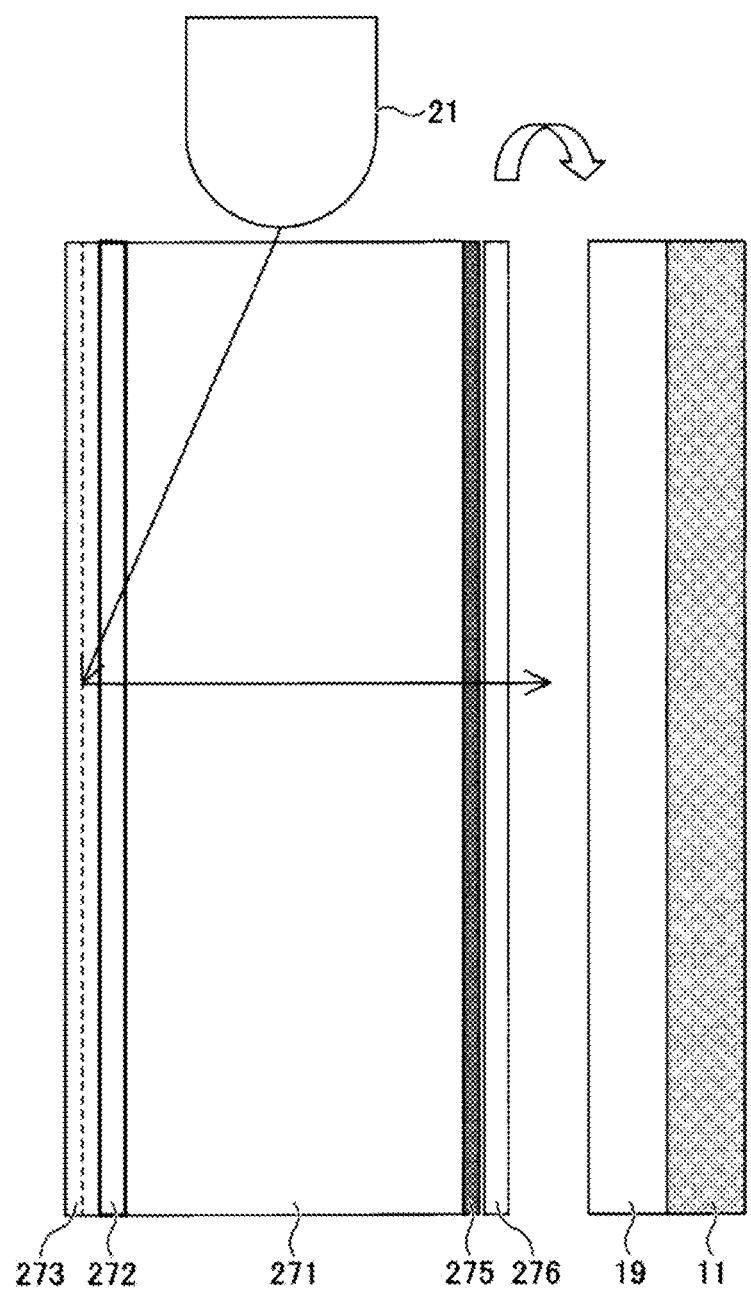
FIG. 29 A diagram showing an example configuration of a detachable optical device.
Figure 30:
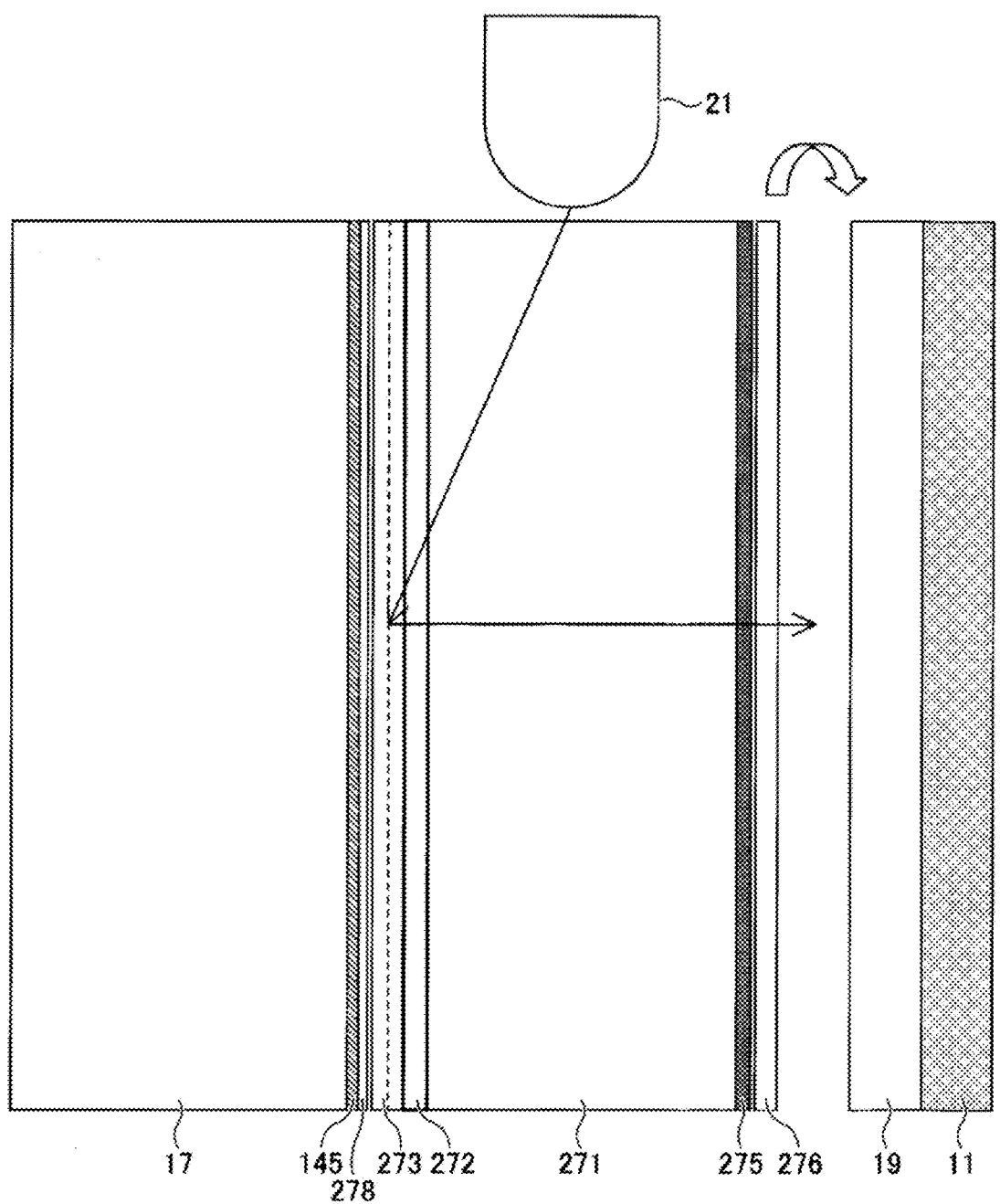
FIG. 30 A diagram showing an example configuration of a detachable optical device.

FIG. 29 and FIG. 30 show examples of detachable optical device configurations. In FIG. 29, a stacked body of the configuration of FIG. 27 is adhesively bonded, detachably, to an optical medium layer 11 (e.g., a display) with a removable optical adhesion layer 276. A low-refractive index layer 275 is inserted between the lightguide 271 and the optical adhesion layer 276.

In FIG. 30, the stacked body in the configuration of FIG. 28 is adhesively bonded, detachably, to an optical medium layer 11 (e.g., a display) with a removable optical adhesion layer 276. The configurations of FIG. 29 and FIG. 30 are optimum for displaying posters, posters, and other objects that are intended to be replace.

Although embodiments have been described based on specific example configurations, a variety of modifications and application examples are possible. Transparent solutions using lightguides with embedded cavities have a variety of applications, such as signage, transparent mobile electronic terminals or tablets, transparent VR displays, marketing windows, etc.

In an optical device according to an embodiment, light is extracted/out-coupled at a first surface; and a second surface allows light to be propagated or directed without out-coupling, but does not leak undesirable Fresnel reflection or stray light from the lightguide. When a periodic pattern is used for the optically functional layer, this optically functional layer and the second surface work in cooperation to improve light redirection and extraction (out-coupling).

Alternatively, light is extracted/out-coupled at the first surface; and the second surface allows light to be propagated or directed without out-coupling, while minimizing Fresnel reflection undesirable directions.

In order to minimize Fresnel reflection, an AR pattern, a multilayer coating, an AR coating having a wide-range antireflection effect based on low-refractive index coating, or an antireflection coating structure may be provided on at least one of the first surface and the second surface.

The profile or pattern shape of the optical pattern may be appropriately designed, e.g., rectangular waves, a blazed diffraction grating, slanted, microlenses, or trapezoidal. When the optical pattern is air cavities, an AR coating, an AR pattern, etc., may be provided at the interfaces of the air cavities. In the case where the air cavities are created by lamination of two films, an AR coating or an AR pattern may be previously formed on one of the films that is not patterned.

The size of the optical pattern should be small enough not to be visible to the human eye (e.g., 20 μm or less in size along the direction of layering). When the size is larger than this, it may be used in conjunction with an AR coating or AR pattern to prevent it from being visible.

This application incorporates the entire disclosure of U.S. Provisional Application No. 62/646,461, filed with the U.S. Patent and Trademark Office on Mar. 22, 2018.

REFERENCE SIGNS LIST 10, 10A-10D, 30A, 30B, 40A, 40B, 100A, 100B optical device
11 optical medium layer
13, 23 low-refractive index layer (second optically functional layer)
131, 132 aperture
13A optical layer (second optically functional layer)
133, 135 optical protrusion
134 air cavity
14, 174, 274 lightguide
141 optical cavities low-refractive index layer (first optically functional layer)
21 light source
31, 32 light absorption layer (ray control structure)
33, 34 redirecting layer (ray control structure)
170 in-coupling optics
171 optical element
173 air cavity

The invention claimed is:
1. An optical device comprising:
a light guiding layer;
a first optically functional layer provided on at least one of a first principal face and a second principal face of the light guiding layer; and
a ray control structure positioned at an end of the light guiding layer that includes a light-incident side, wherein the ray control structure is provided on a surface of the first optically functional layer that is on an opposite side to the light guiding layer, and
a cover provided on the surface of the first optically functional layer adjacent to the ray control structure provided on the first optically functional layer, wherein the first optically functional layer is interposed between a surface of the ray control structure and the at least one of the first principal face and the second principal face, and wherein the ray control structure reduces light which is incident from an edge of the light guiding layer to the first optically functional layer at an angle smaller than a critical angle.

2. The optical device of claim 1, wherein a refractive index of the first optically functional layer is lower than a refractive index of the light guiding layer.

3. The optical device of claim 1, wherein the ray control structure is an absorption layer to absorb the light which is incident at an angle smaller than the critical angle.

4. The optical device of claim 1, wherein the ray control structure is a directional layer having a diffraction grating or an optical aperture or optical cavity.

5. The optical device of claim 1, wherein, integrally with the first optically functional layer, the ray control structure absorbs or deflects the light which is incident at an angle smaller than the critical angle.

6. The optical device of claim 1, wherein the ray control structure is provided in another layer provided on a surface of the first optically functional layer that is on an opposite side to the light guiding layer.

7. The optical device of claim 6, wherein a refractive index of the another layer is equal or close to a refractive index of the light guiding layer.

8. The optical device of claim 1, wherein the cover is higher in strength than the first optically functional layer.

9. The optical device of claim 1, wherein the ray control structure is an absorption layer to absorb the light, and the absorption layer is exposed from the cover.

10. An optical device comprising:
a stacked body including a light guiding layer, a first optically functional layer provided on a first principal face of the light guiding layer, and a second optically functional layer provided on a second principal face of the light guiding layer that is on an opposite side to the first principal face; and
at least one ray control structure positioned at an end of the light guiding layer that includes a light-incident side, wherein the at least one ray control structure is provided on a first surface of the stacked body on the first principal face side, or wherein the at least one ray control structure is provided on the first surface and a second surface of the stacked body on the second principal face side, and
a cover provided on the first surface adjacent to the at least one ray control structure provided on the first surface, wherein
the first optically functional layer is interposed between a surface of the at least one ray control structure and the at least one of the first principal face and the second principal face, and wherein the at least one ray control structure reduces first light which is incident from an edge of the light guiding layer to the first optically functional layer at a first angle smaller than a first critical angle, or the first light and second light which is incident from the edge of the light guiding layer to the second optically functional layer at a second angle smaller than a second critical angle.

11. The optical device of claim 10, wherein refractive indices of the first optically functional layer and the second optically functional layer are lower than a refractive index of the light guiding layer.

12. The optical device of claim 10, wherein the cover is higher in strength than the first optically functional layer.

13. The optical device of claim 10, wherein the at least one ray control structure is at least one absorption layer to absorb the first light or the first and second light,
the at least one absorption layer is provided on the first surface or the first and second surfaces, and
the absorption layer provided on the first surface is exposed from the cover.

14. The optical device of claim 10, wherein a refractive index of the first optically functional layer is lower than a refractive index of the light guiding layer.

15. The optical device of claim 10, wherein the at least one ray control structure is at least one absorption layer to absorb the first light or the first and second light.

16. The optical device of claim 10, wherein the at least one ray control structure is a directional layer having a diffraction grating or an optical aperture or optical cavity.

17. The optical device of claim 10, wherein, integrally with the first optically functional layer, the at least one ray control structure absorbs or deflects the first light or the first and second light.

18. The optical device of claim 10, wherein the at least one ray control structure is provided in another layer provided on a surface of the first optically functional layer that is on an opposite side to the light guiding layer.

19. The optical device of claim 18, wherein a refractive index of the another layer is equal or close to a refractive index of the light guiding layer.

20. An optical device comprising:
a light guiding layer;
a first optically functional layer provided on at least one of a first principal face and a second principal face of the light guiding layer; and
a ray control structure positioned at an end of the light guiding layer that includes a light-incident side, wherein the ray control structure is provided on a surface of the first optically functional layer that is on an opposite side to the light guiding layer, wherein
the ray control structure reduces light which is incident from an edge of the light guiding layer to the first optically functional layer at an angle smaller than a critical angle,
wherein the ray control structure is a directional layer to control a reflecting direction of the light which is incident at an angle smaller than the critical angle, wherein
the first optically functional layer is interposed between a surface of the ray control structure and the at least one of the first principal face and the second principal face, and
wherein the ray control structure is a directional layer having a diffraction grating or an optical aperture or optical cavity, the diffraction grating or the optical aperture or the optical cavity being interposed between an outer surface of the directional layer and an outer surface of the first optically functional layer.

* * * * *